(12) United States Patent
Fleizach et al.

(10) Patent No.: US 10,353,550 B2
(45) Date of Patent: Jul. 16, 2019

(54) DEVICE, METHOD, AND GRAPHICAL USER INTERFACE FOR MEDIA PLAYBACK IN AN ACCESSIBILITY MODE

(71) Applicant: Apple Inc., Cupertino, CA (US)

(72) Inventors: Christopher Brian Fleizach, Gilroy, CA (US); Clare T. Kasemset, Sunnyvale, CA (US); Darren Christopher Minifie, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 15/609,777

(22) Filed: May 31, 2017

(65) Prior Publication Data

US 2017/0357389 A1     Dec. 14, 2017

Related U.S. Application Data

(60) Provisional application No. 62/348,885, filed on Jun. 11, 2016.

(51) Int. Cl.
*G06F 3/0482* (2013.01)
*G06F 3/0485* (2013.01)
*G06F 3/0488* (2013.01)
*H04N 5/44* (2011.01)
*H04N 21/422* (2011.01)

(52) U.S. Cl.
CPC .......... *G06F 3/0482* (2013.01); *G06F 3/0485* (2013.01); *G06F 3/0488* (2013.01); *H04N 5/4403* (2013.01); *H04N 21/42204* (2013.01)

(58) Field of Classification Search
USPC ......................................................... 715/716
See application file for complete search history.

(56) References Cited

U.S. PATENT DOCUMENTS

| | | | |
|---|---|---|---|
| 7,398,004 B1* | 7/2008 | Maffezzoni | G11B 27/034 386/282 |
| 9,706,244 B2* | 7/2017 | Lee | H04N 21/4126 |
| 2007/0050054 A1* | 3/2007 | Sambandam Guruparan | G08C 19/28 700/65 |
| 2007/0063862 A1* | 3/2007 | Lippincott | G08C 23/04 340/12.25 |

(Continued)

*Primary Examiner* — Reza Nabi
(74) *Attorney, Agent, or Firm* — Fernando & Partners, LLP; William J. Higley

(57) ABSTRACT

In accordance with some embodiments, a method is performed at a device, coupled to a display, with one or more processors and non-transitory memory. The method includes displaying, on the display, a plurality of user interface objects. The method includes detecting a selection input while a first user interface object of the plurality of user interface objects has accessibility focus. In response to detecting the selection user input, the method includes displaying, on the display, an accessibility menu for the first user interface object including one or more selectable options for interacting with the first user interface object and a selectable option for displaying a virtual remote. The method includes detecting a virtual remote activation input while the selectable option for displaying the virtual remote has accessibility focus. In response to detecting the virtual remote activation input, the method includes displaying, on the display, a virtual remote including a plurality of virtual remote user interface objects.

30 Claims, 63 Drawing Sheets

(56) References Cited

U.S. PATENT DOCUMENTS

| | | | | |
|---|---|---|---|---|
| 2007/0229465 | A1* | 10/2007 | Sakai | G08C 17/00 345/173 |
| 2009/0124329 | A1* | 5/2009 | Palmisano | G07F 17/32 463/20 |
| 2009/0153289 | A1* | 6/2009 | Hope | G06F 3/04883 340/5.1 |
| 2010/0302357 | A1* | 12/2010 | Hsu | G06F 3/017 348/77 |
| 2010/0306699 | A1* | 12/2010 | Hsu | G06F 3/017 715/810 |
| 2011/0035668 | A1* | 2/2011 | Thiyagarajan | H04N 5/4403 715/716 |
| 2011/0113374 | A1* | 5/2011 | Sheehan | G06F 3/03547 715/825 |
| 2012/0161928 | A1* | 6/2012 | Cheng | G05B 15/02 340/6.1 |
| 2012/0162541 | A1* | 6/2012 | Carvajal | G06F 3/03547 348/734 |
| 2014/0022192 | A1* | 1/2014 | Hatanaka | G06F 3/041 345/173 |
| 2016/0234453 | A1* | 8/2016 | Han | H04N 5/4403 |
| 2017/0177208 | A1* | 6/2017 | You | G06F 3/0488 |
| 2017/0214784 | A1* | 7/2017 | Masuoka | G08C 17/02 |
| 2017/0357389 | A1* | 12/2017 | Fleizach | G06F 3/0482 |

* cited by examiner

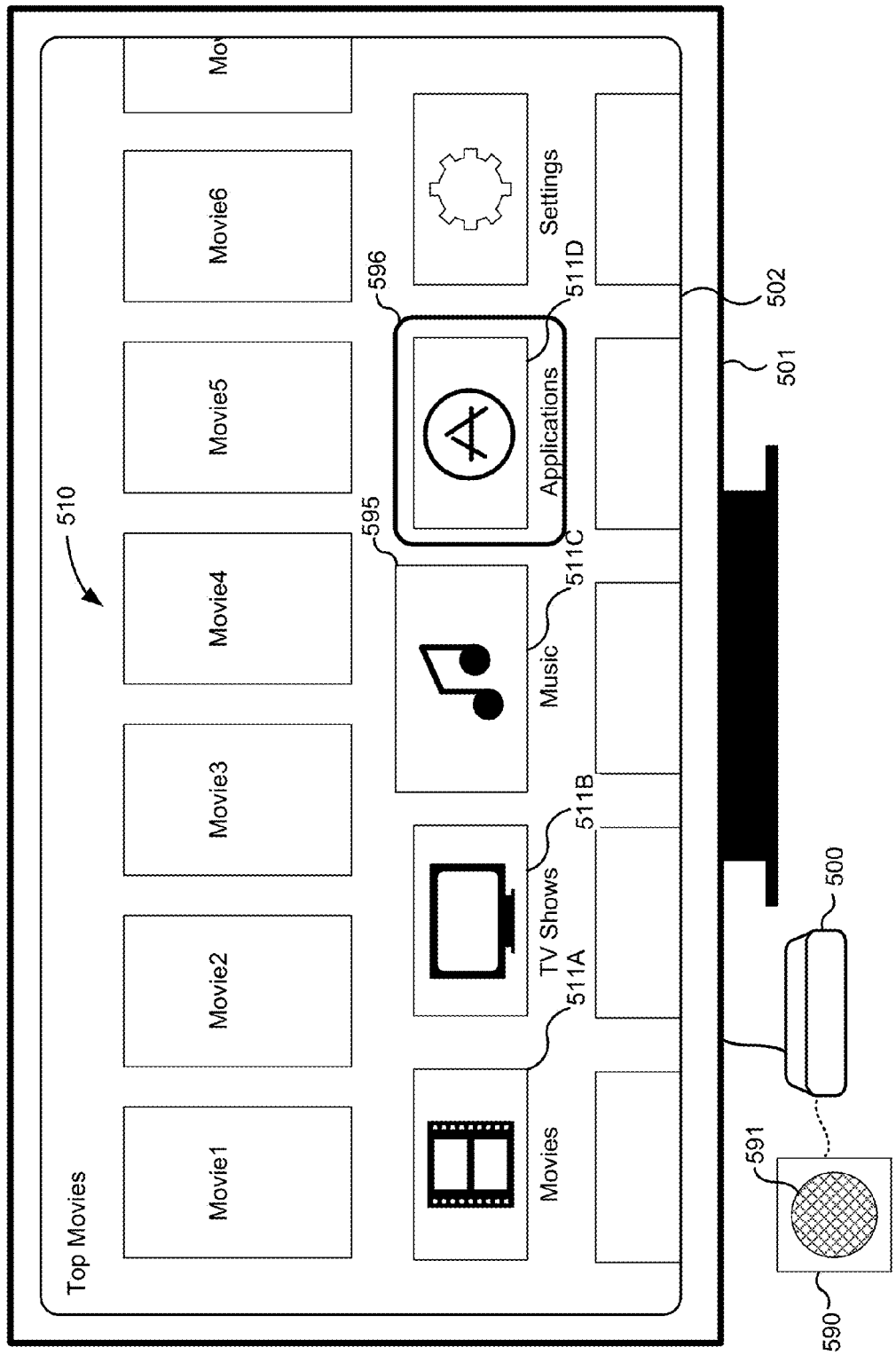

DEVICE, METHOD, AND GRAPHICAL USER INTERFACE FOR MEDIA PLAYBACK IN AN ACCESSIBILITY MODE

CROSS-REFERENCE TO RELATED-APPLICATIONS

This application claims the benefit of U.S. Provisional Patent App. No. 62/348,885, filed on Jun. 11, 2016, which is incorporated by reference in its entirety.

TECHNICAL FIELD

This relates generally to electronic devices with touch-sensitive surfaces, including but not limited to electronic devices with touch-sensitive surfaces that playback media in an accessibility mode.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But people with limited motor skills, such as those with certain finger or hand impairments, may find performing certain gestures difficult and may employ alternative input devices to control an electronic device in an accessibility mode. Whereas some electronic devices may have user interfaces designed to be navigated with a remote control including both a touch-sensitive surface and remote control buttons, the accessibility mode desirably provides an alternative to both types of input devices of the remote control.

SUMMARY

Accordingly, there is a need for electronic devices with faster, more efficient methods and interfaces for playing back media items in an accessibility mode. Such methods and interfaces optionally complement or replace conventional methods for playing back media items in an accessibility mode. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device, coupled to a display, with one or more processors and non-transitory memory. The method includes: displaying, on the display, a plurality of user interface objects, detecting a selection input while a first user interface object of the plurality of user interface objects has accessibility focus, in response to detecting the selection user input, displaying, on the display, an accessibility menu for the first user interface object including one or more selectable options for interacting with the first user interface object and a selectable option for displaying a virtual remote, detecting a virtual remote activation input while the selectable option for displaying the virtual remote has accessibility focus, and, in response to detecting the virtual remote activation input, displaying, on the display, a virtual remote including a plurality of virtual remote user interface object.

In accordance with some embodiments, an electronic device includes a display interface unit configured to display a user interface on a display unit and a processing unit coupled with the display interface unit. The processing unit is configured: display, on the display unit, a plurality of user interface objects, detect a selection input while a first user interface object of the plurality of user interface objects has accessibility focus, in response to detecting the selection user input, display, on the display unit, an accessibility menu for the first user interface object including one or more selectable options for interacting with the first user interface object and a selectable option for displaying a virtual remote, detecting a virtual remote activation input while the selectable option for displaying the virtual remote has accessibility focus, and, in response to detecting the virtual remote activation input, display, on the display unit, a virtual remote including a plurality of virtual remote user interface objects.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for playing back media in an accessibility mode, thereby increasing the effectiveness, efficiency, and user satisfaction with such devices. Such methods and interfaces may complement or replace conventional methods for playing back media in an accessibility mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The use of electronic devices with touch-based user interfaces (e.g., devices such as the iPhone®, iPod Touch®, and iPad® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. Some electronic devices include a touch-sensitive surface as part of a remote control also including a number of remote control buttons as the main input for manipulating user interface objects on a display and/or controlling the device. People with limited motor skills, such as those with certain finger or hand impairments, may find applying force or pressure to the touch-sensitive surface and/or pressing different remote control buttons difficult, if not impossible, and may employ alternative input devices to control the device.

Described below are methods and devices that enable users who cannot easily operate a remote control (possibly including a touch-sensitive surface) to nevertheless operate a device having such a remote control as the main input. In some embodiments, as described below, an electronic device displays, as part of a user interface, a virtual remote for navigating the user interface using an alternative input device.

Figure 2:
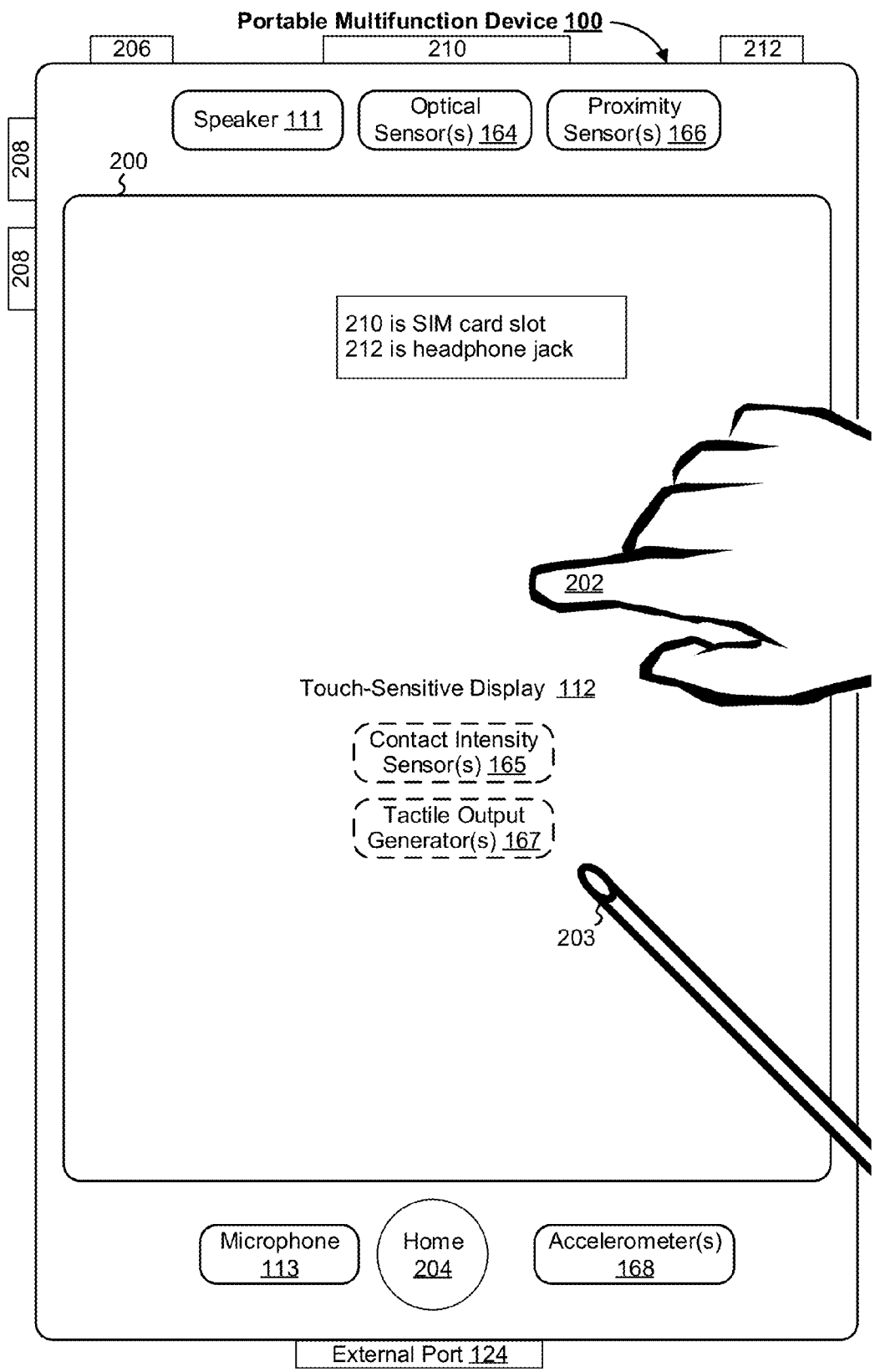
FIG. 2 illustrates a portable multifunction device having a touch screen in accordance with some embodiments.
Figure 3:
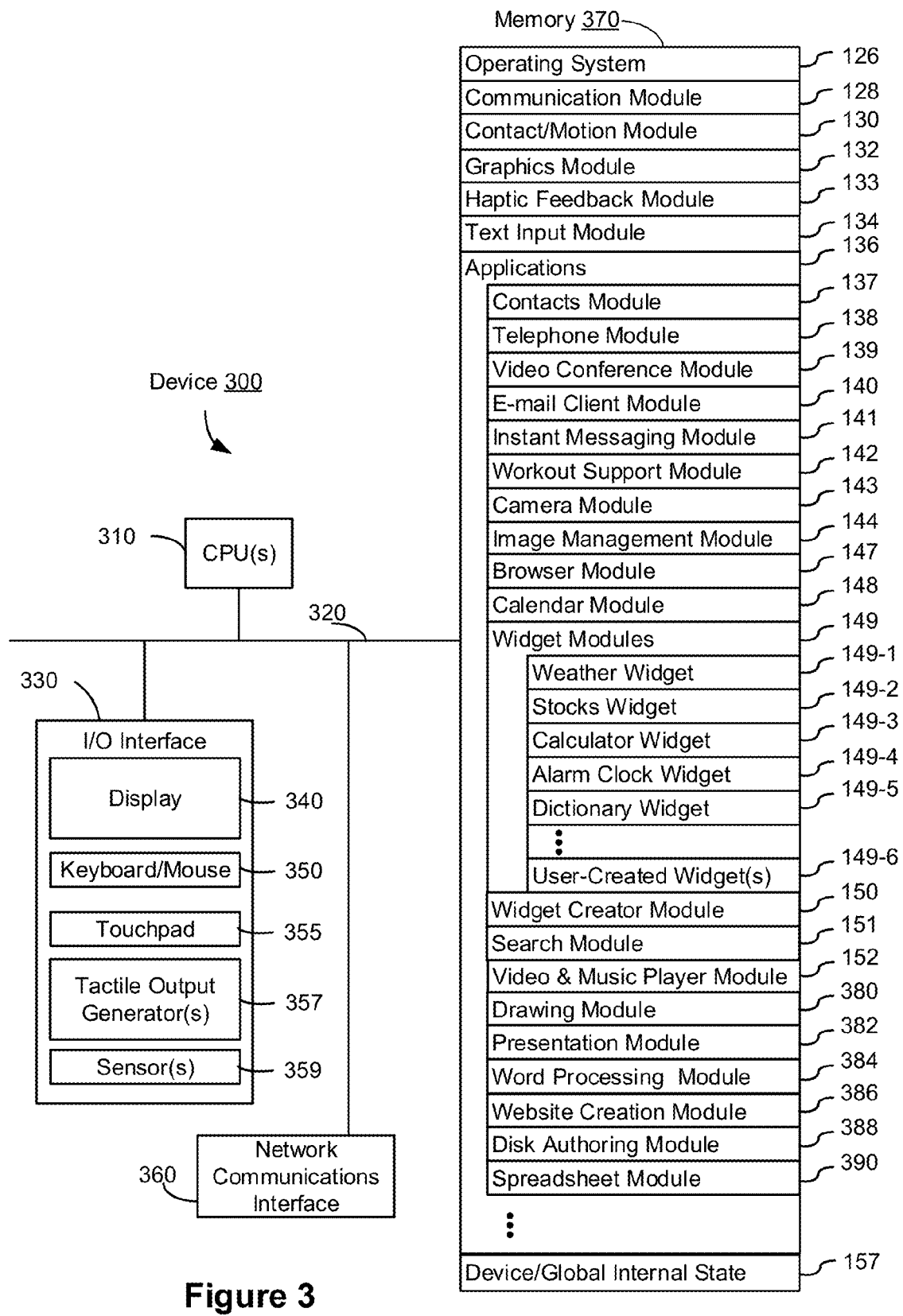
FIG. 3 is a block diagram of an example multifunction device with a display and a touch-sensitive surface in accordance with some embodiments.
Figure 4A:
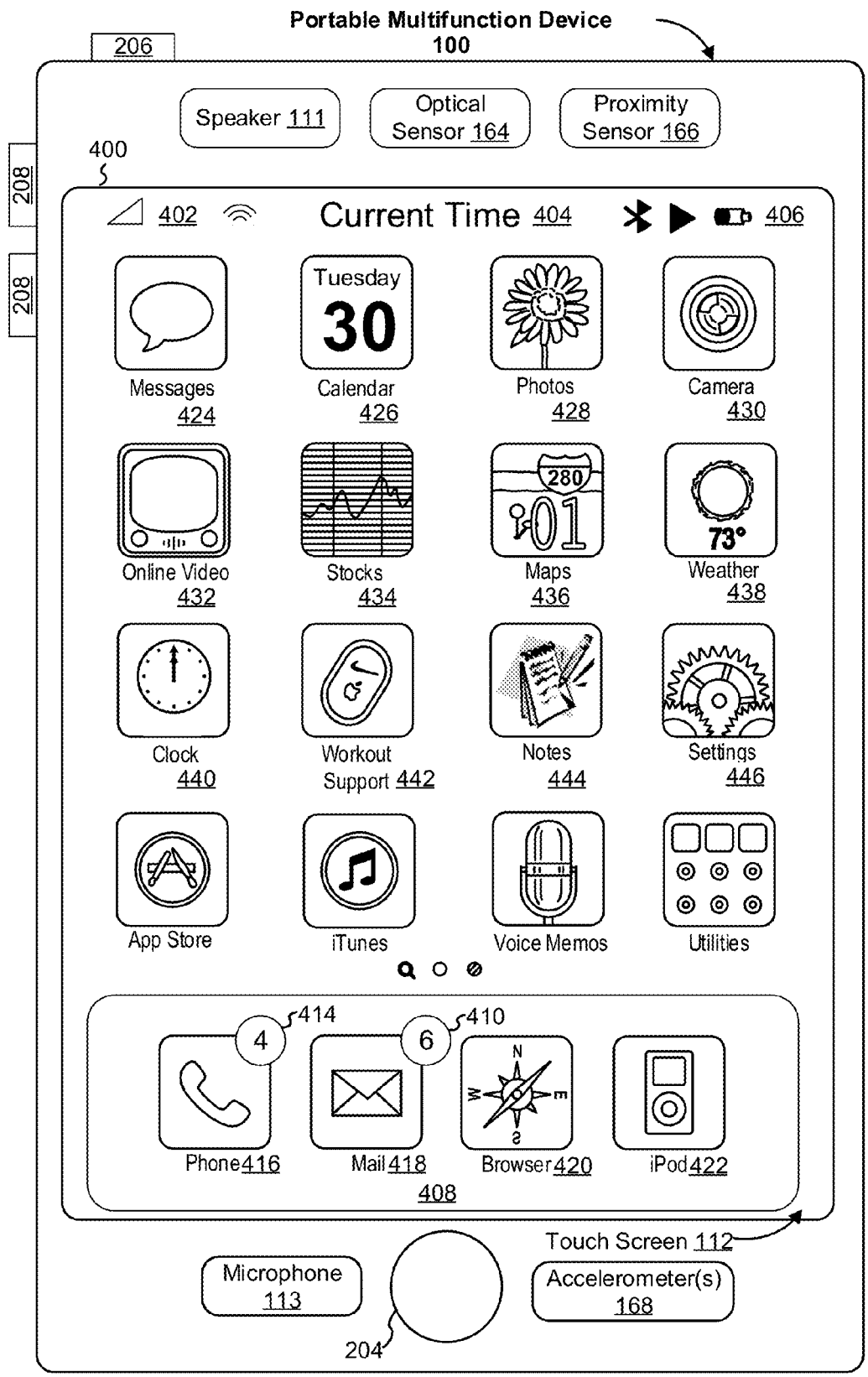
FIG. 4A illustrates an example user interface for a menu of applications on a portable multifunction device in accordance with some embodiments.
Figure 4B:
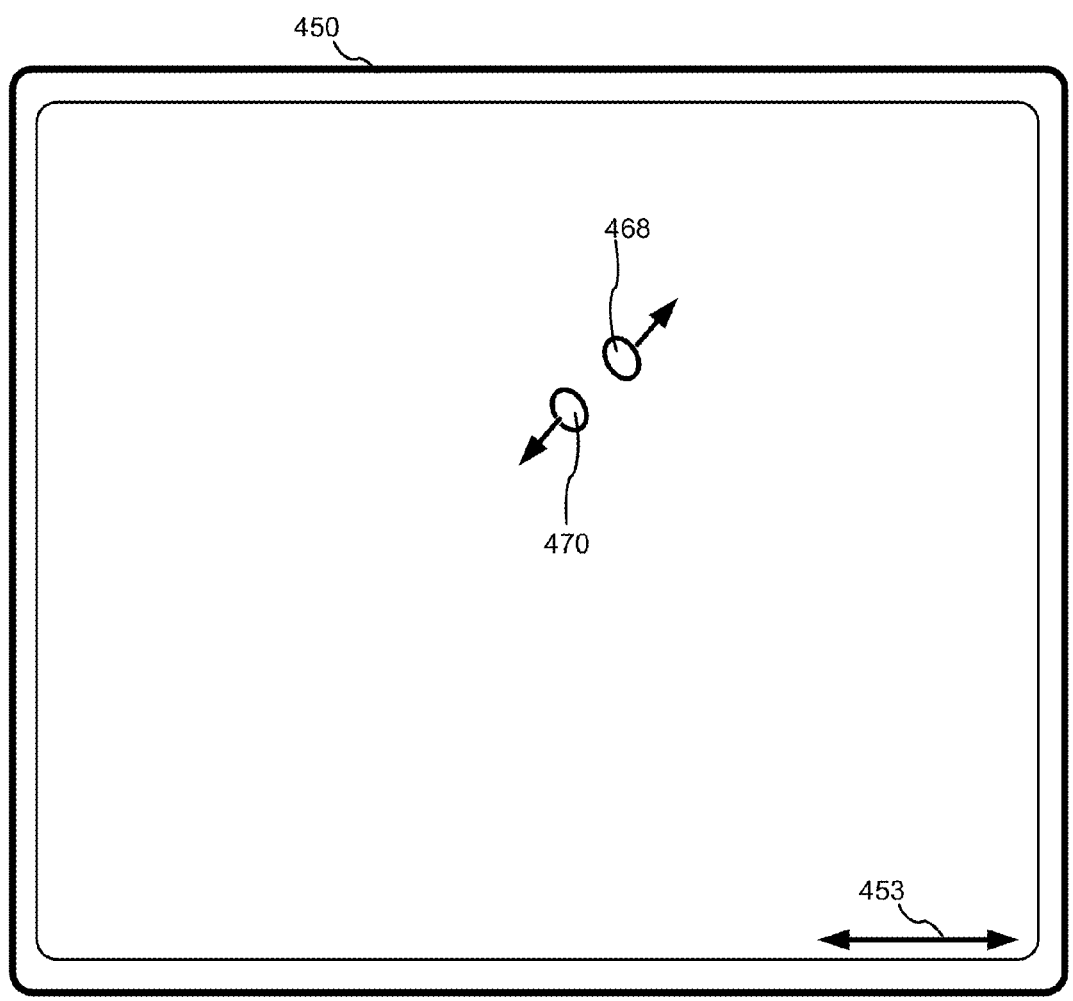
FIG. 4B illustrates an example user interface for a multifunction device with a touch-sensitive surface that is separate from the display in accordance with some embodiments.
Figure 4B:
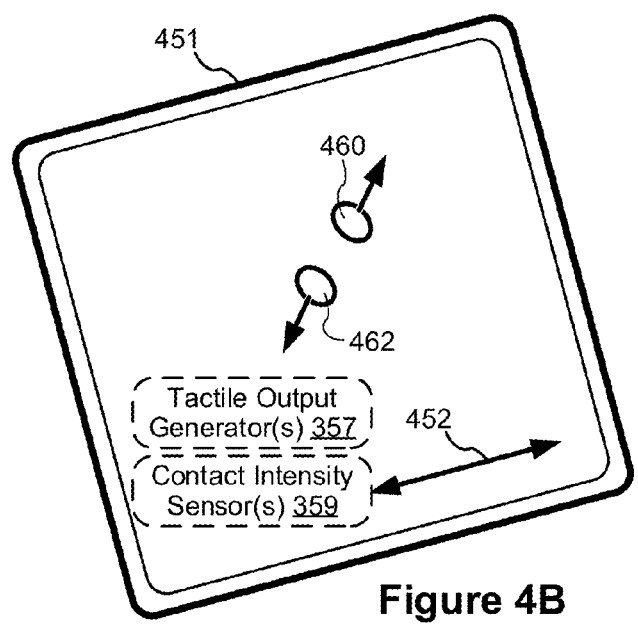

Below, FIGS. 1A-1B, 2, and 3, and 4C provide a description of example devices. FIGS. 4A-4B and 5A-5AY illustrate example user interfaces for playing back media items in an accessibility mode. FIGS. 6A-6D illustrate a flow diagram of a method of playing back media items in an accessibility mode. The user interfaces in FIGS. 5A-5AY are used to illustrate the processes in FIGS. 6A-6D.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
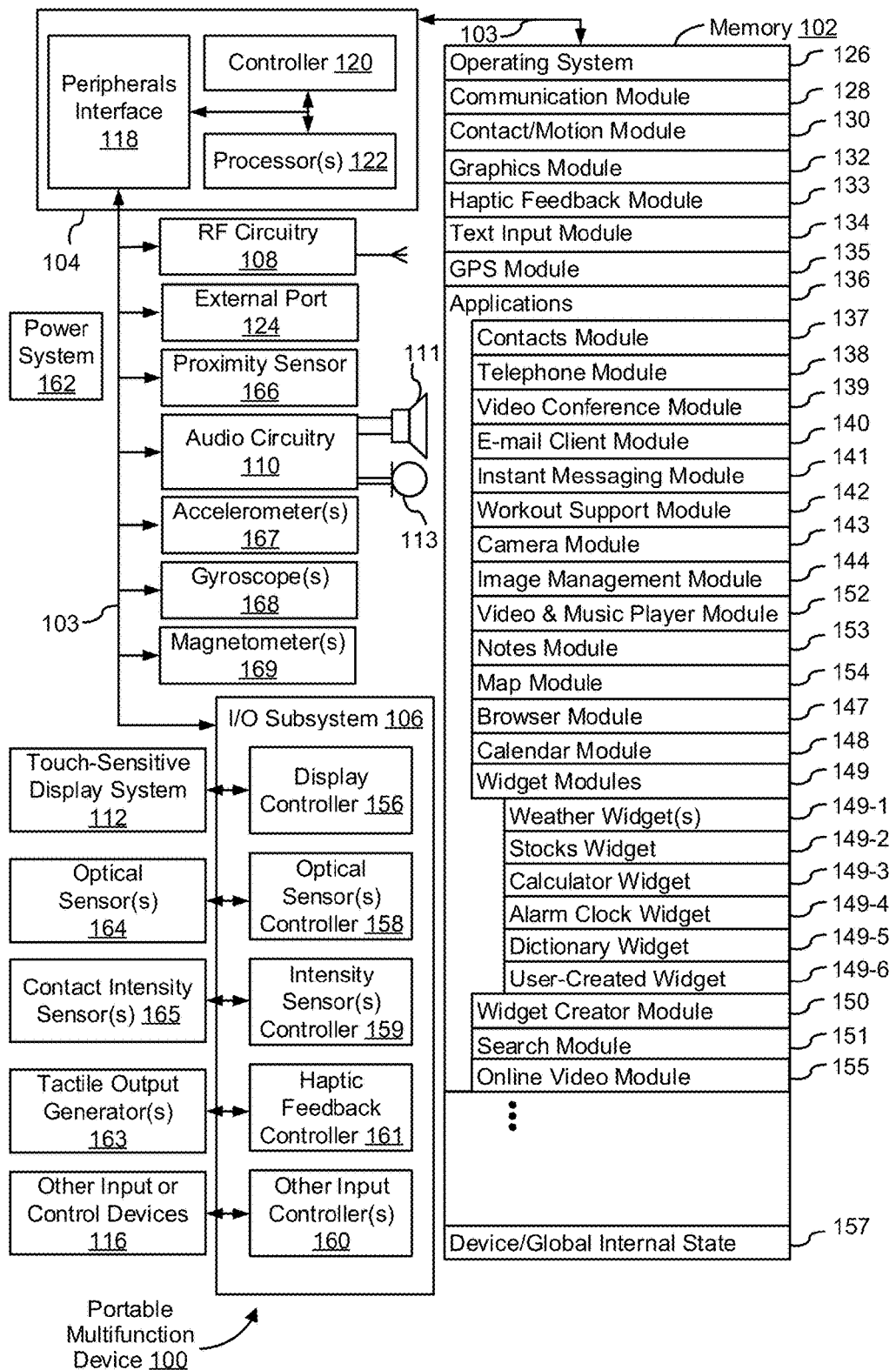
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-user interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-user interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-user interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
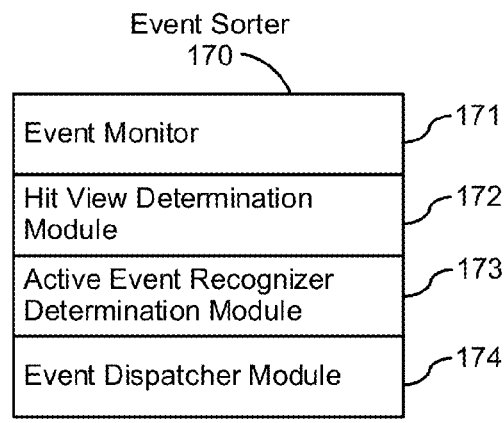
FIG. 1B is a block diagram illustrating example components for event handling in accordance with some embodiments.
Figure 1B:
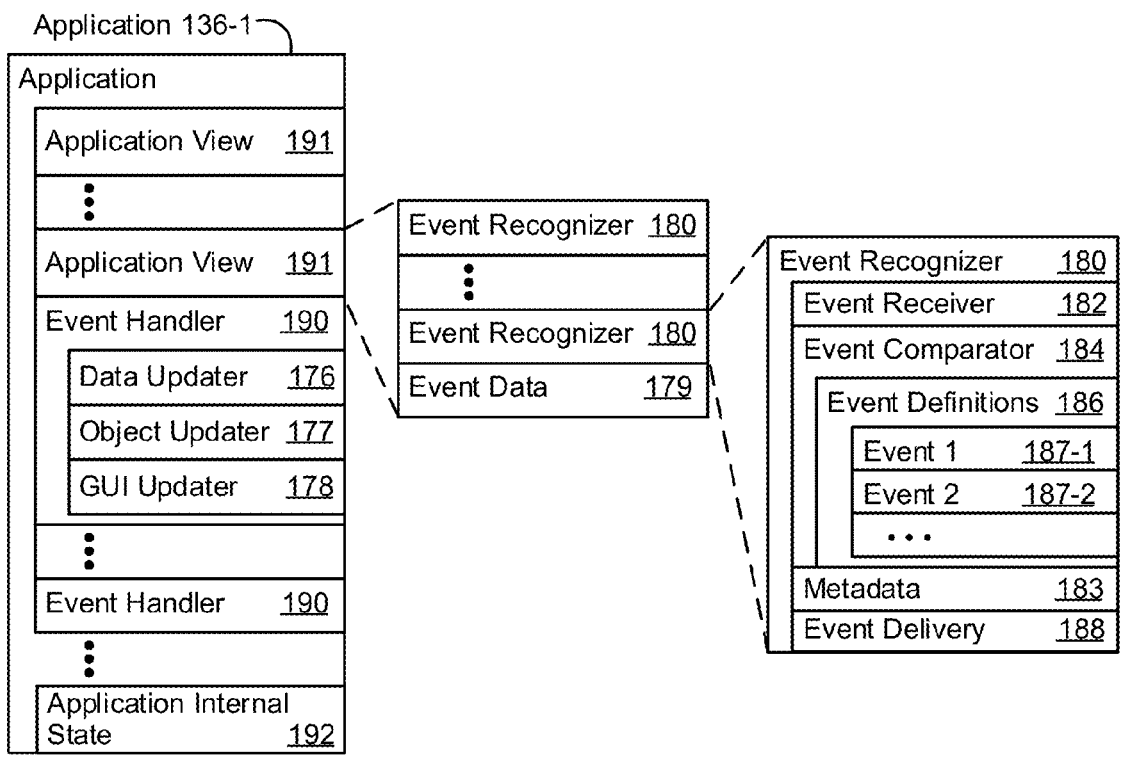

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-user interface object. In some embodiments, event comparator 184 performs a hit test to determine which user-user interface object is associated with a sub-event. For example, in an application view in which three user-user interface objects are displayed on touch-sensitive display system 112, when a touch is detected on touch-sensitive display system 112, event comparator 184 performs a hit test to determine which of the three user-user interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-user interface object or updates the position of a user-user interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:

Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser"; and
Icon 422 for video and music player module 152, also referred to as iPod (trademark of Apple Inc.) module 152, labeled "iPod"; and Icons for other applications, such as:
Icon 424 for IM module 141, labeled "Text";
Icon 426 for calendar module 148, labeled "Calendar";
Icon 428 for image management module 144, labeled "Photos";
Icon 430 for camera module 143, labeled "Camera";
Icon 432 for online video module 155, labeled "Online Video";
Icon 434 for stocks widget 149-2, labeled "Stocks";
Icon 436 for map module 154, labeled "Map";
Icon 438 for weather widget 149-1, labeled "Weather";
Icon 440 for alarm clock widget 169-6, labeled "Clock";
Icon 442 for workout support module 142, labeled "Workout Support";
Icon 444 for notes module 153, labeled "Notes"; and
Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Figure 4C:
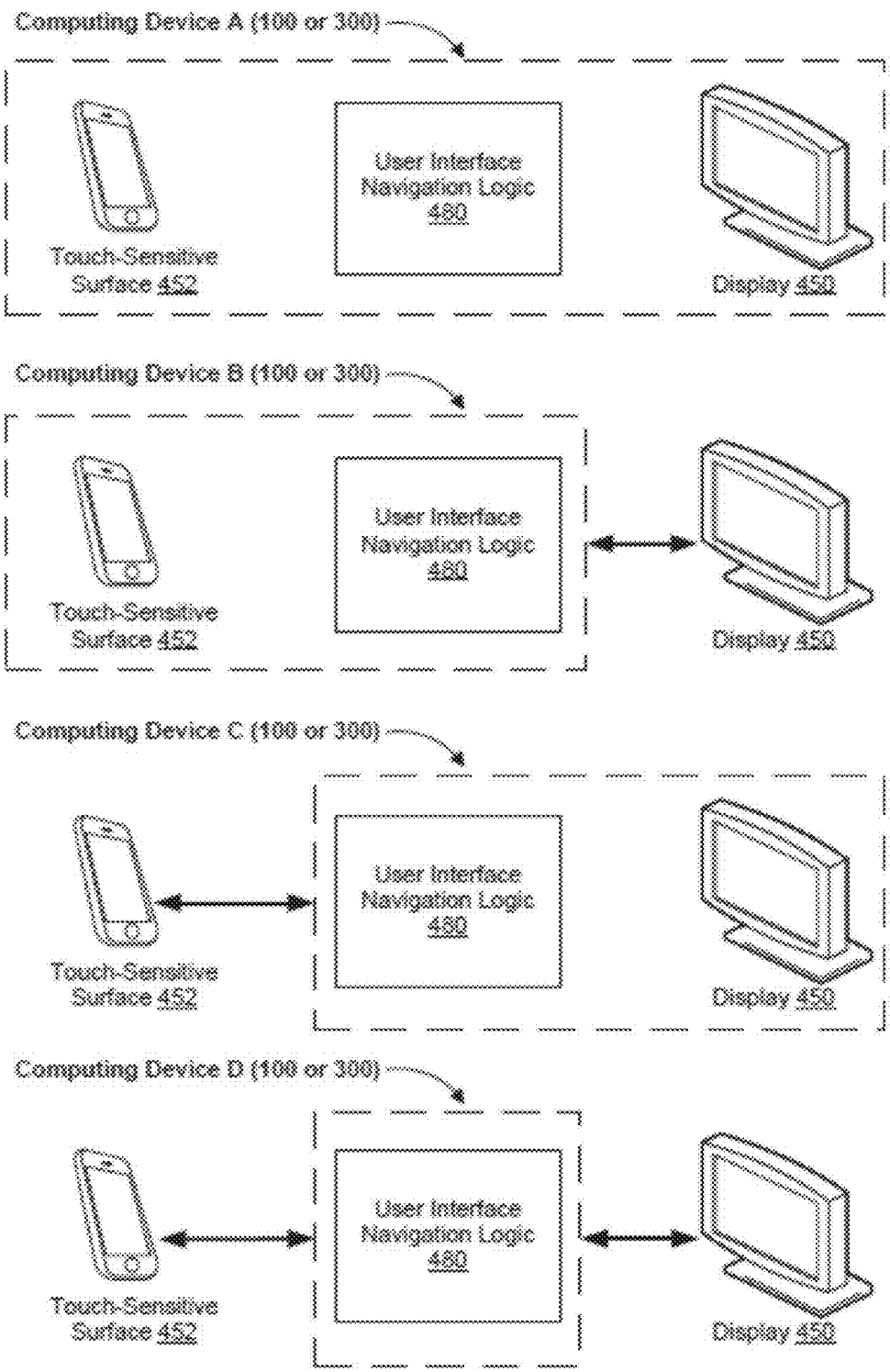
FIG. 4C illustrates example electronic devices that are in communication with a display and a touch-sensitive surface in accordance with some embodiments.
Figure 5A:
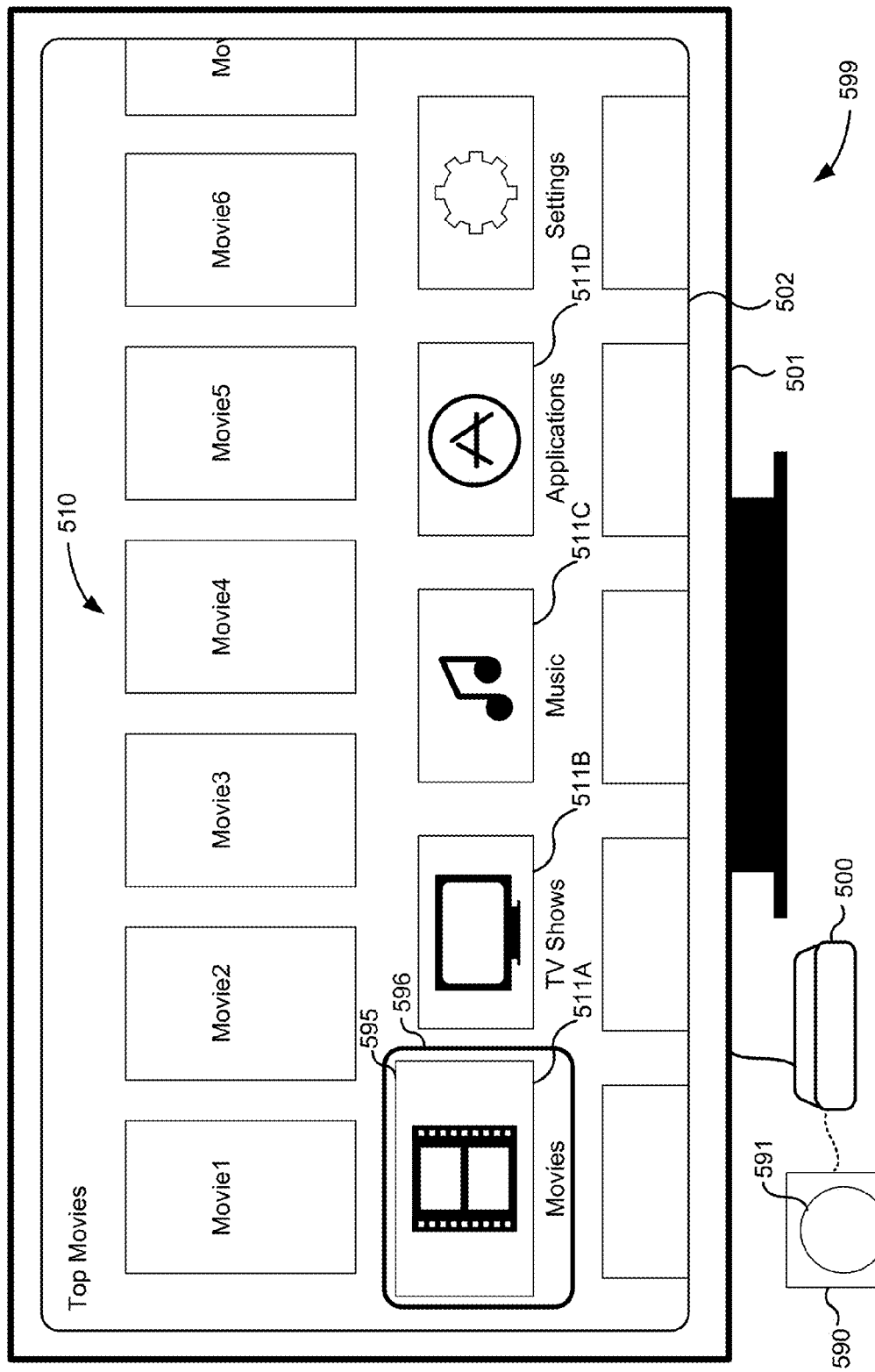
FIGS. 5A-5AY illustrate example user interfaces for playing back media items in accordance with some embodiments.

FIG. 4C illustrates exemplary electronic devices that are in communication with a display 450 and touch-sensitive surface 452. For at least a subset of the computing devices, the display 450 and/or the touch-sensitive surface 452 is integrated into the computing device in accordance with some embodiments. While the examples described in greater detail below are described with reference to a touch-sensitive surface 451 and a display 450 that are in communication with a computing device (e.g., portable multifunction device 100 in FIGS. 1A-1B or device 300 in FIG. 3), it should be understood that in accordance with some embodiments, the touch-sensitive surface and/or the display are integrated with the computing device, while in other embodiments one or more of the touch-sensitive surface and the display are separate from the computing device. Additionally, in some embodiments the computing device has an integrated display and/or an integrated touch-sensitive surface and is in communication with one or more additional displays and/or touch-sensitive surfaces that are separate from the computing device.

In some embodiments, all of the operations described below with reference to FIGS. 5A-5AY are performed on a single computing device with user interface navigation logic 480 (e.g., Computing Device A described below with reference to FIG. 4C). However, it should be understood that frequently multiple different computing devices are linked together to perform the operations described below with reference to FIGS. 5A-5AY (e.g., a computing device with user interface navigation logic 480 communicates with a separate computing device with a display 450 and/or a separate computing device with a touch-sensitive surface 451). In any of these embodiments, the computing device that is described below with reference to FIGS. 5A-5AY is the computing device (or devices) that contain(s) the user interface navigation logic 480. Additionally, it should be understood that the user interface navigation logic 480 could be divided between a plurality of distinct modules or computing devices in various embodiments; however, for the purposes of the description herein, the user interface navigation logic 480 will be primarily referred to as residing in a single computing device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on the display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the user interface navigation logic 480).

In some embodiments, both the display 450 and the touch-sensitive surface 451 are integrated with the computing device (e.g., Computing Device A in FIG. 4C) that contains the user interface navigation logic 480. For example, the computing device may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, the touch-sensitive surface 451 is integrated with the computing device while the display 450 is not integrated with the computing device (e.g., Computing Device B in FIG. 4C) that contains the user interface navigation logic 480. For example, the computing device may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the computing device while the touch-sensitive surface 451 is not integrated with the computing device (e.g., Computing Device C in FIG. 4C) that contains the user interface navigation logic 480. For example, the computing device may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 451 is integrated with the computing device (e.g., Computing Device D in FIG. 4C) that contains the user interface navigation logic 480. For example, the computing device may be a stand-alone computing device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 450.

In some embodiments, the audio system (e.g., a stereo system) is a stand-alone system that is separate from the computing device and the display 450.

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5AY illustrate example user interfaces for playing back media items in accordance with some embodiments. The user interfaces in these figures are used to illustrate the processes described below, including the processes in FIGS. 6A-6D. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

FIG. 5A illustrates media consumption environment 599 including a media player 500 coupled to a display 501 and a switch device 590. In various implementations, the media player 500 is coupled to the display 501 via a wireless (e.g., WiFi) or wired (e.g., HDMI) connection. In various implementations, the media player 500 is coupled to the input device 590 via a wireless (e.g., Bluetooth™) or wired (e,g, Lightning® or 3.5 mm jack) connection. In some embodiments, the switch device 590 is coupled to another device that forwards inputs to the media player 500.

A user with limited motor skills, such as those with certain finger or hand impairments, may find interacting with traditional input devices of the media player 500, such as a remote or a speaker to receive voice commands. Thus, the media player 500 can be configured to operate in an accessibility mode in which input from the switch device 590 is used to navigate the user interface 502.

The switch device 590 generates a binary input stream including binary inputs that are communicated to the media player 500. The switch device 590 can include, for example, a switch 591 that produces an "on" input when the switch is pressed and an "off" input when the switch is not pressed. The switch device 590 can include, as another example, a camera that produces an "on" input when the user turns his/her head to the left and an "off" input when the camera does not detect this motion. The binary input stream can be, for example, a voltage wave form that has a first value (e.g., 5 V) to indicate an "on" input and a second value (e.g., 0 V) to indicate an "off" input.

The switch device 590 can generate multiple binary input streams that are communicated to the media player 500. The switch device 590 can include, for example, a first switch 591 and a second switch (not shown). The first switch 591 produces a first "on" input when the first switch is pressed and a first "off" input when the first switch is not pressed. Similarly, the second switch produces a second "on" input when the second switch is pressed and a second "off" input when the second switch is not pressed. The first "on" input and the second "on" input can have different effects in operating the media player 500. As another example, the switch device 590 can include a camera that produces a first "on" input when the user turns his/her head to the left and a second "on" input when the user turns his/her head to the right. A variety of devices for people of limited mobility can be used to generate switch inputs, including a device that detects when air in blown into a straw or when the person blinks.

In the accessibility mode, the media player 500 interprets the input from the switch device 590 to navigate a user interface 502 displayed on the display 501. In some implementation, the user interface 502 includes a selection indicator that sequentially highlights user interface objects indicating which user interface object has accessibility focus. In some embodiments, when the selection indicator is highlighting a first user interface object (e.g., the first user interface object has accessibility focus) and a select switch input (e.g., a first "on" input) is received, a menu for interacting with the user interface object is displayed. In some embodiments, when the selection indicator is highlighting a first user interface object (e.g., the first user interface object has accessibility focus), the selection indicator moves to a second user interface object automatically after a time referred to as a scanning period (e.g., accessibility focus moves automatically after the scanning period). In some embodiments, when the selection indicator is highlighting a first user interface object, the selection indicator moves to a second user interface object upon receiving a next switch input (e.g., a second "on" input).

As noted above, the media player 500 displays, on the display, a user interface 502. In FIG. 5A, the user interface 502 displays a home user interface that includes a plurality of user interface objects including a set of top movie user interface objects 510 and a plurality of media user interface objects 511A-511D. The plurality of media user interface objects 511A-511D include a movies user interface object 511A, a television shows user interface object 511B, a music user interface object 511C, and an applications user interface object 511D.

In FIG. 5A, a selection indicator surrounds the movies user interface object 511A indicating that the movies user interface object 511A has accessibility focus 596. Although FIG. 5A illustrates the selection indicator as surrounding the movies user interface object 511A, in various implementations, which user interface object has accessibility focus 596 can be indicated in other ways. For example, accessibility focus 596 can be indicated by a selection indicator that surrounds the user interface object, is displayed over the user interface object, or points to a location of the user interface object. As another example, accessibility focus 596 can by indicated by a change in a visual characteristic of the user interface object (e.g., a brightness, a contrast, a color, or a size).

In FIG. 5A, the movies user interface object 511A is increased in size (with respect to a default size and a size of the other media user interface objects 511B-511D) indicating that the movies user interface object 511A has system focus 595. Although FIG. 5A illustrates a change in size of the movies user interface object 511A, in various implementations, which user interface object has system focus 595 can be indicated in other ways as described above with respect to accessibility focus 596.

In various implementations, accessibility focus 596 and system focus 595 can differ. Accessibility focus 596 indicates which user interface object is to be interacted with in an accessibility mode (e.g., using the switch inputs), whereas system focus 595 indicates which user interface object is to be interacted with using traditional input devices. In FIG. 5A, the same user interface object (e.g., the movies user interface object 511A) has both accessibility focus 596 and system focus 595. Thus, an input from the switch device 590 and an input from a remote of the media player 500 will interact with the movies user interface object 511A. As illustrated below, in some implementations, different user interface objects have accessibility focus 595 and system focus 596. Thus, an input from a remote of the media player 500 will interact with a different user interface object than input from the switch device 591.

Figure 5B:
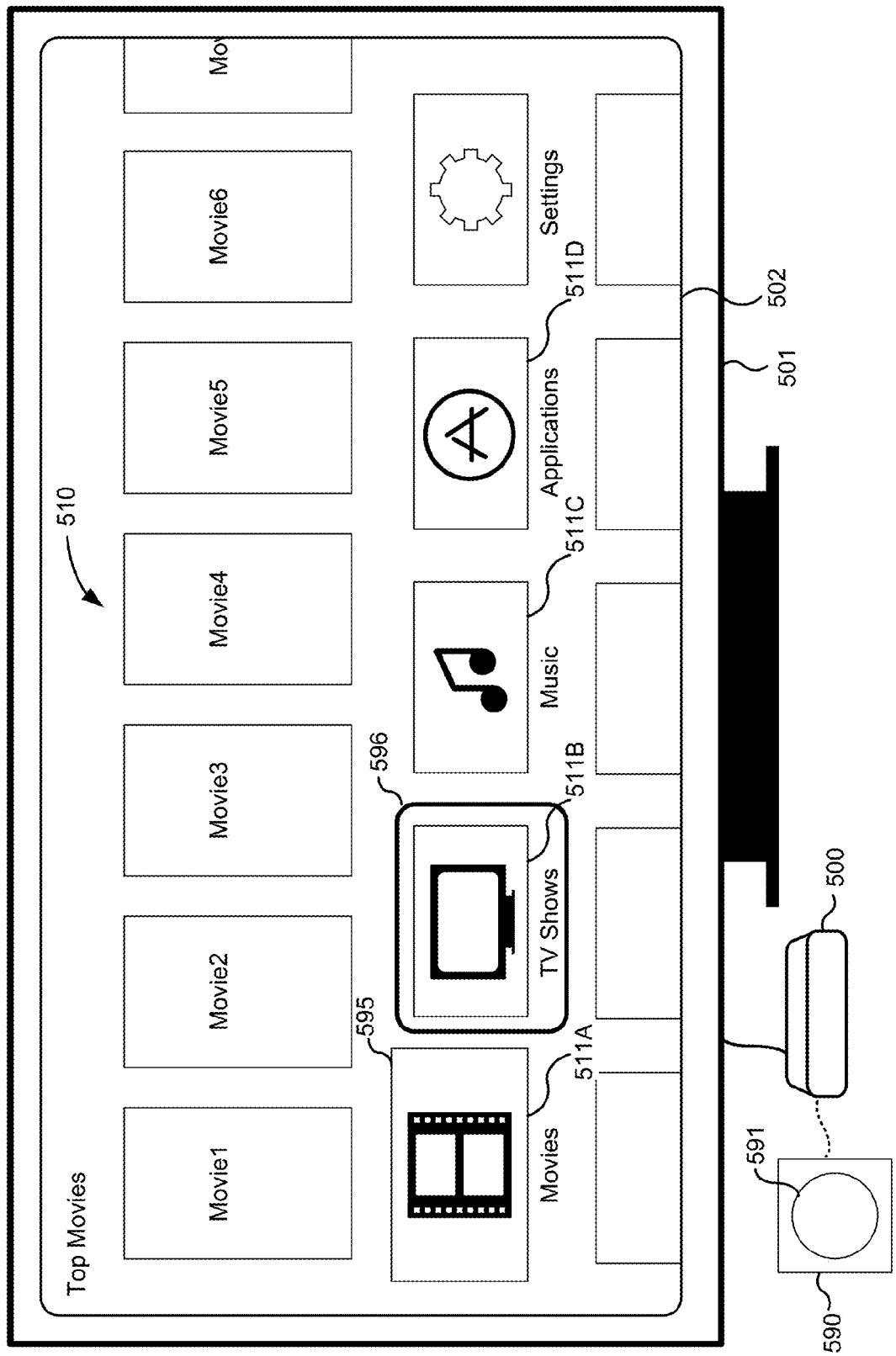

FIG. 5B illustrates the user interface 502 of FIG. 5A after a scanning period. In FIG. 5B, the selection indicator has moved to the television shows user interface object 511B, indicating that the television shows user interface object has accessibility focus 596. Thus, an input from the switch device 590 would interact with the television shows user interface object 511B (e.g., open an accessibility menu or display a television shows user interface). In contrast, the movies user interface object 511A has system focus 595. Thus, a select input from a remote of the media player 500 would interact with the movies user interface object 511A (e.g., display a movies user interface).

Figure 5C:
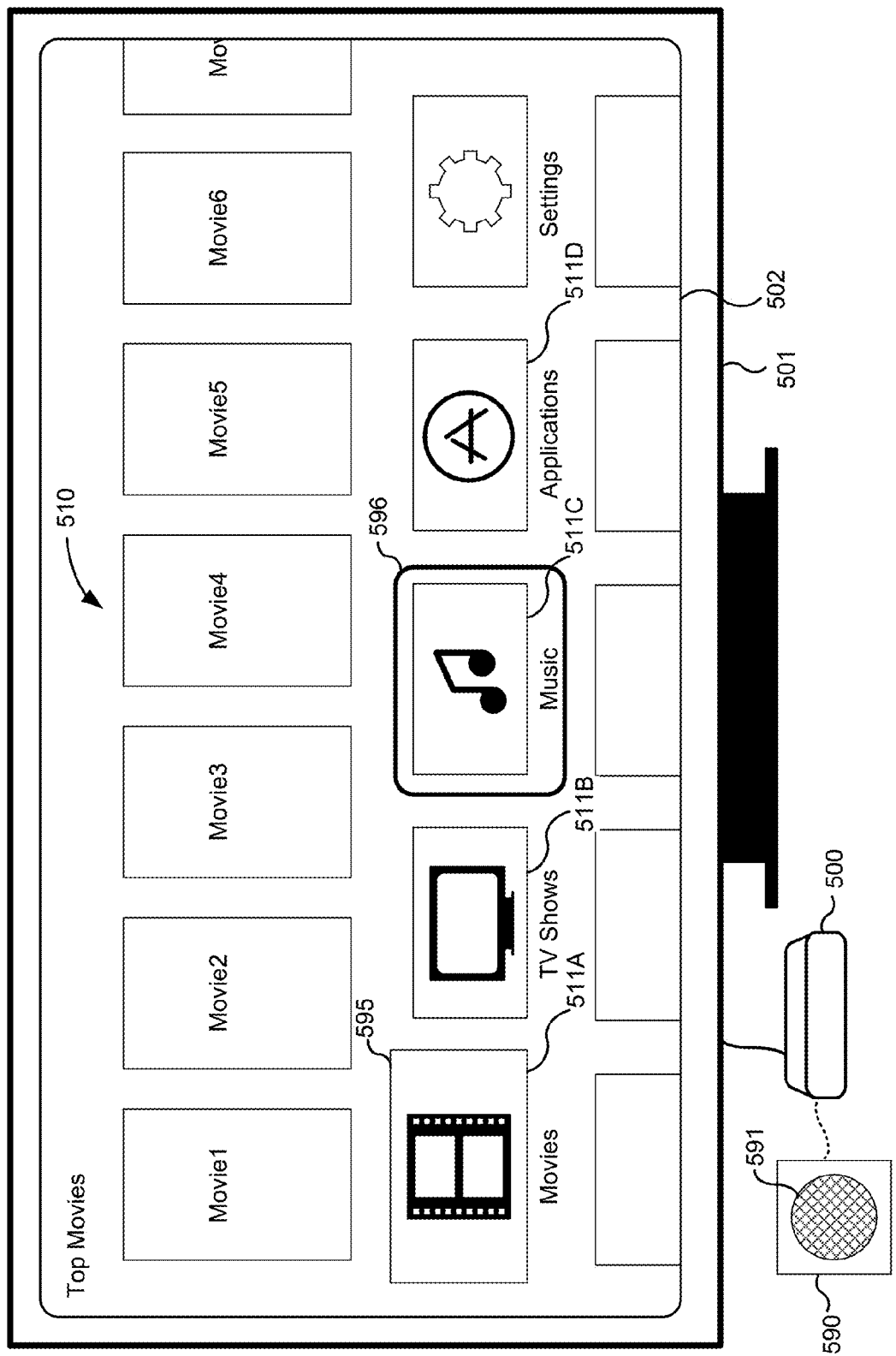

FIG. 5C illustrates that user interface 502 of FIG. 5B after a scanning period. In FIG. 5C, the selection indicator has moved to the music user interface object 511C, indicating that the music user interface object 511C has accessibility focus 596. Thus, FIGS. 5A-5C illustrate that, in various implementations, the media player 500 sequentially moves accessibility focus 596 through the plurality of user interface objects in a predefined order. In some embodiments, and as illustrated in FIGS. 5A-5AY, accessibility focus is moved automatically every scanning period. In some embodiments, accessibility focus is moved, additionally or alternatively, in response to a next switch input (e.g., from a second switch of the switch device 590).

FIG. 5C illustrates that the first switch 591 of the switch device 590 is activated, resulting in a select input detected by the media player 500.

Figure 5D:
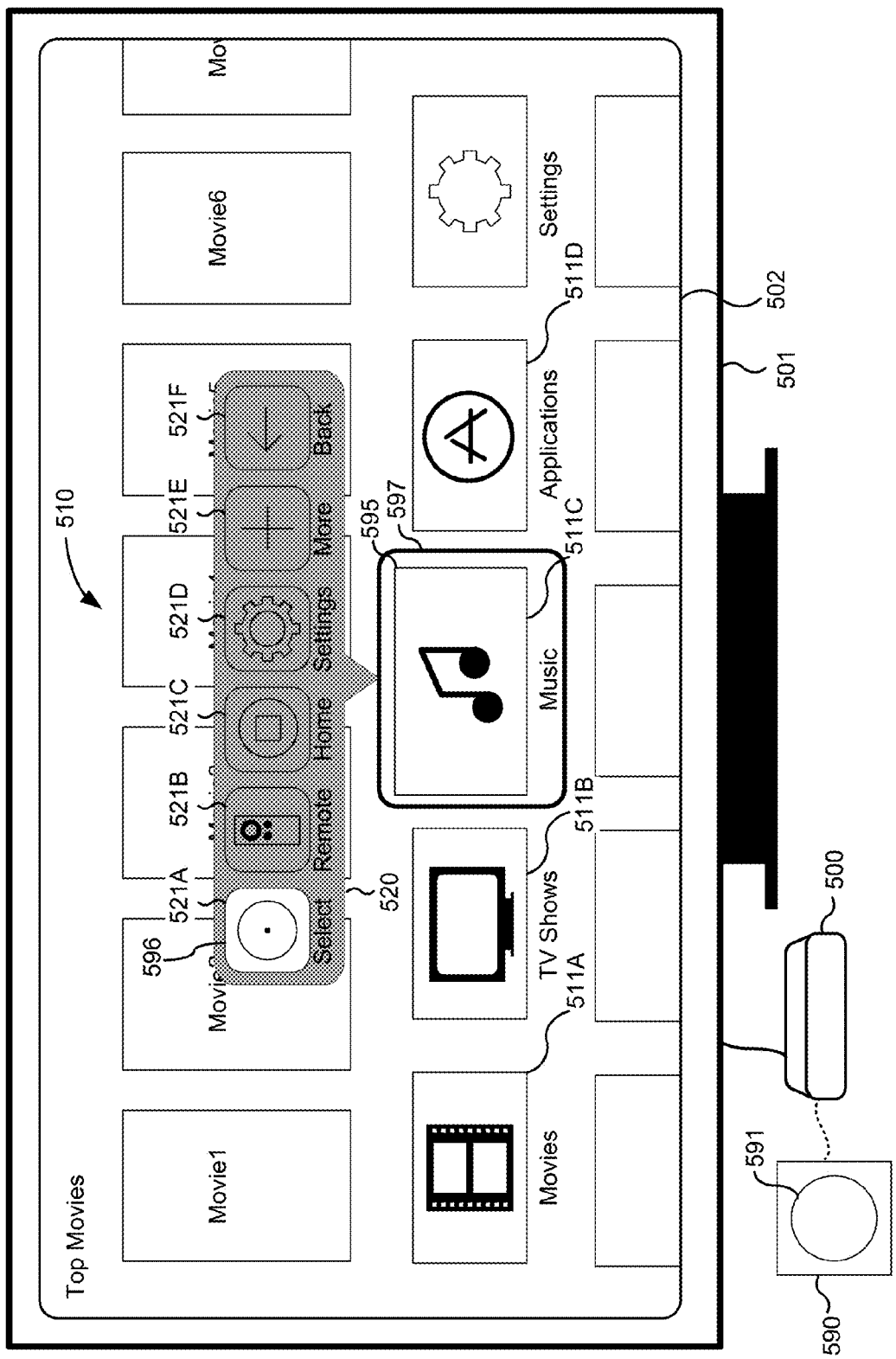

FIG. 5D illustrates the user interface 502 of FIG. 5C in response to detecting the select input. In FIG. 5D, the music user interface object 511C is increased in size, indicating that the music user interface object 511C has system focus 595. Thus, in some embodiments, in response to detecting an input selecting one of the plurality of user interface objects, the media player 500 moves system focus 595 to the one of the plurality of user interface objects.

In response to the input selecting the music user interface object 511C, the user interface 502 includes an accessibility menu 520 including a plurality of accessibility user interface objects 521A-521F. The plurality of accessibility user interface objects 521A-521F represent one or more selectable options for interacting with the selected user interface object (e.g., the music user interface object 511C) and a selectable option for displaying a virtual remote (as described in detail below). The plurality of accessibility user interface objects include a select user interface object 521A for selecting the music user interface object 511C in a similar manner as a select input from a remote of the media player 500 when the music user interface object 511C has system focus 595. The plurality of accessibility user interface objects includes a virtual remote activation user interface object 521B for displaying a virtual remote. The plurality of accessibility user interface objects includes a home user interface object 521C for displaying the home user interface. The plurality of accessibility user interface objects includes a settings user interface object 521E for displaying a settings user interface including options to change settings of the media player 500. The plurality of accessibility user interface objects includes a more user interface object 521E for displaying additional (or other) accessibility user interface objects in the accessibility menu 520. The plurality of accessibility user interface objects includes a back user interface object 521F for exiting the accessibility menu 520.

In FIG. 5D, the select user interface object 521A has accessibility focus 596 as indicated by the highlighting (e.g., different color) of the select user interface object 521A. A selection indicator 597 is displayed surrounding the music user interface object 511C indicating that the accessibility user interface objects of the accessibility menu 520 are configured to interact with the music user interface object 511C.

Figure 5E:
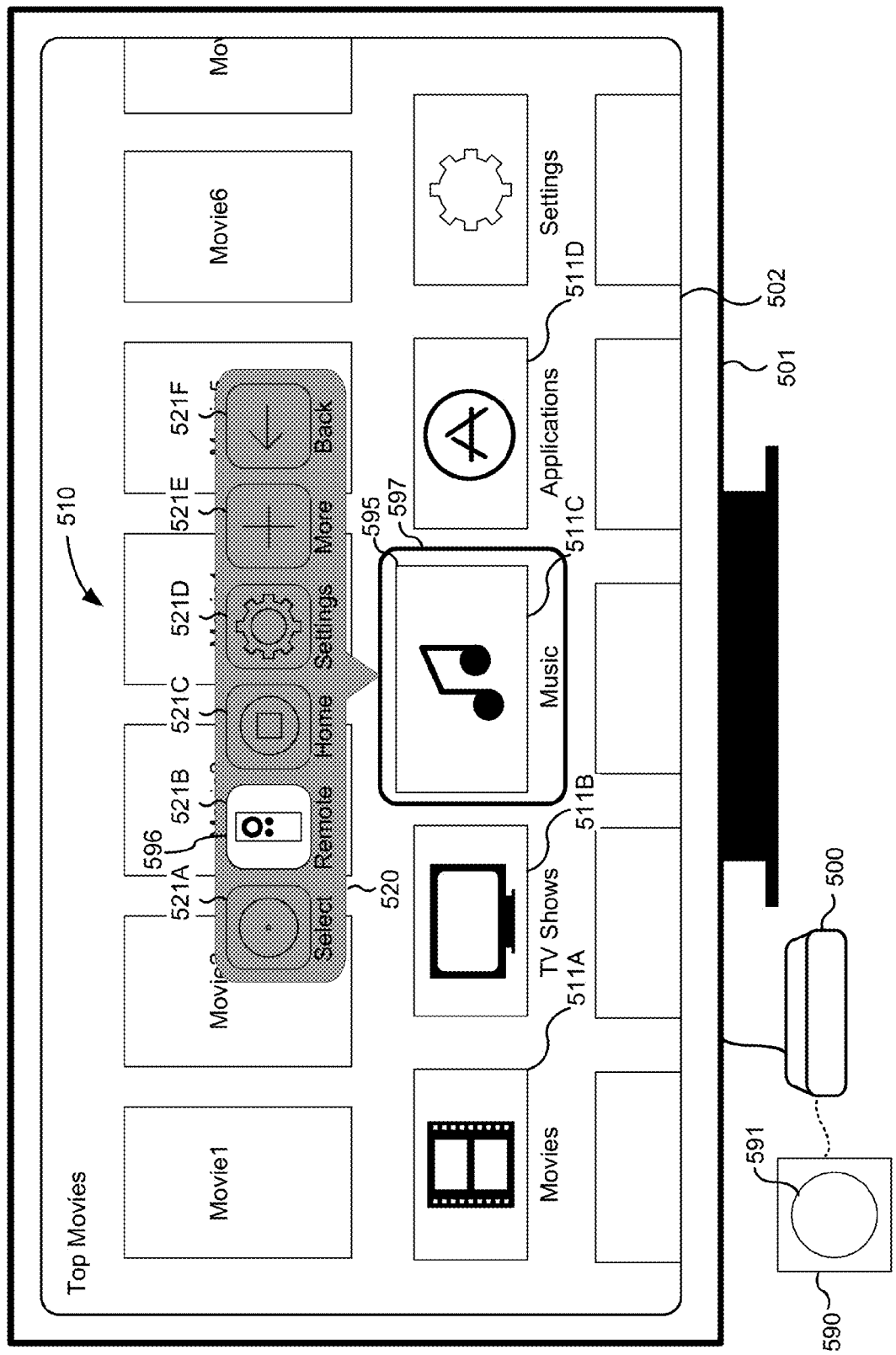
Figure 5F:
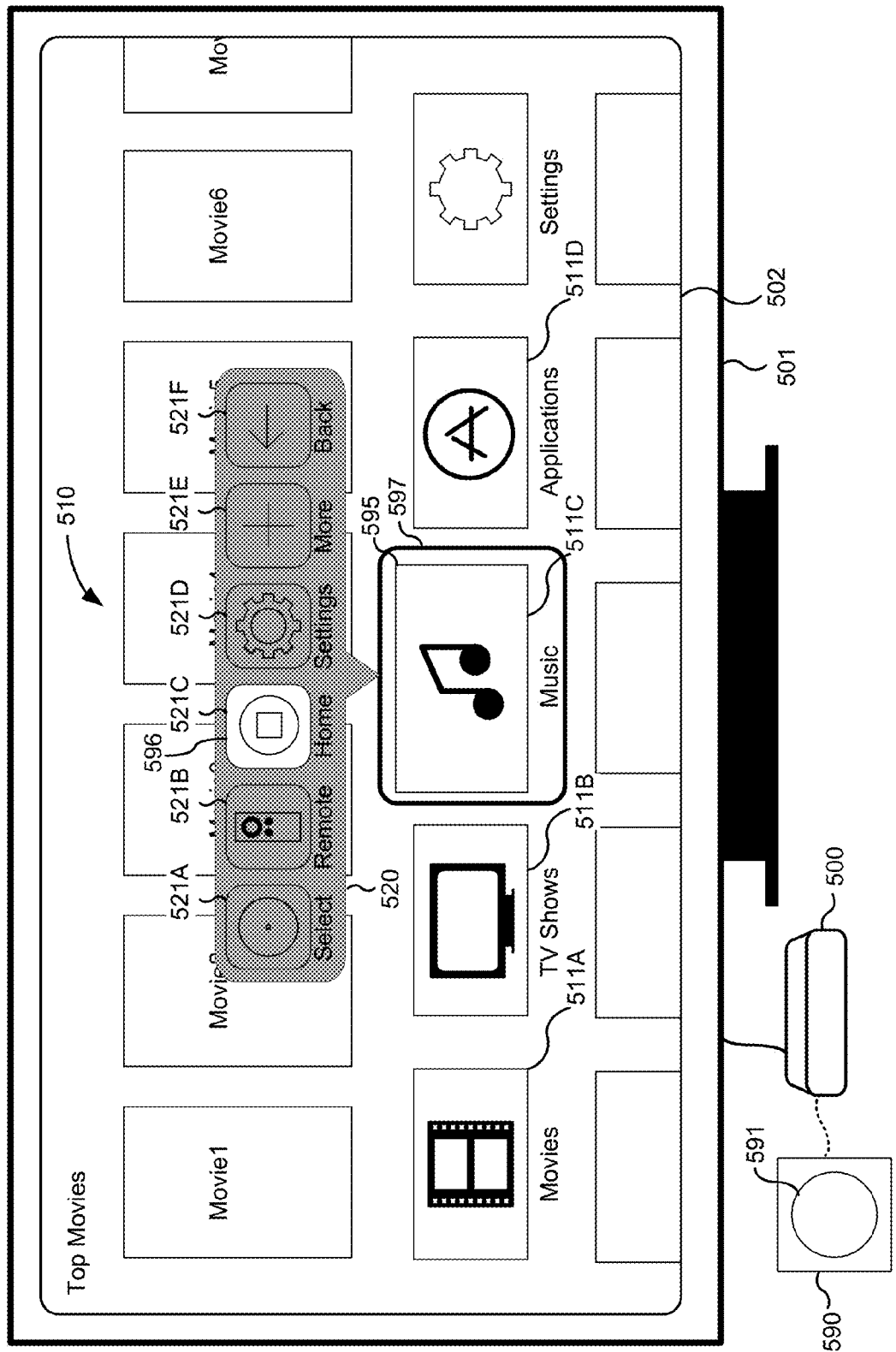
Figure 5G:
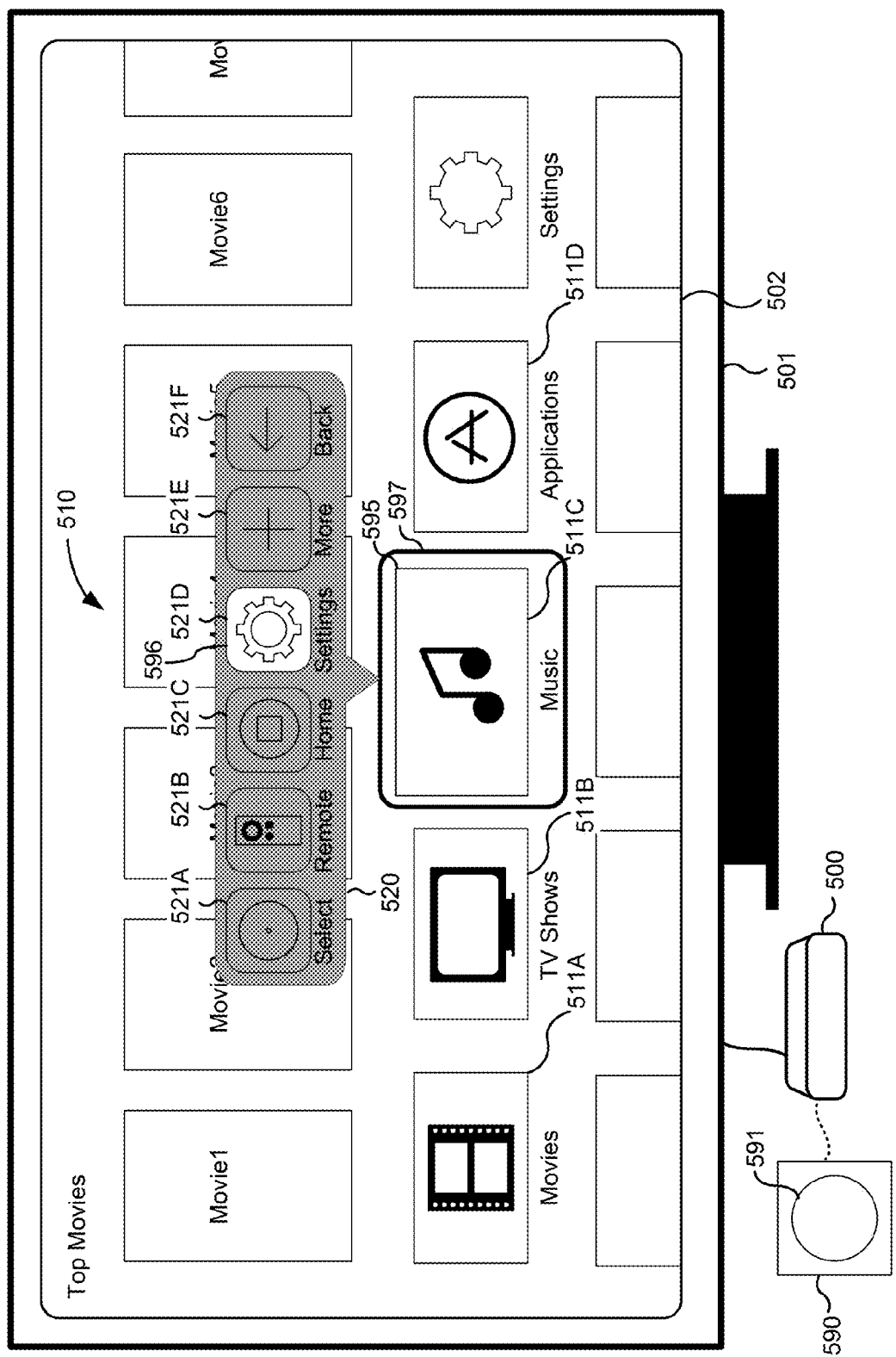
Figure 5H:
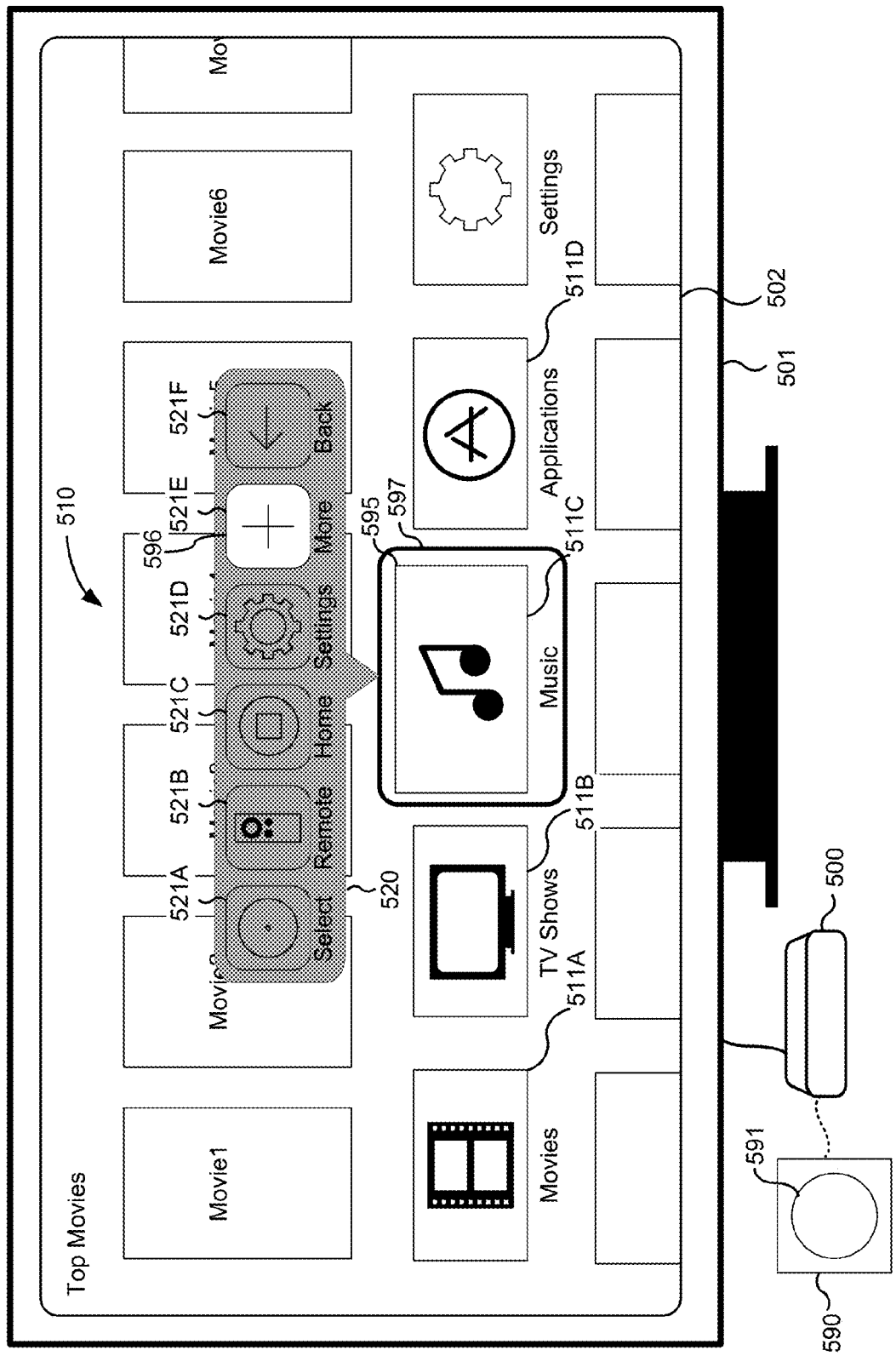
Figure 5I:
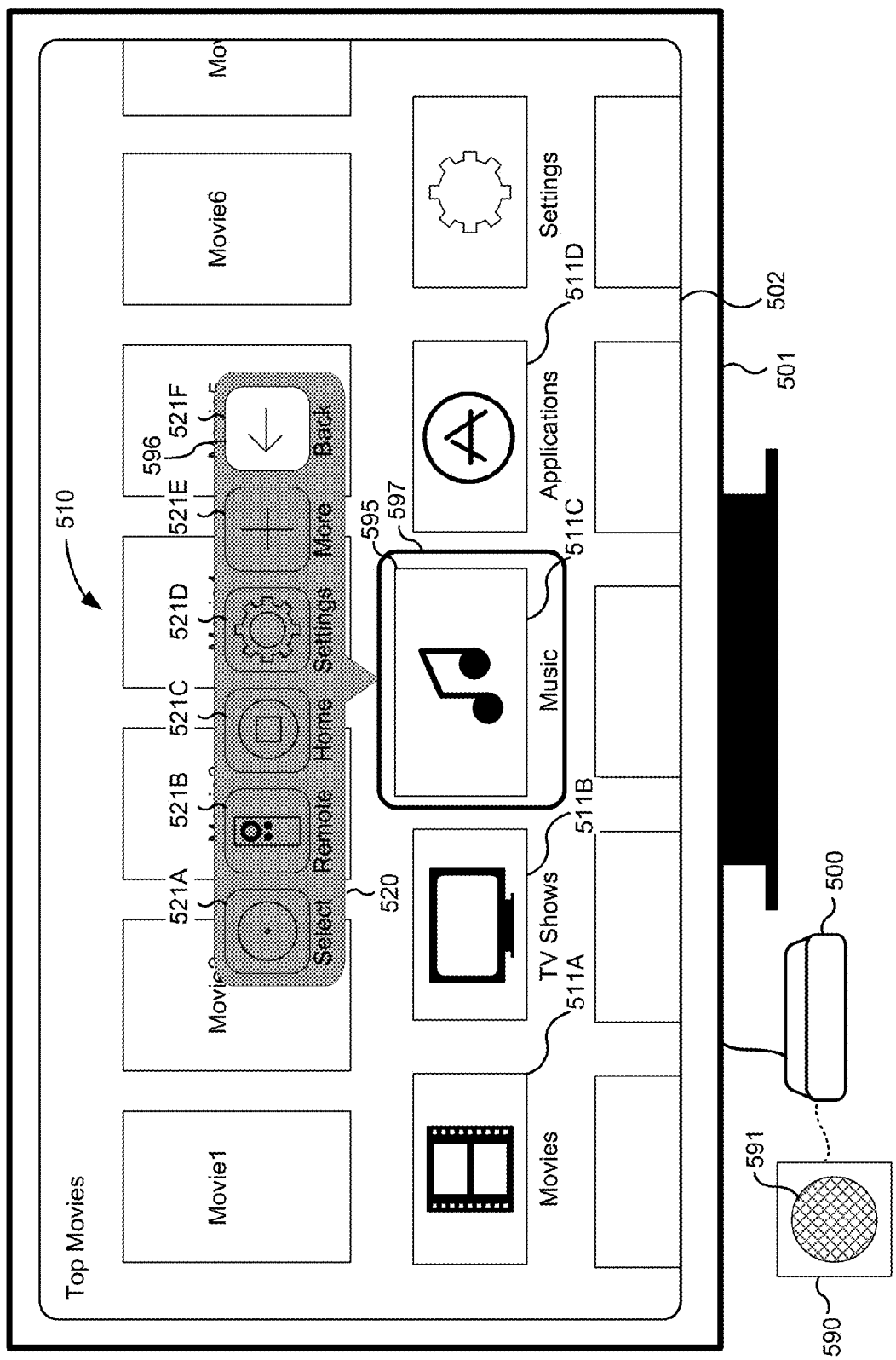

FIG. 5E illustrates the user interface 502 of FIG. 5D after a scanning period. In FIG. 5E, the virtual remote activation user interface object 521B has accessibility focus 596. FIG. 5F illustrates the user interface 502 of FIG. 5E after a scanning period. In FIG. 5F, the home user interface object 521C has accessibility focus 596. FIG. 5G illustrates the user interface 502 of FIG. 5F after a scanning period. In FIG. 5G, the settings user interface object 521D has accessibility focus 596. FIG. 5H illustrates the user interface 502 of FIG. 5G after a scanning period. In FIG. 5H, the more user interface object 521E has accessibility focus 596. FIG. 5I illustrates the user interface 502 of FIG. 5H after a scanning period. In FIG. 5I, the back user interface object 521F has accessibility focus 596.

Thus, FIGS. 5D-5I illustrates that, in various implementations, the media player 500 sequentially moves accessibility focus 596 through the plurality of accessibility user interface objects in a predefined order. In particular, while displaying the accessibility menu 520 for a selected user interface object, the media player 500 sequentially moves accessibility focus 596 through the selectable options in the accessibility menu 520. In some embodiments, and as illustrated in FIGS. 5A-5AY, accessibility focus 596 is moved automatically every scanning period. In some embodiments, accessibility focus 596 is moved, additionally or alternatively, in response to a next switch input (e.g., from a second switch of the switch device 590).

FIG. 5I illustrates that the first switch 591 of the switch device 590 is activated, resulting in a select input detected by the media player 500.

Figure 5J:
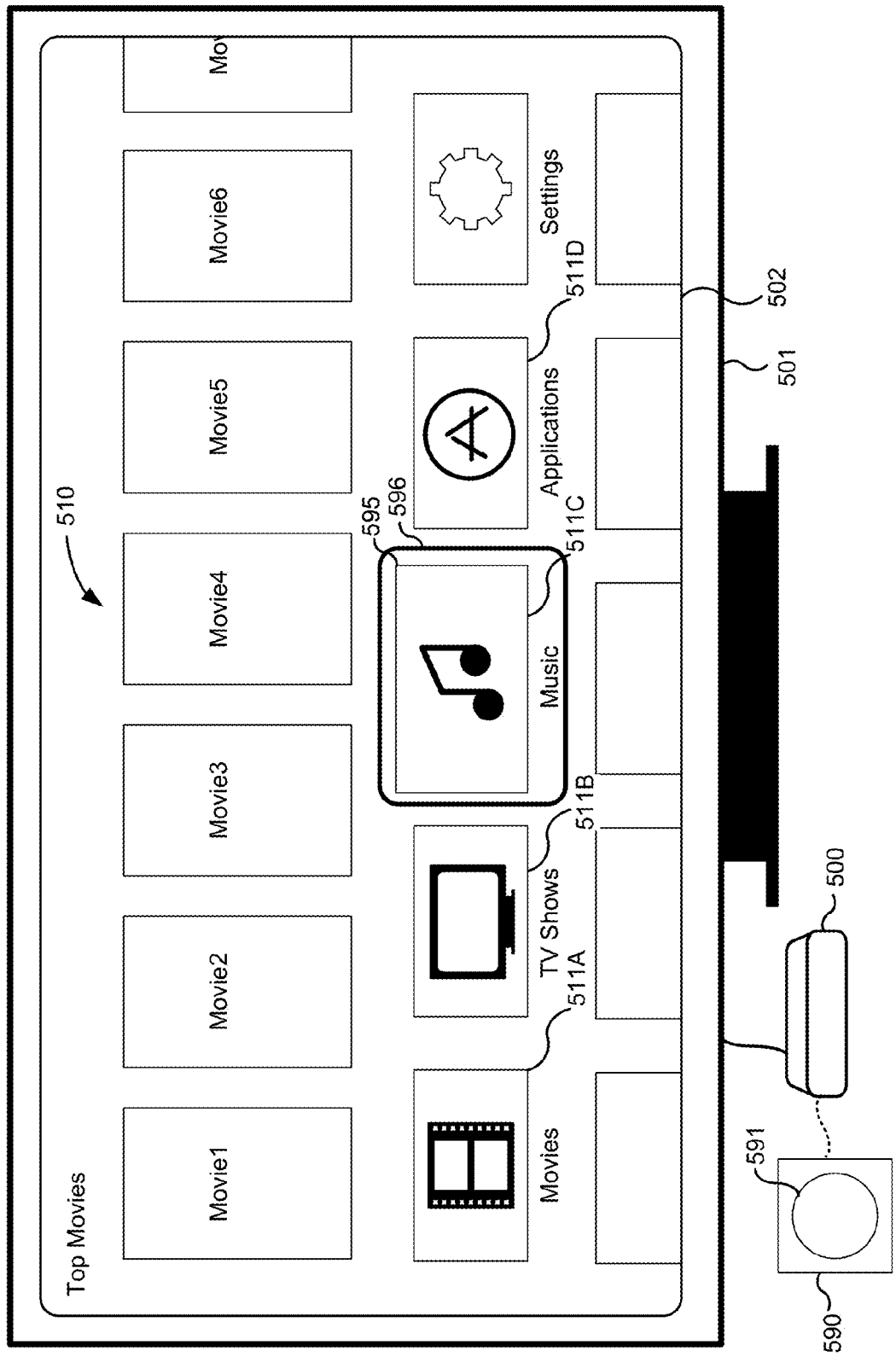

FIG. 5J illustrates the user interface 502 of FIG. 5I in response to detecting the select input. In FIG. 5J, the accessibility menu 520 is no longer displayed. However, the music user interface object 511C retains both system focus 595 and accessibility focus 596.

FIG. 5K illustrates the user interface 502 of FIG. 5J after a scanning period. In FIG. 5K, accessibility focus 596 is moved to the applications user interface object 511D while system focus 595 remains at the music user interface object 511C.

FIG. 5K illustrates that the first switch 591 of the switch device 590 is activated, resulting in a select input detected by the media player 500.

Figure 5L:
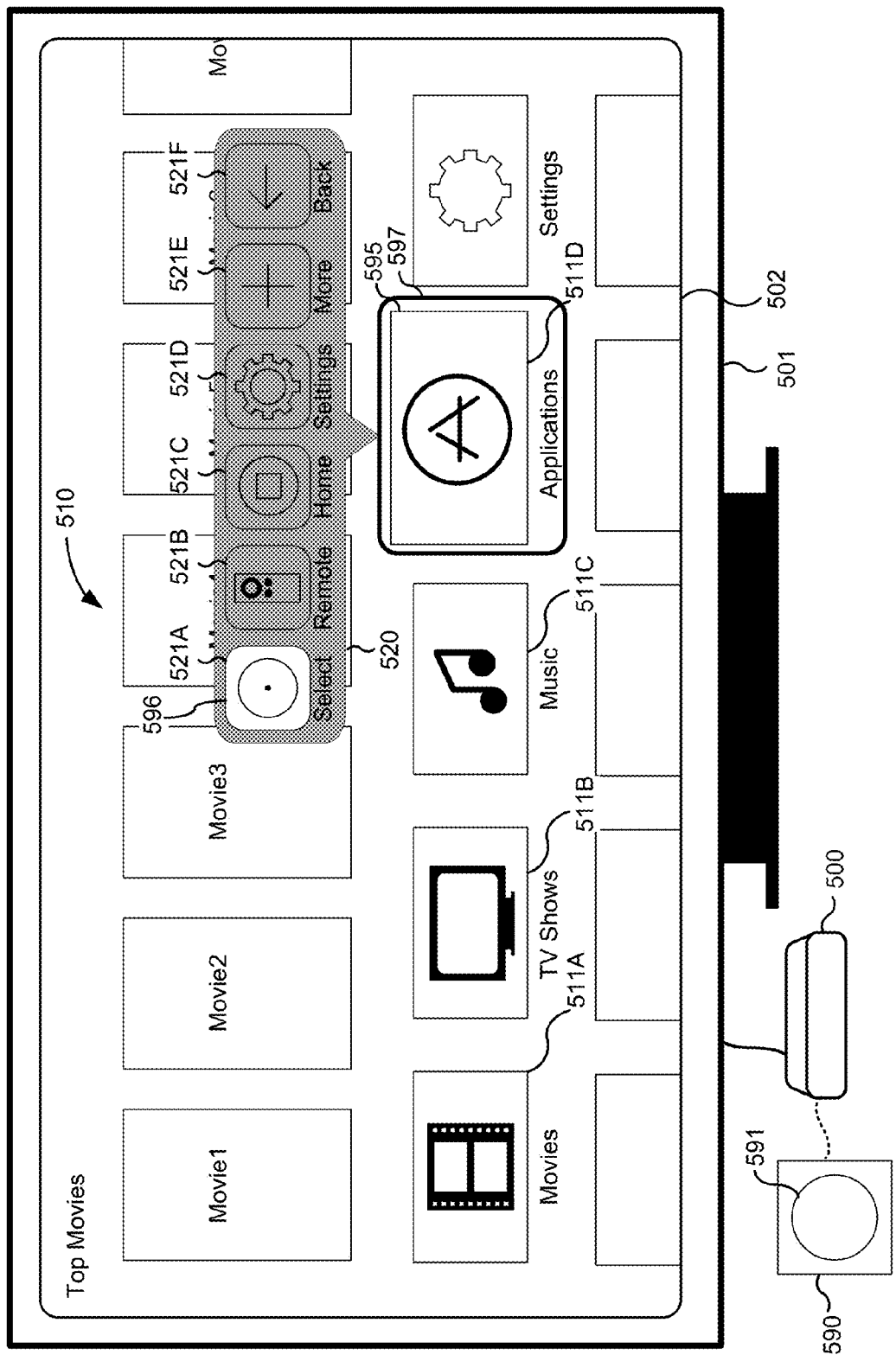

FIG. 5L illustrates the user interface 502 of FIG. 5K in response to detecting the select input. In FIG. 5L, the applications user interface object 511D is increased in size, indicating that the applications user interface object 511D has system focus 595. Further, the accessibility menu 520 is displayed with respect to the applications user interface object 511D (as indicated by the selection indicator 597 surrounding the applications user interface object 511D). In FIG. 5L, select user interface object 521A has accessibility focus 596 as indicated by the highlighting (e.g., different color) of the select user interface object 521A.

Figure 5M:
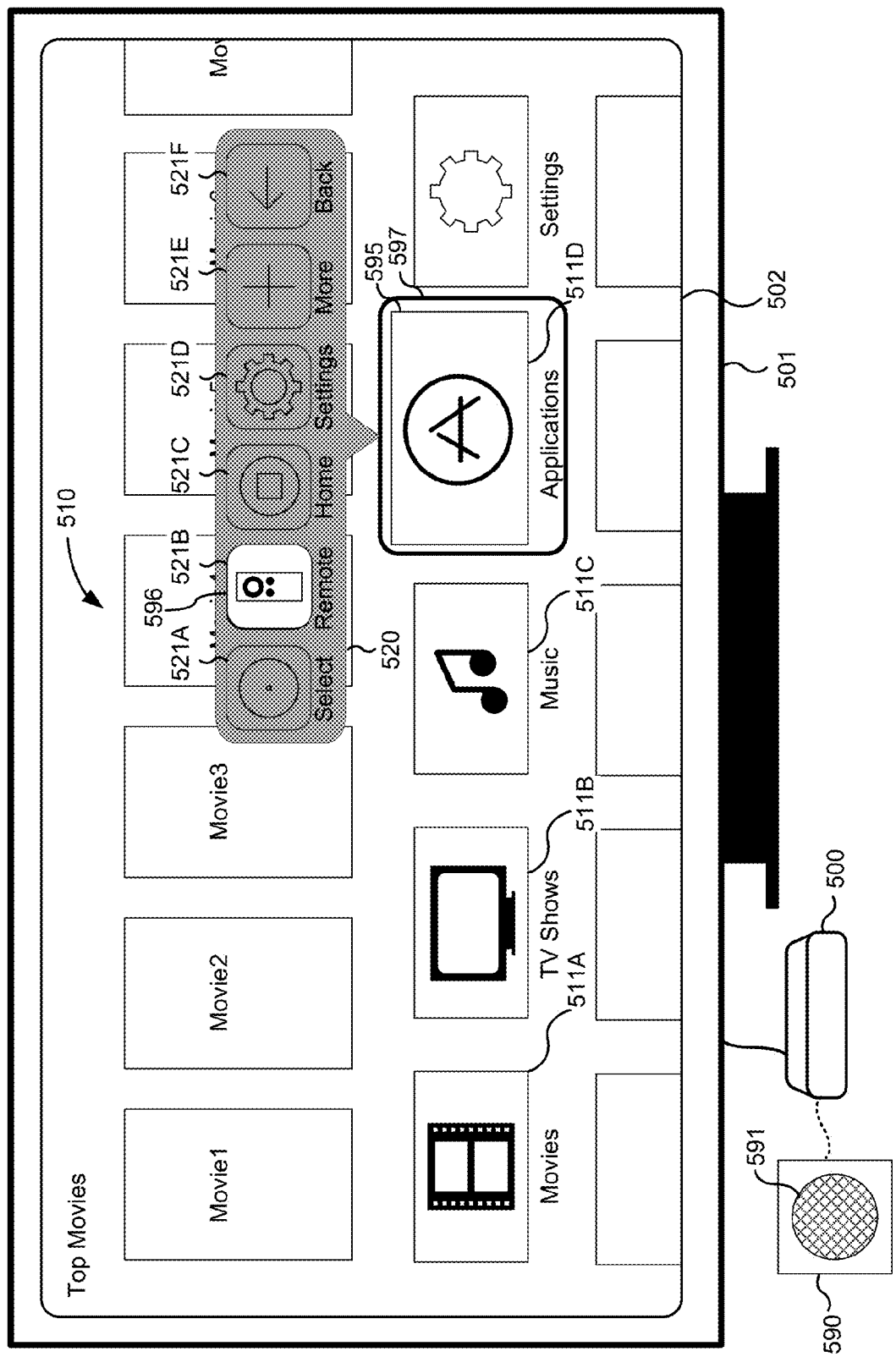

FIG. 5M illustrates the user interface 502 of FIG. 5L after a scanning period. In FIG. 5M, the virtual remote activation user interface object 521B has accessibility focus 596. FIG. 5M illustrates that the first switch 591 of the switch device 590 is activated, resulting in a select input detected by the media player 500.

Figure 5N:
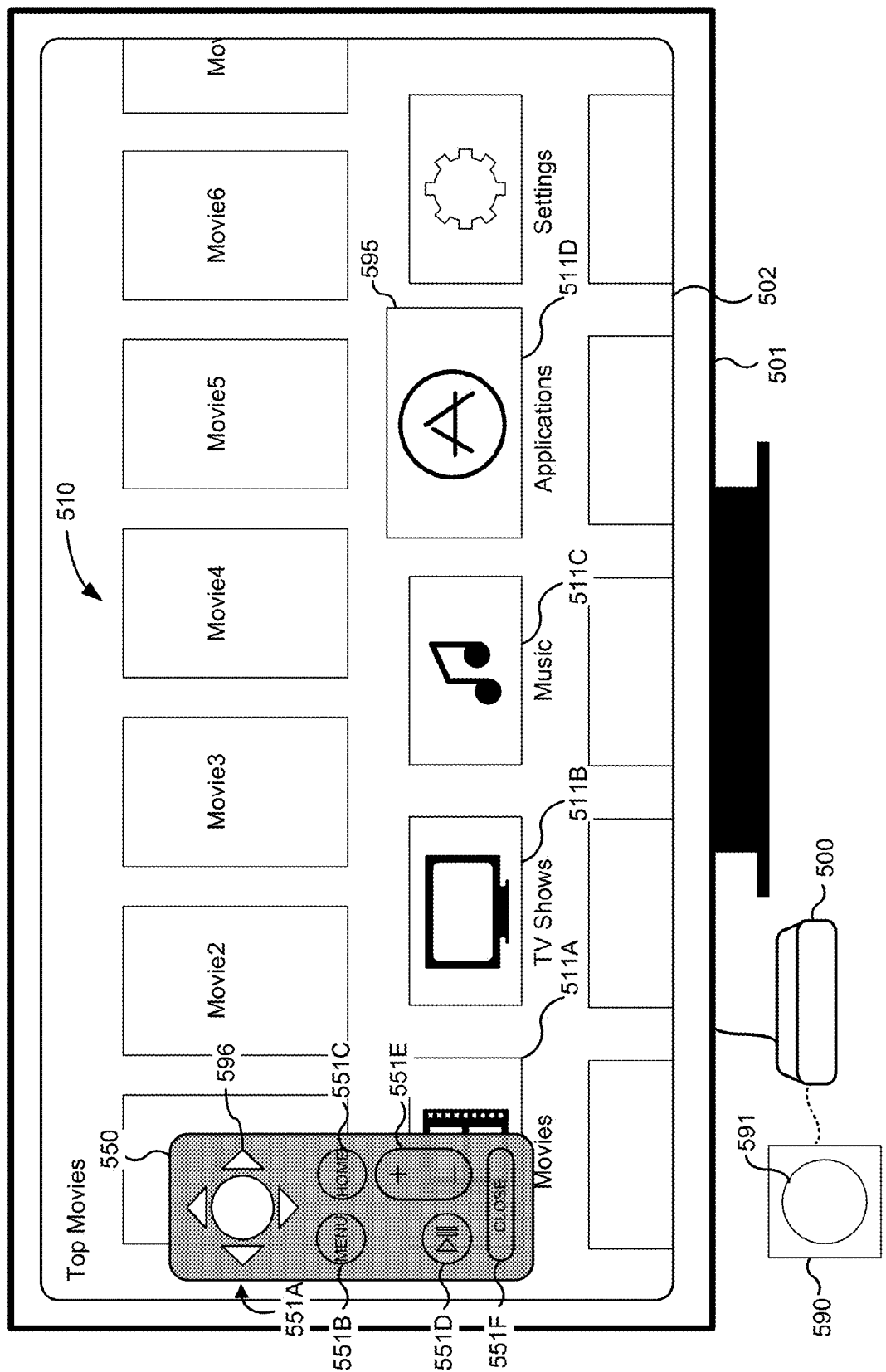

FIG. 5N illustrates the user interface 502 of FIG. 5M in response to detecting the select input. In FIG. 5N, the selection indicator is no longer displayed and the accessibility menu 520 is replaced by a virtual remote 550. The virtual remote 550 is emulative of a remote of media player 500. The virtual remote 550 includes a number of virtual remote user interface object groups, each including one or more virtual remote user interface objects.

The virtual remote 550 includes a directional user interface object group 551A including a number of directional user interface objects and a select user interface object. The virtual remote 550 includes a device user interface object group including a menu user interface object 551B for displaying a device menu and a home user interface object 551C for displaying the home user interface. The virtual remote 550 includes a playback user interface object group including a pause/play user interface object 551D for toggling between pausing and playback of a media item and a volume user interface object 551E for increasing or decreasing the volume of a media item. The virtual remote 550 includes a close user interface object 551F for closing the virtual remote 550 (and returning the selection indicator to the screen).

In FIG. 5N, the directional user interface object group 551A is highlighted, indicating that the directional user interface object group has accessibility focus 596.

Figure 5O:
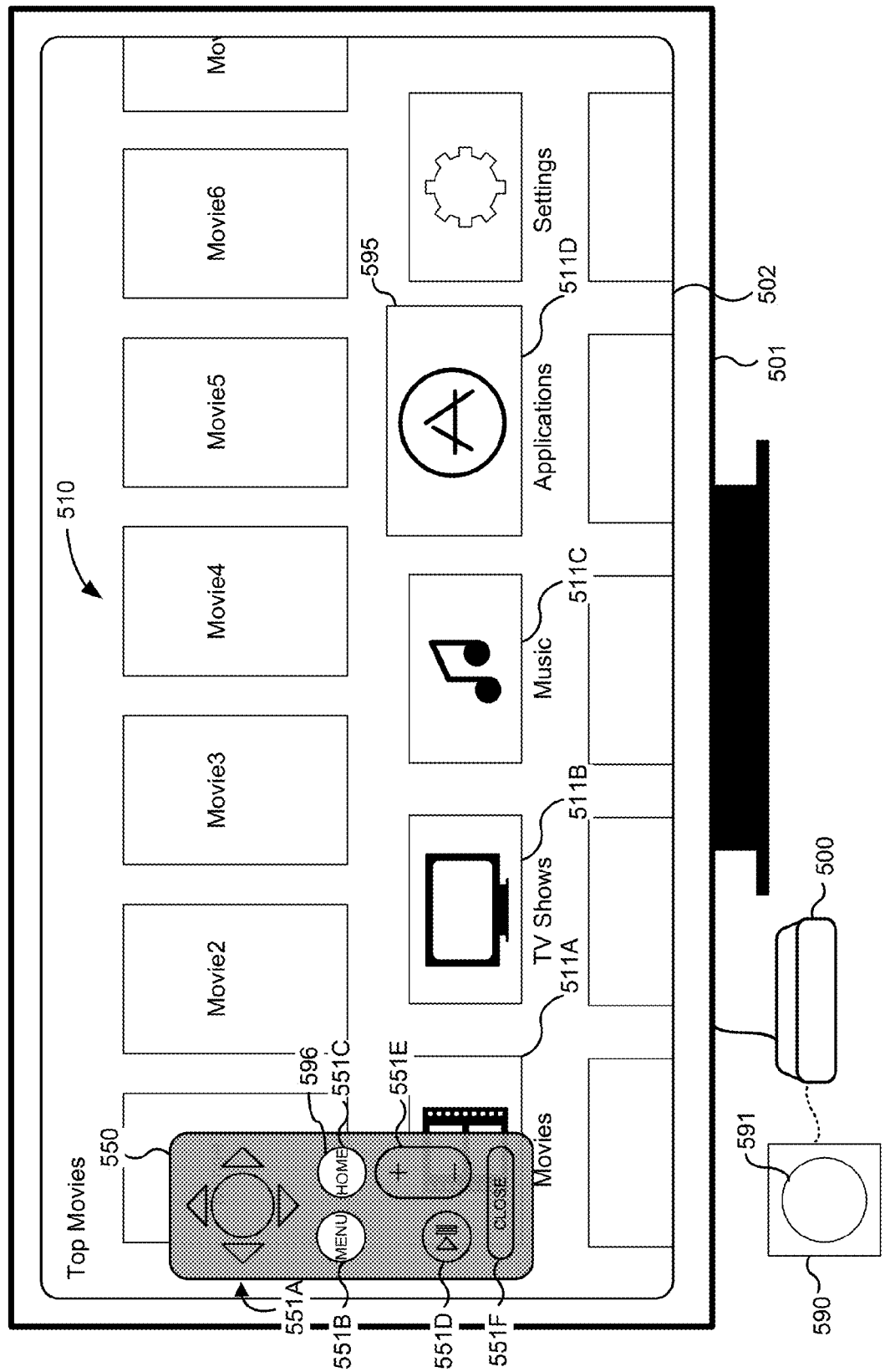
Figure 5P:
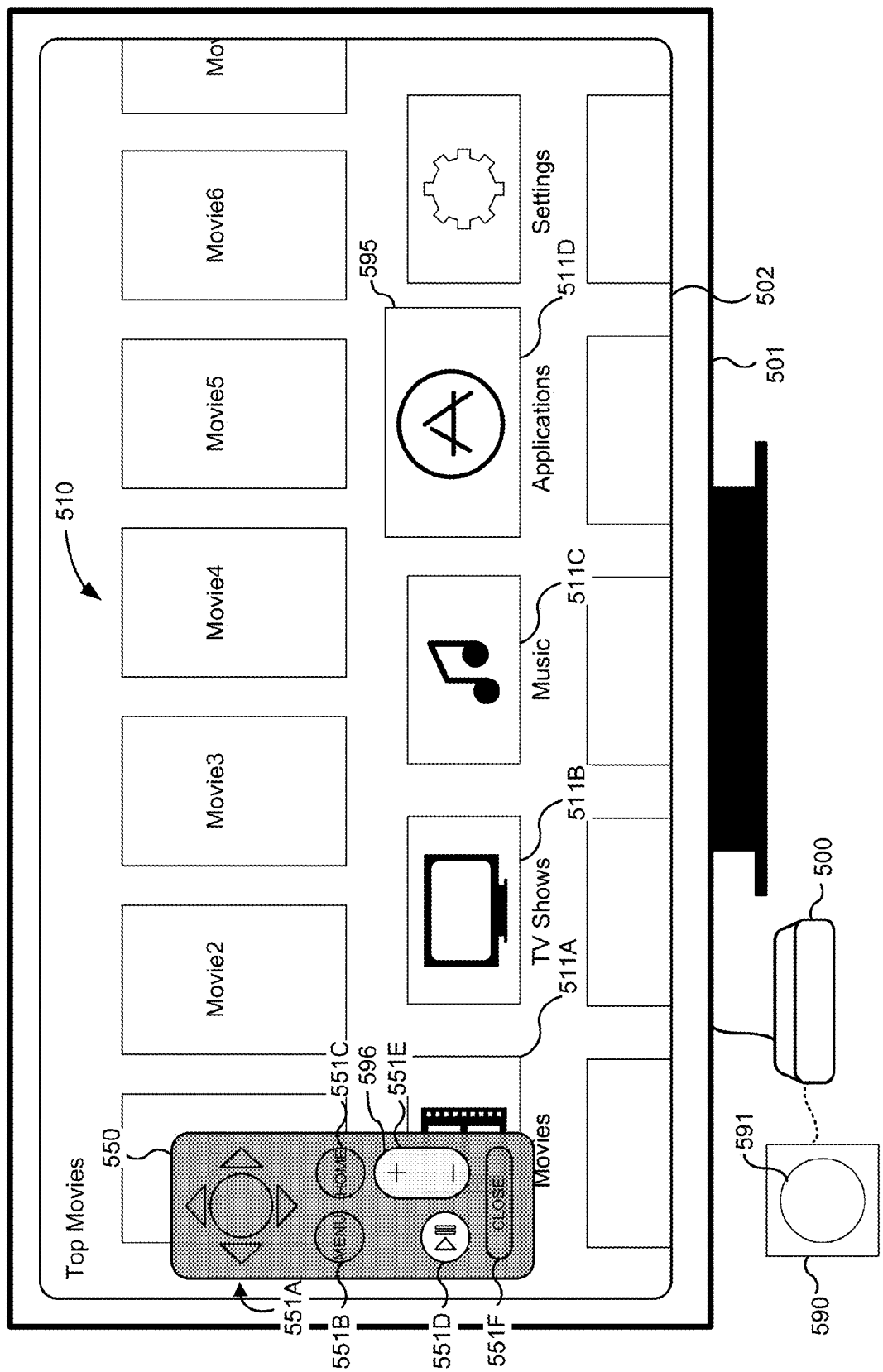
Figure 5Q:
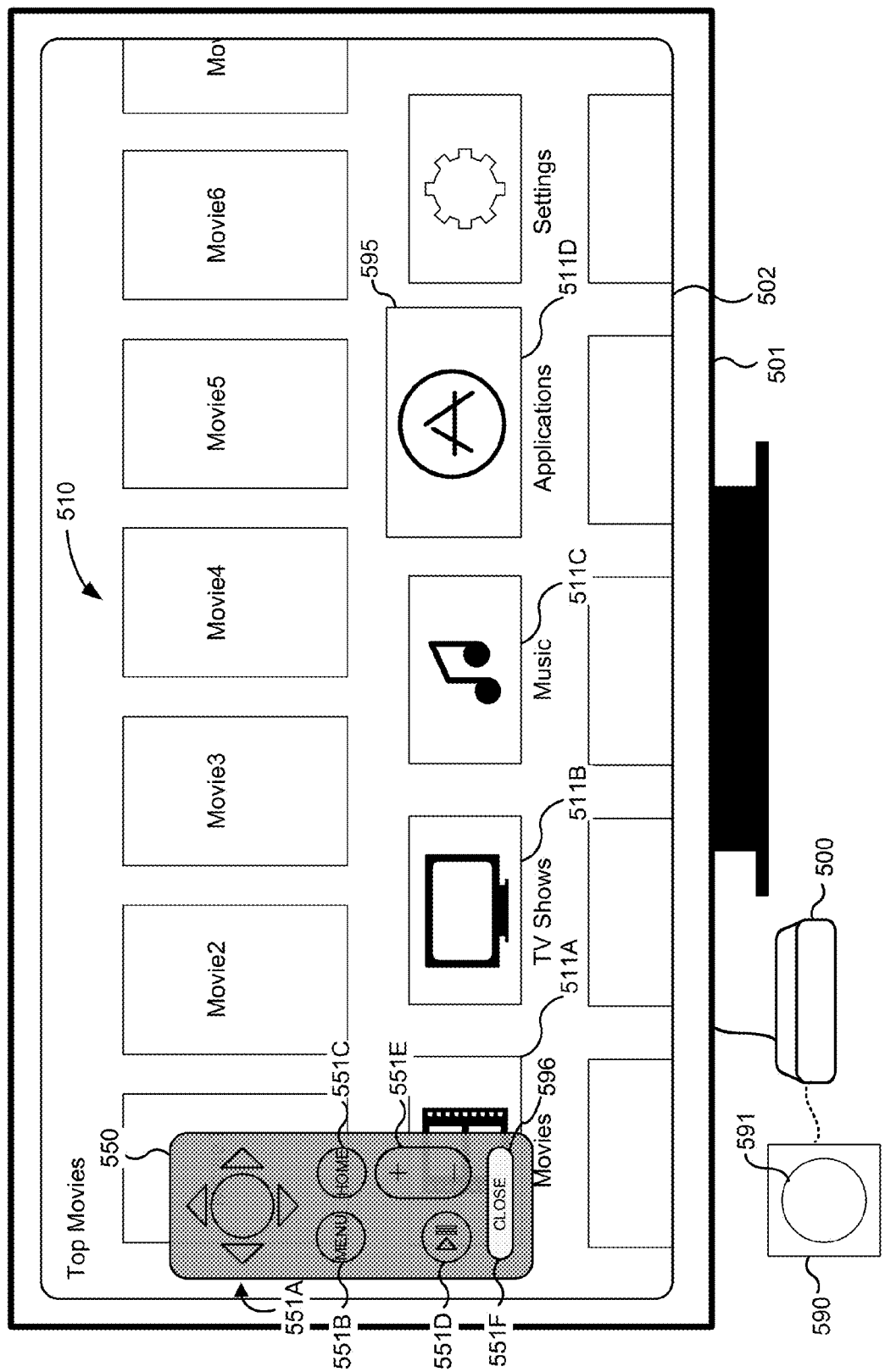
Figure 5R:
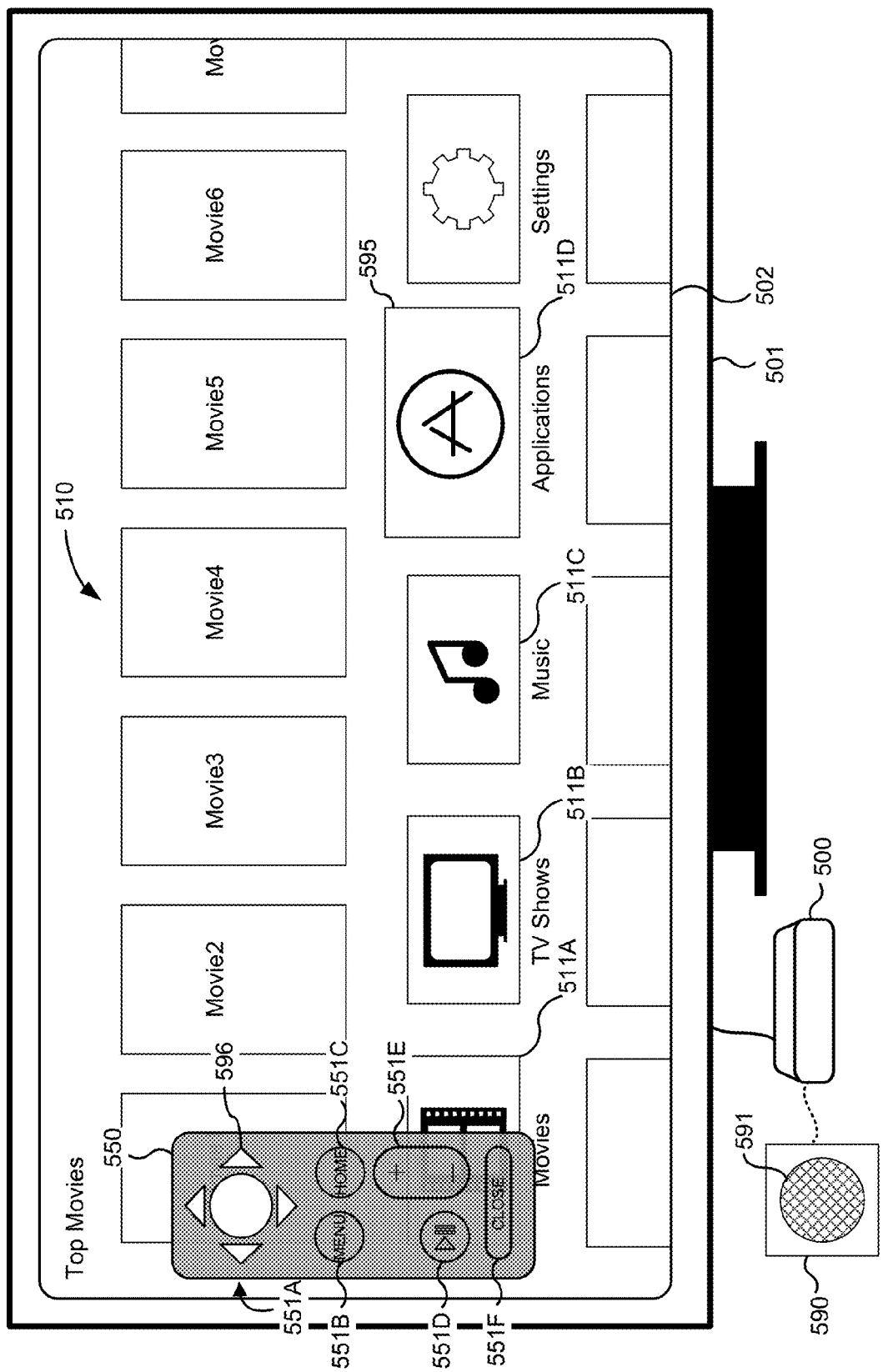

FIG. 5O illustrates the user interface 502 of FIG. 5N after a scanning period. In FIG. 5O, the device user interface object group of the virtual remote 550 has accessibility focus 596. FIG. 5P illustrates the user interface 502 of FIG. 5O after a scanning period. In FIG. 5P, the playback user interface object group of the virtual remote 550 has accessibility focus 596. FIG. 5Q illustrates the user interface 502 of FIG. 5P after a scanning period. In FIG. 5Q, the close user interface object has accessibility focus 596. FIG. 5R illustrates the user interface 502 of FIG. 5Q after a scanning period. In FIG. 5R, the directional user interface object group 551A, again, has accessibility focus 596.

Thus, FIGS. 5O-5Q illustrate that, in various implementations, the media player 500 sequentially moves accessibility focus 596 through the plurality of user interface object groups of the virtual remote 550 in a predefined order. In particular, while displaying the virtual remote 550, the media player 500 sequentially moves accessibility focus 596 through the user interface object groups of the virtual remote 550. In some embodiments, and as illustrated in FIGS. 5A-5AY, accessibility focus 596 is moved automatically every scanning period. In some embodiments, accessibility focus 596 is moved, additionally or alternatively, in response to a next switch input (e.g., from a second switch of the switch device 590).

FIG. 5R illustrates that the first switch 591 of the switch device 590 is activated, resulting in a select input detected by the media player 500.

Figure 5S:
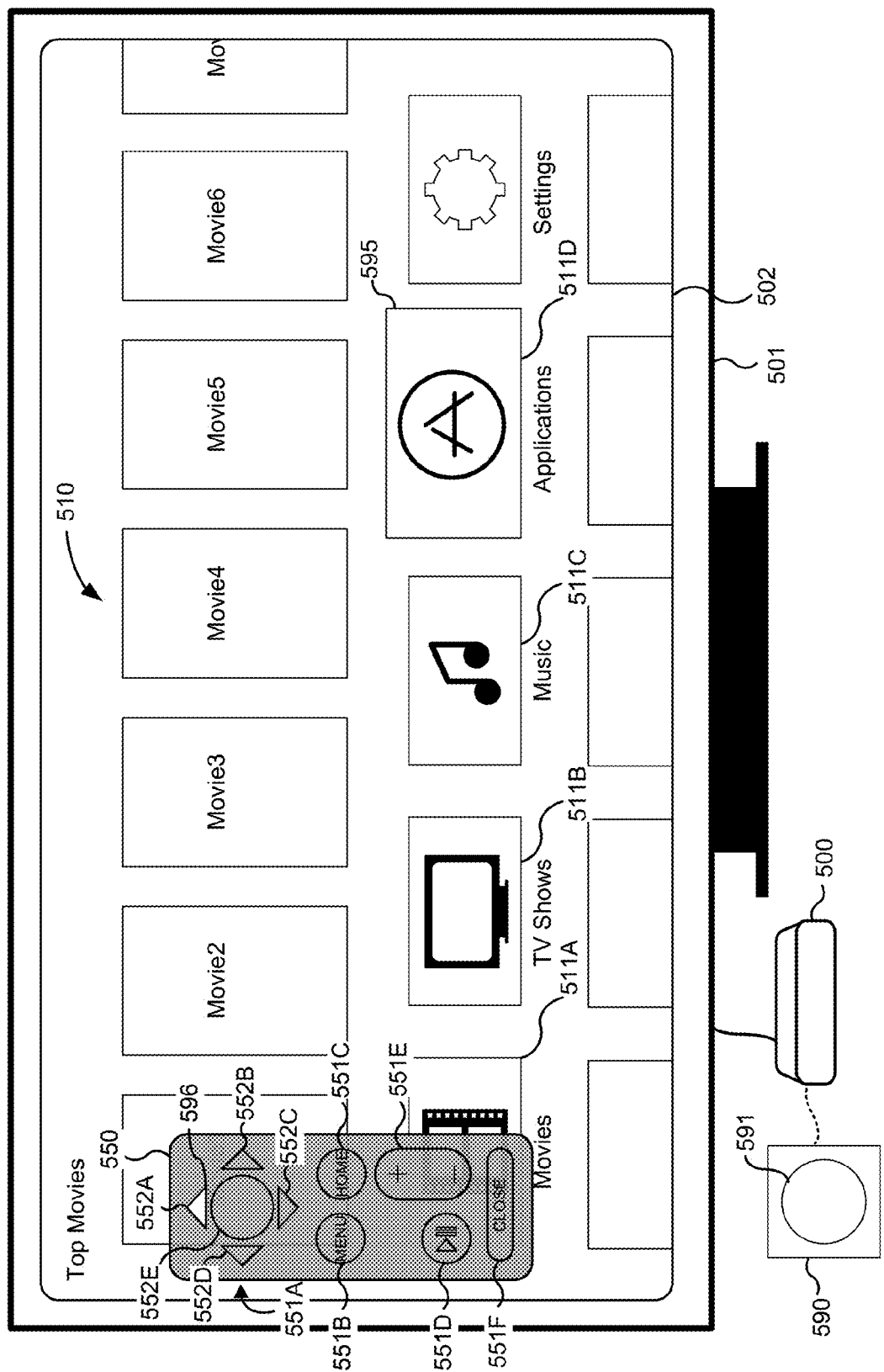
Figure 5T:
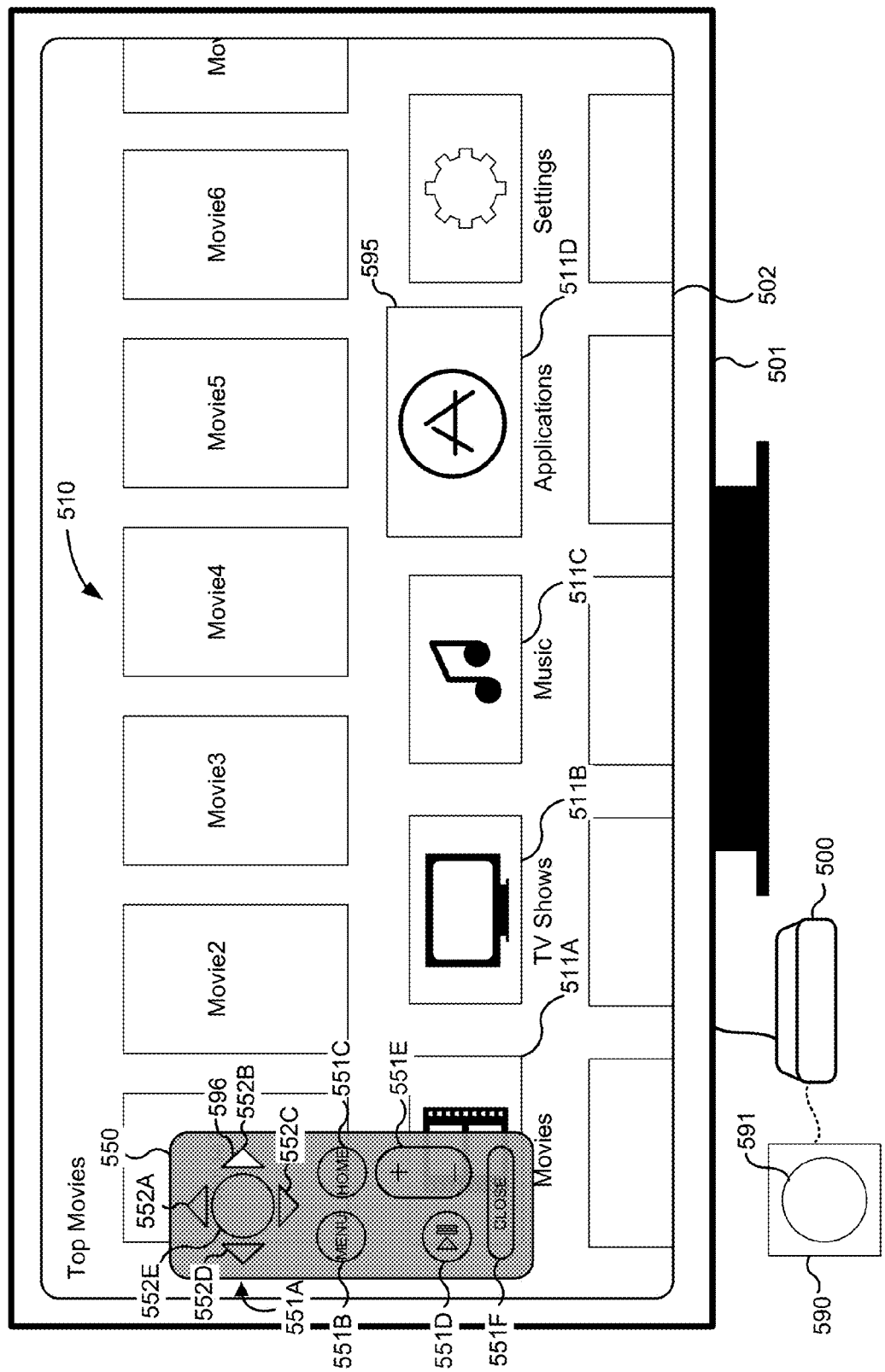
Figure 5U:
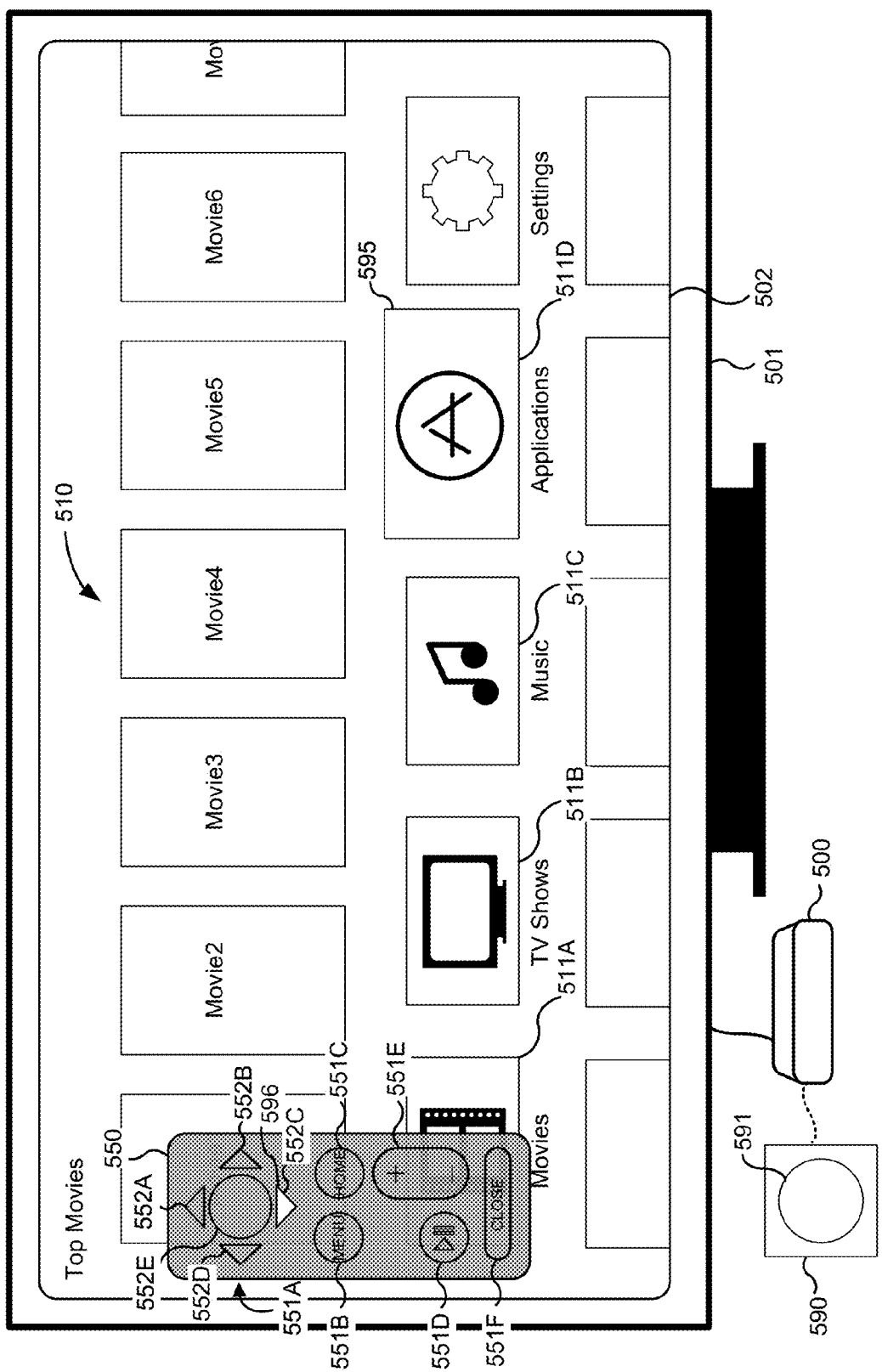
Figure 5V:
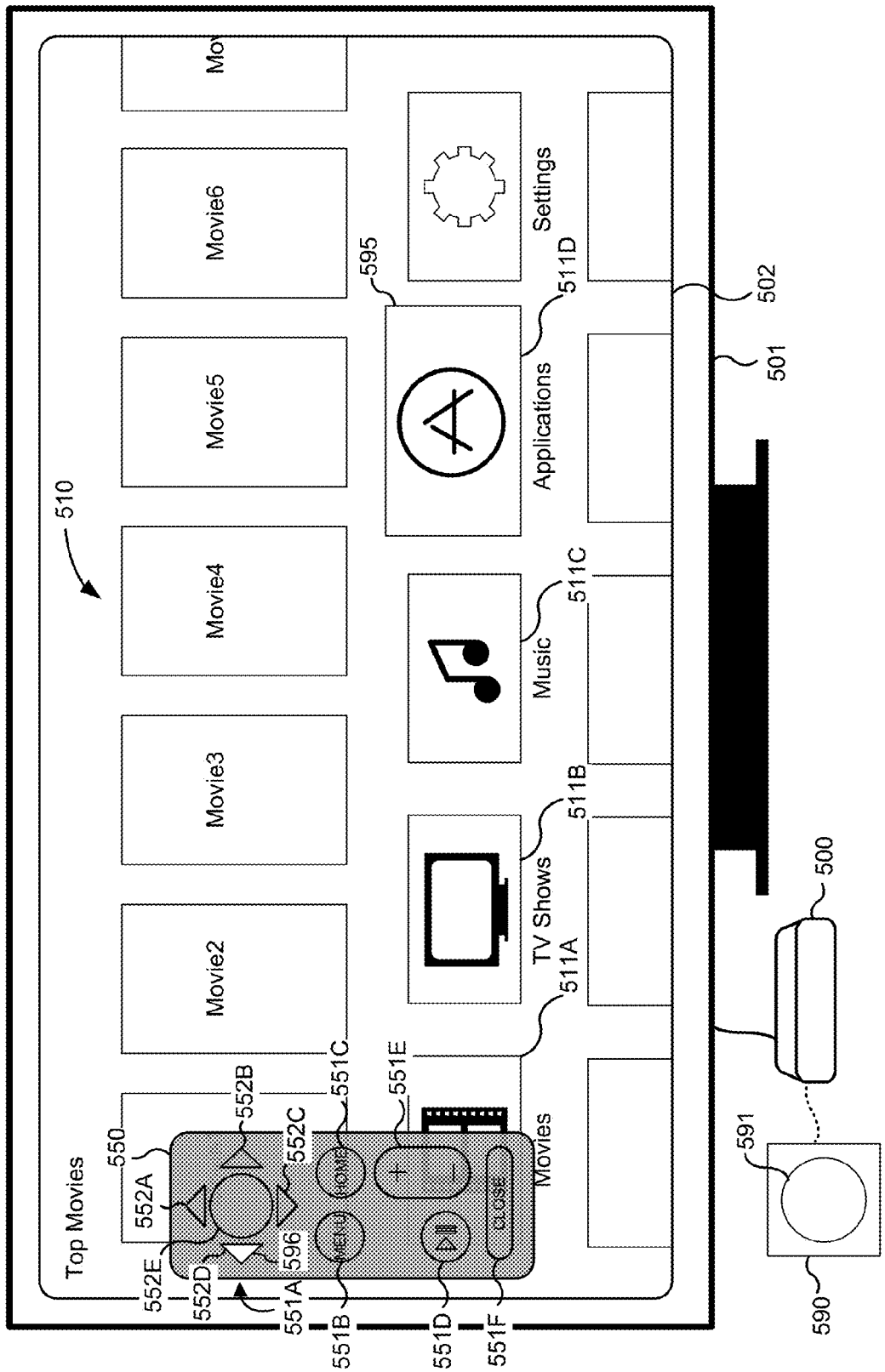
Figure 5W:
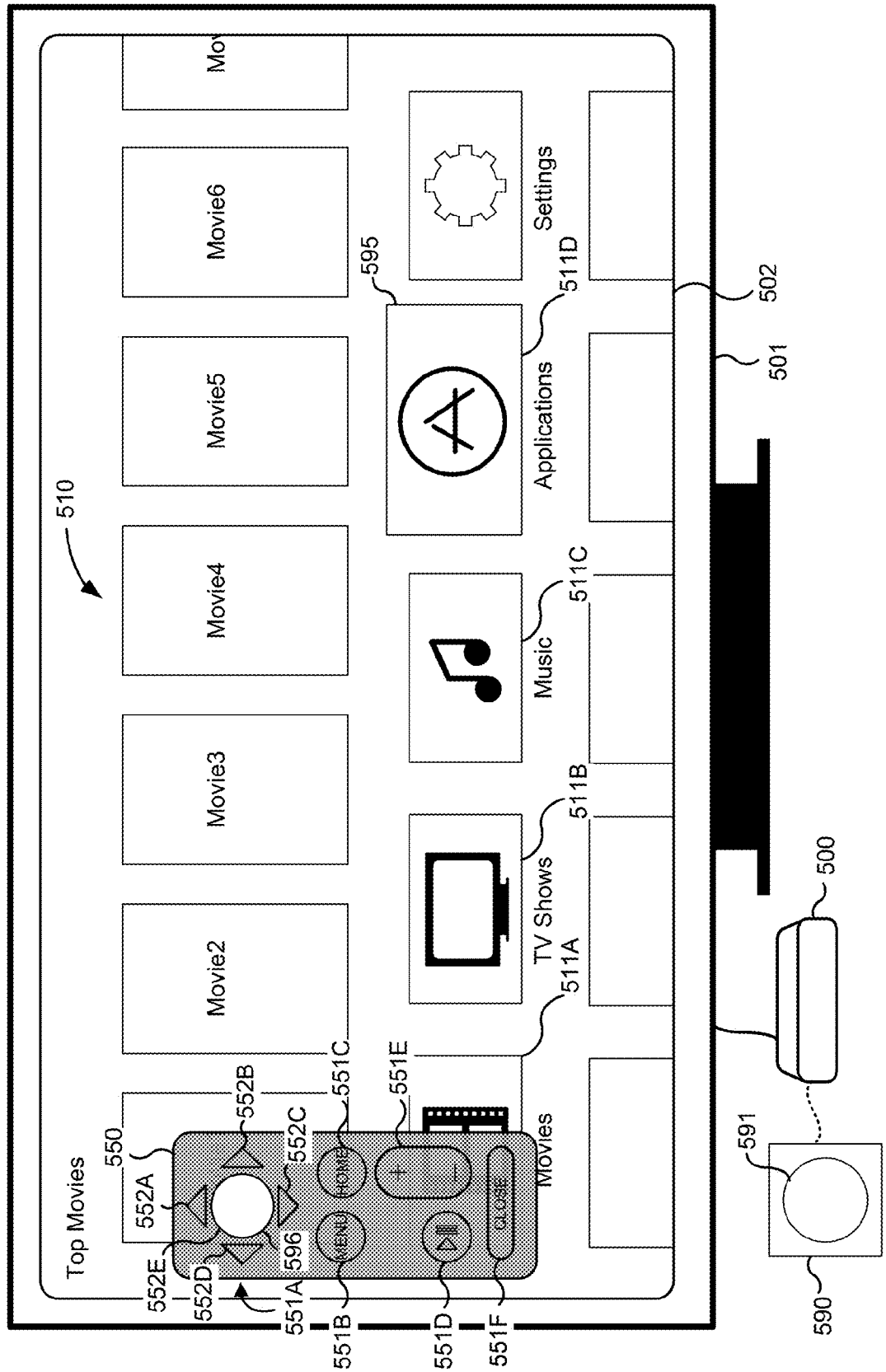

FIG. 5S illustrates the user interface 502 of FIG. 5R in response to detecting the select input. In FIG. 5S, an up user interface object 552A of the directional user interface object group 551A of the virtual remote 550 has accessibility focus 596. FIG. 5T illustrates the user interface 502 of FIG. 5S after a scanning period. In FIG. 5T, a right user interface object 552B of the directional user interface object group 551A of the virtual remote 550 has accessibility focus 596. FIG. 5U illustrates the user interface 502 of FIG. 5T after a scanning period. In FIG. 5U, a down user interface object 552C of the direction user interface object group 551A of the virtual remote 550 has accessibility focus 596. FIG. 5V illustrates the user interface 502 of FIG. 5U after a scanning period. In FIG. 5V, a left user interface object 552D of the directional user interface object group 551A of the virtual remote 550 has accessibility focus 596. FIG. 5W illustrates the user interface 502 of FIG. 5U after a scanning period. In FIG. 5W, a select user interface object 552E of the directional user interface object group 551A of the virtual remote 550 has accessibility focus 596.

Figure 5X:
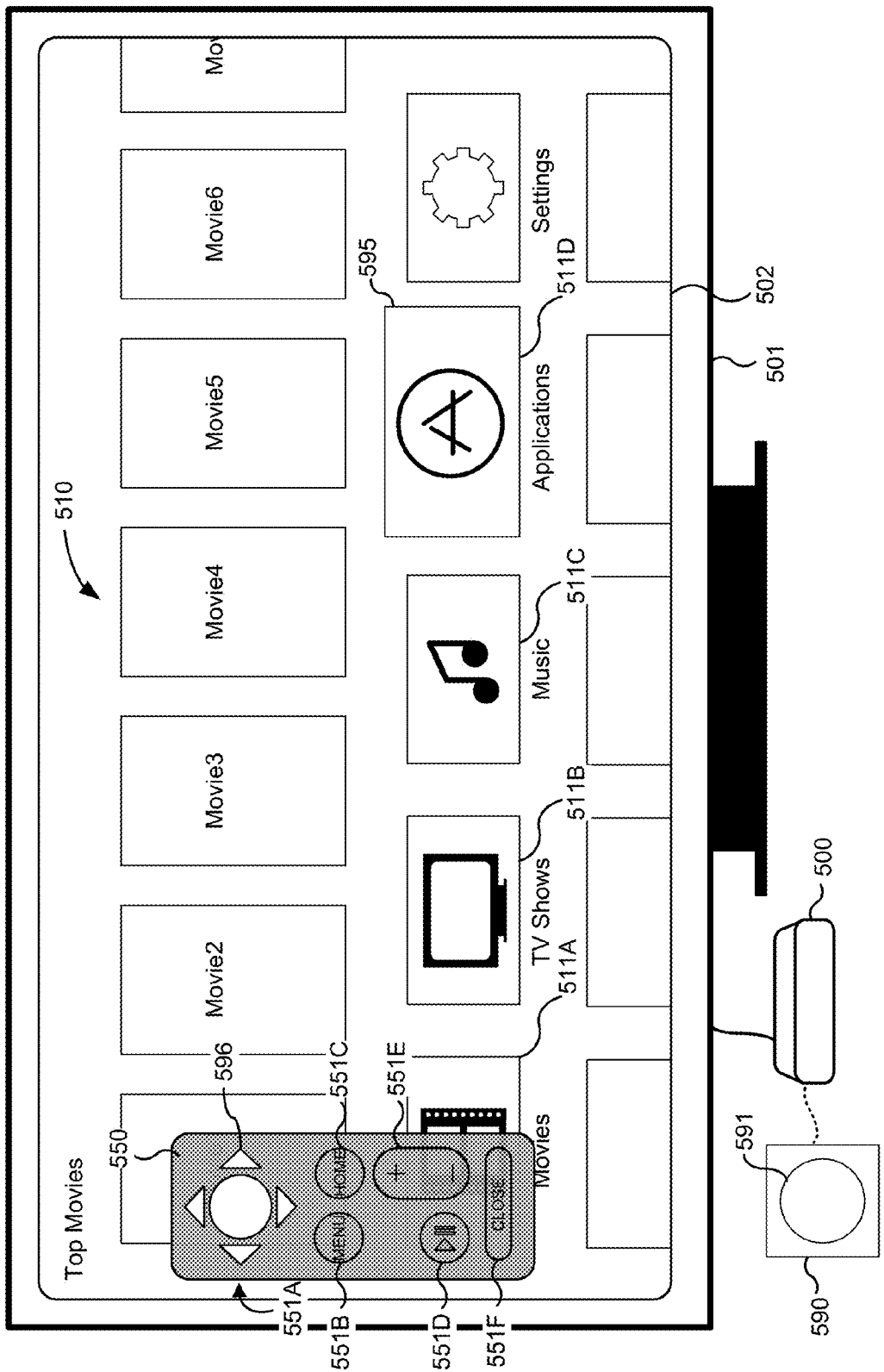

FIG. 5X illustrates the user interface 502 of FIG. 5W after a scanning period. In FIG. 5X, all the user interface objects of the directional user interface object group 551A have accessibility focus 596. In response to a select input from the switch device 590, the media player 500 can, in various implementations, return to the state of FIG. 5R in which accessibility focus 596 is sequentially moved through the user interface object groups of the virtual remote or display a directional interface group menu including user interface objects for returning to the state of FIG. 5R, changing a location of the virtual remote 550, replacing the directional user interface object group 551A with a touch-sensitive surface user interface object 553 (as described below), or performing other functions.

Figure 5Y:
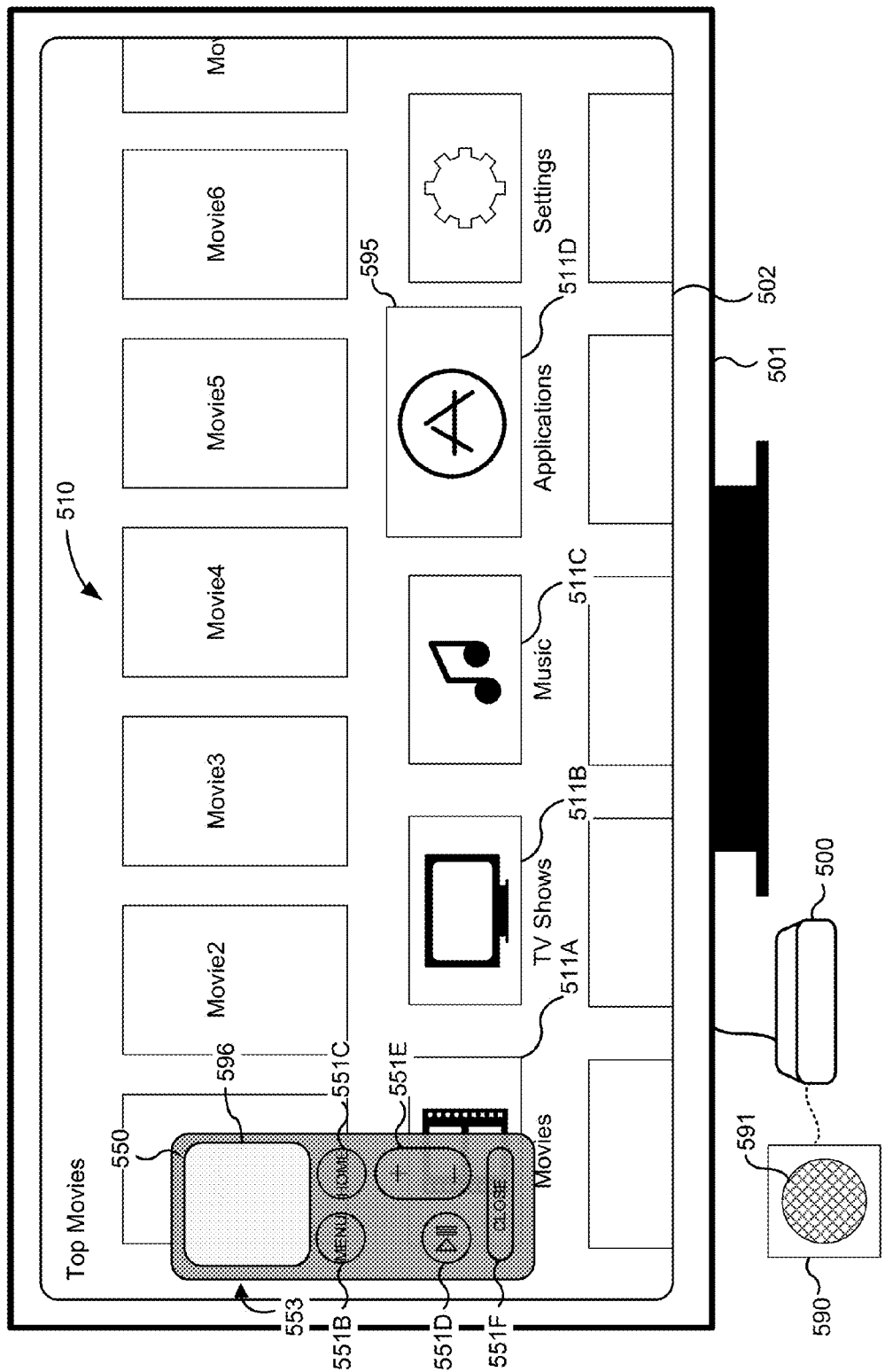

FIG. 5Y illustrates the user interface 502 of FIG. 5X after the media player 500 has replaced the directional user interface object group 521A with a touch-sensitive surface user interface object 553. In FIG. 5Y, the touch-sensitive surface user interface object 553 has accessibility focus 596. FIG. 5Y illustrates that the first switch 591 of the switch device 590 is activated, resulting in a select input detected by the media player 500.

Figure 5Z:
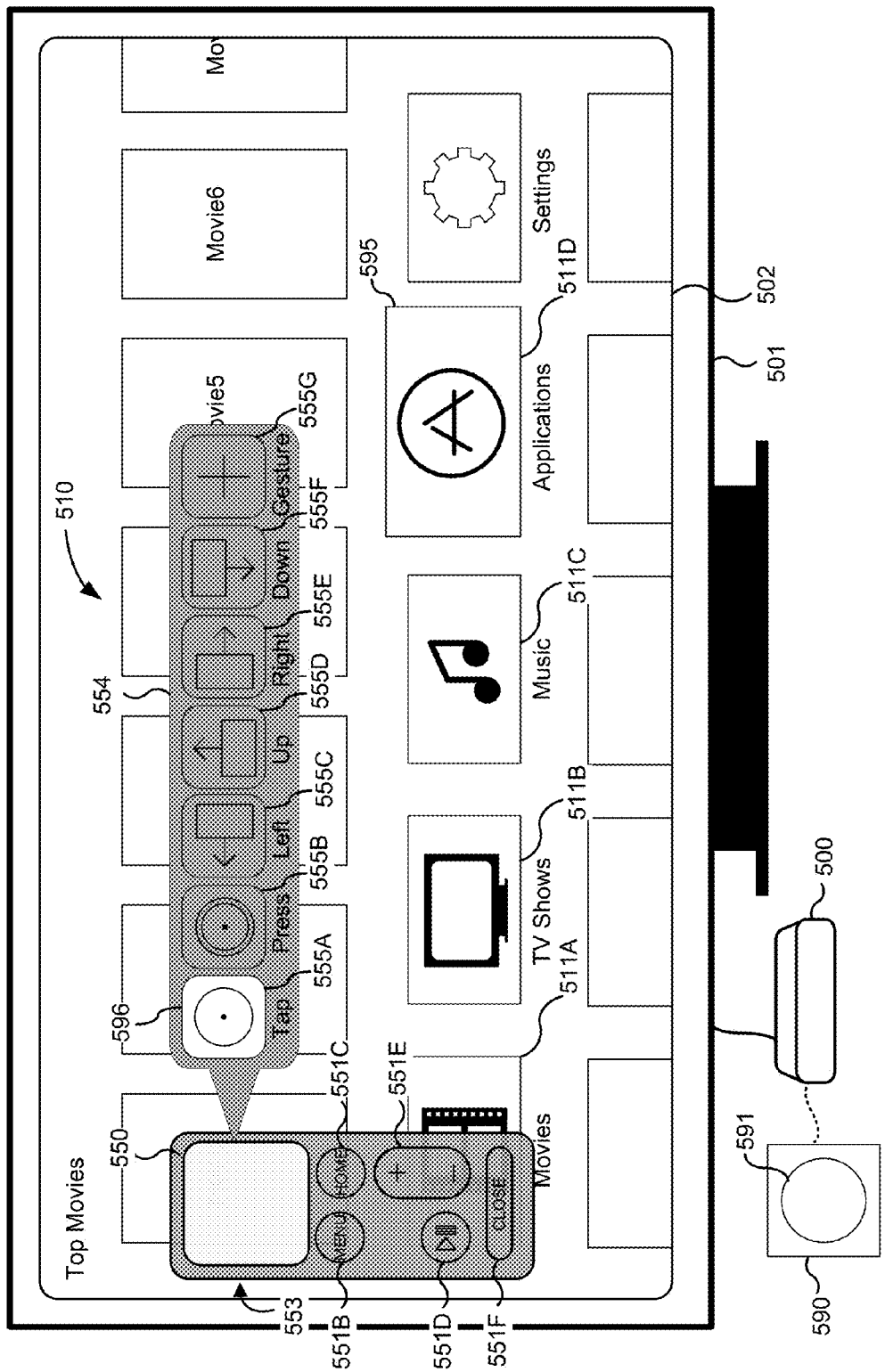
Figure 5A:
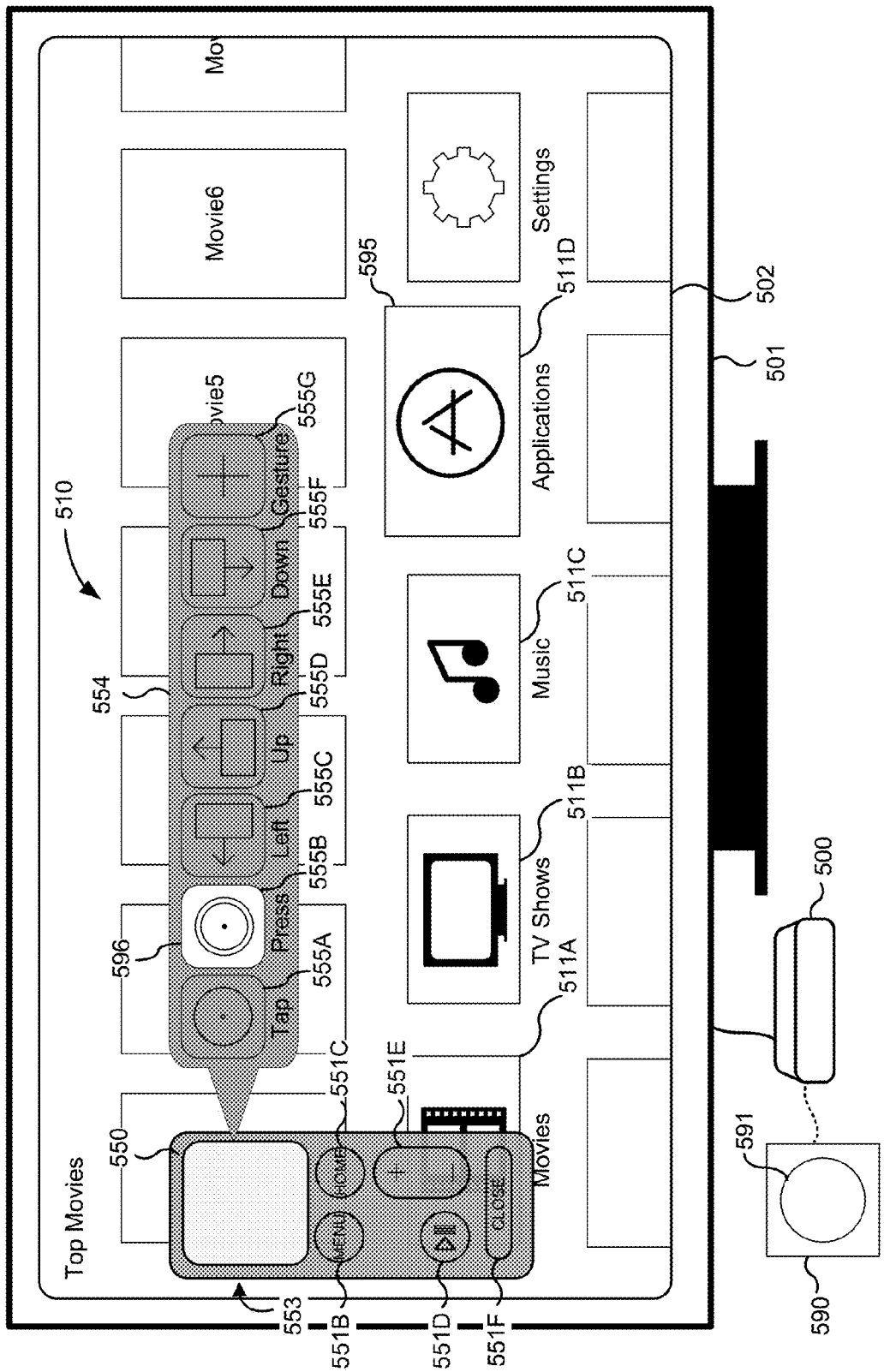
Figure 5A:
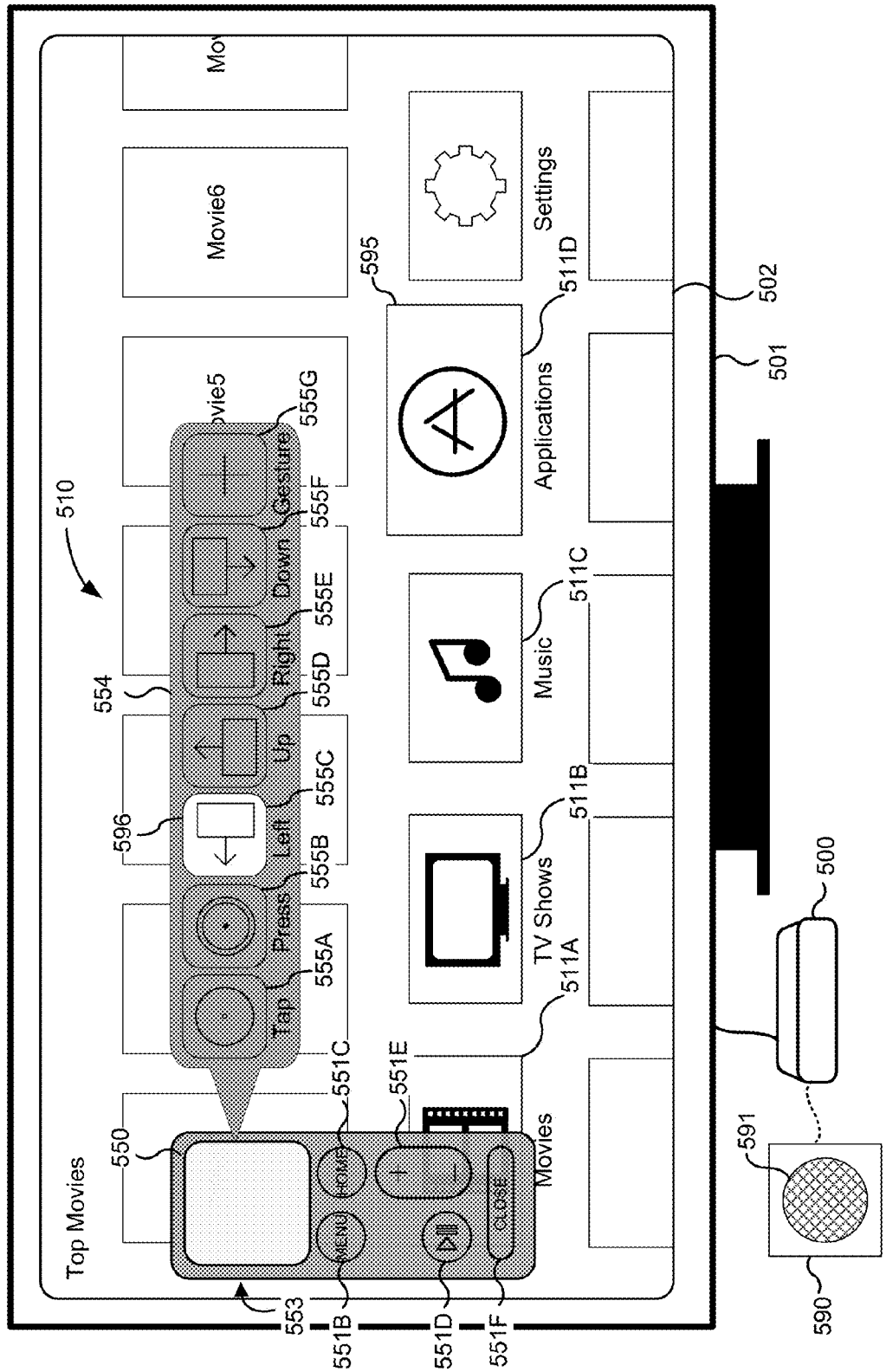
Figure 5A:
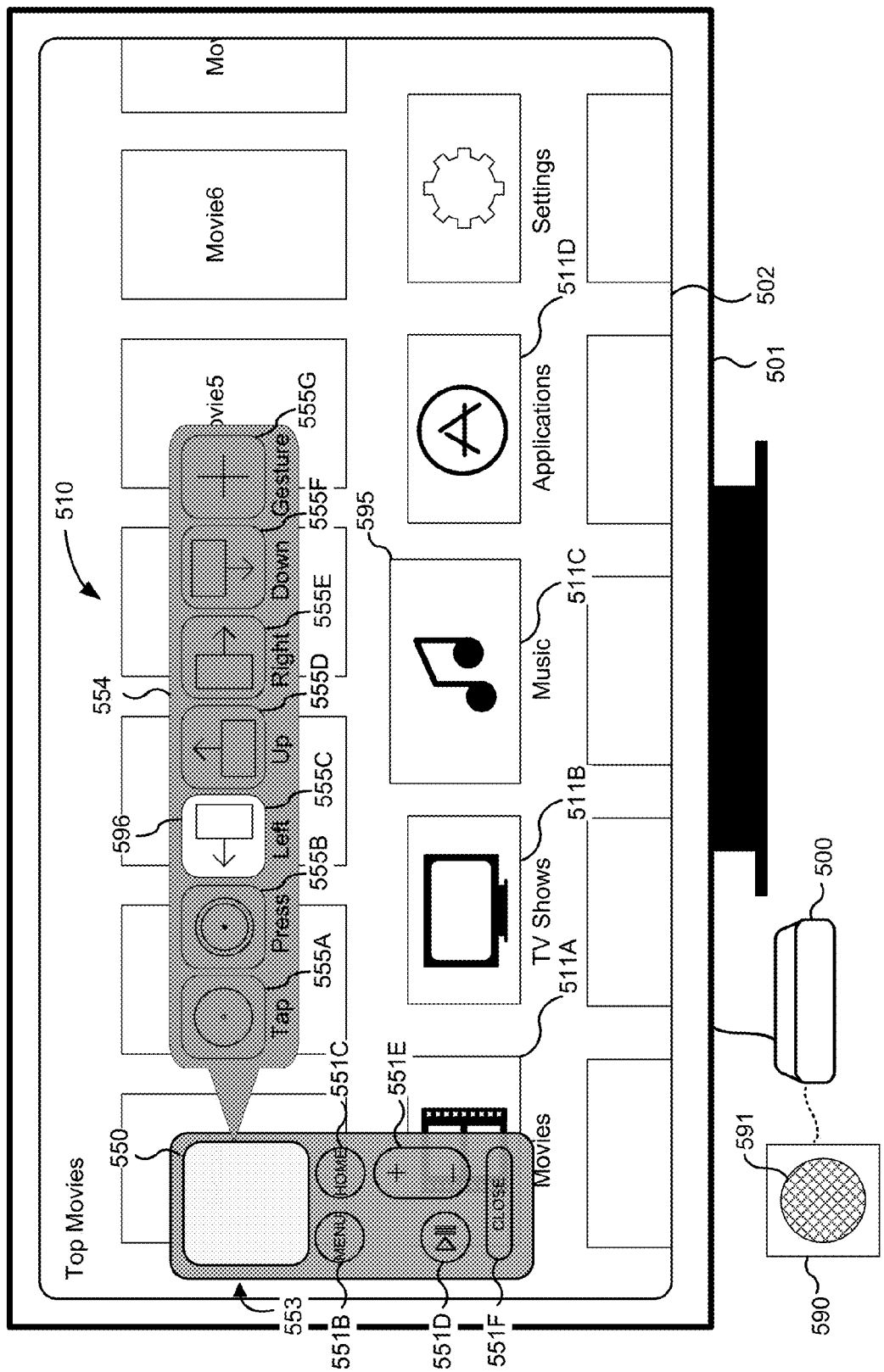
Figure 5A:
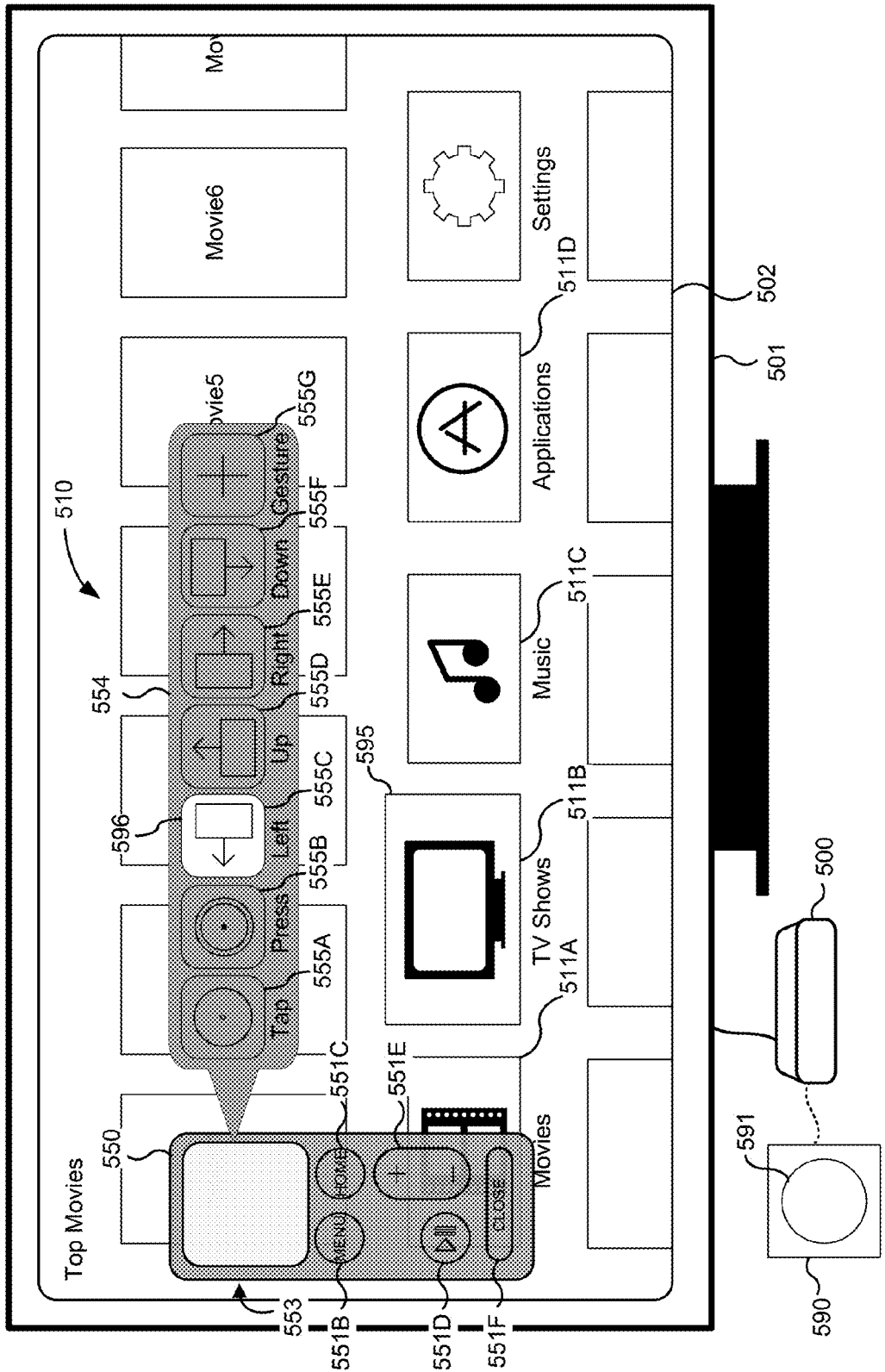
Figure 5A:
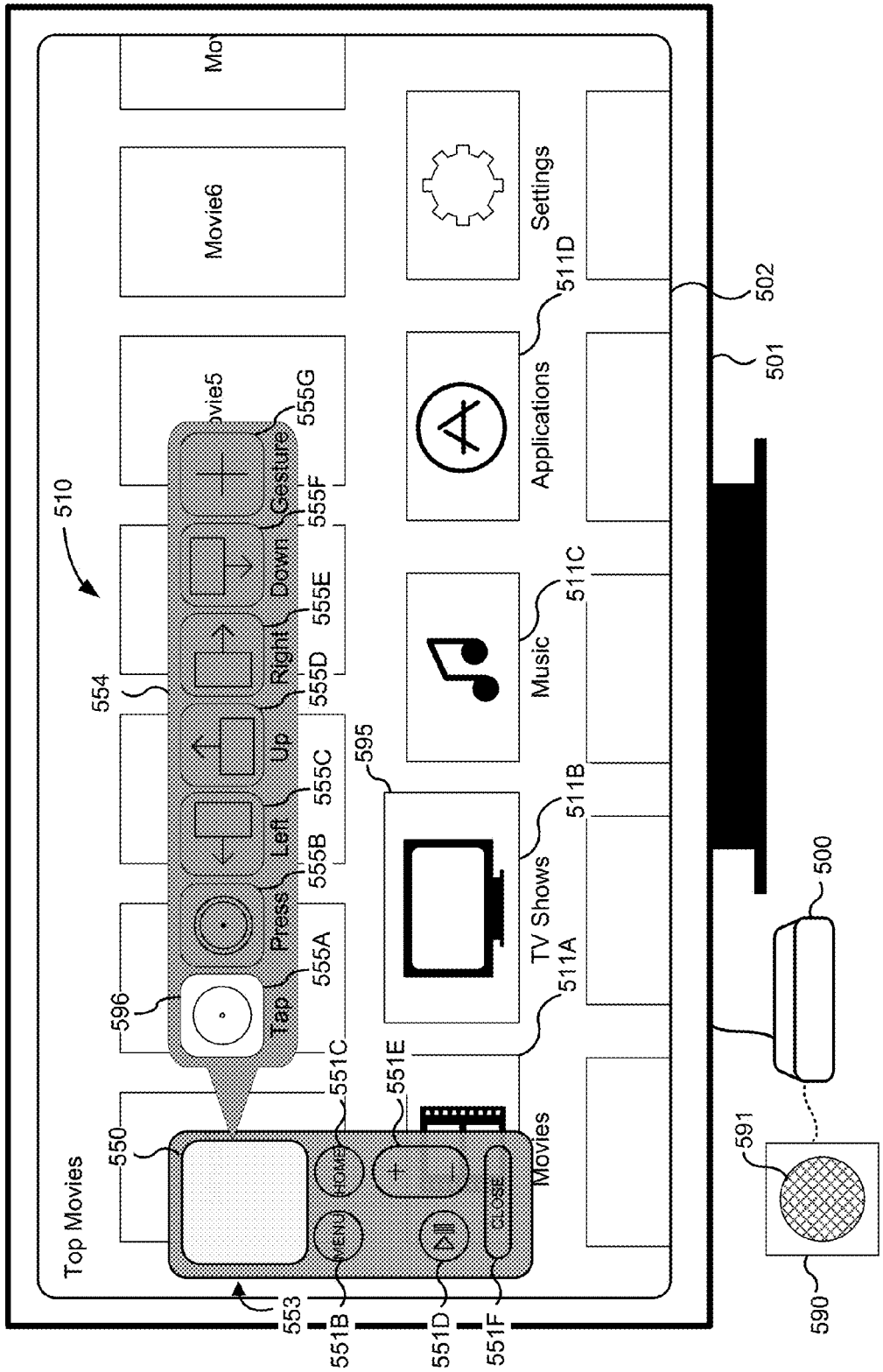
Figure 5A:
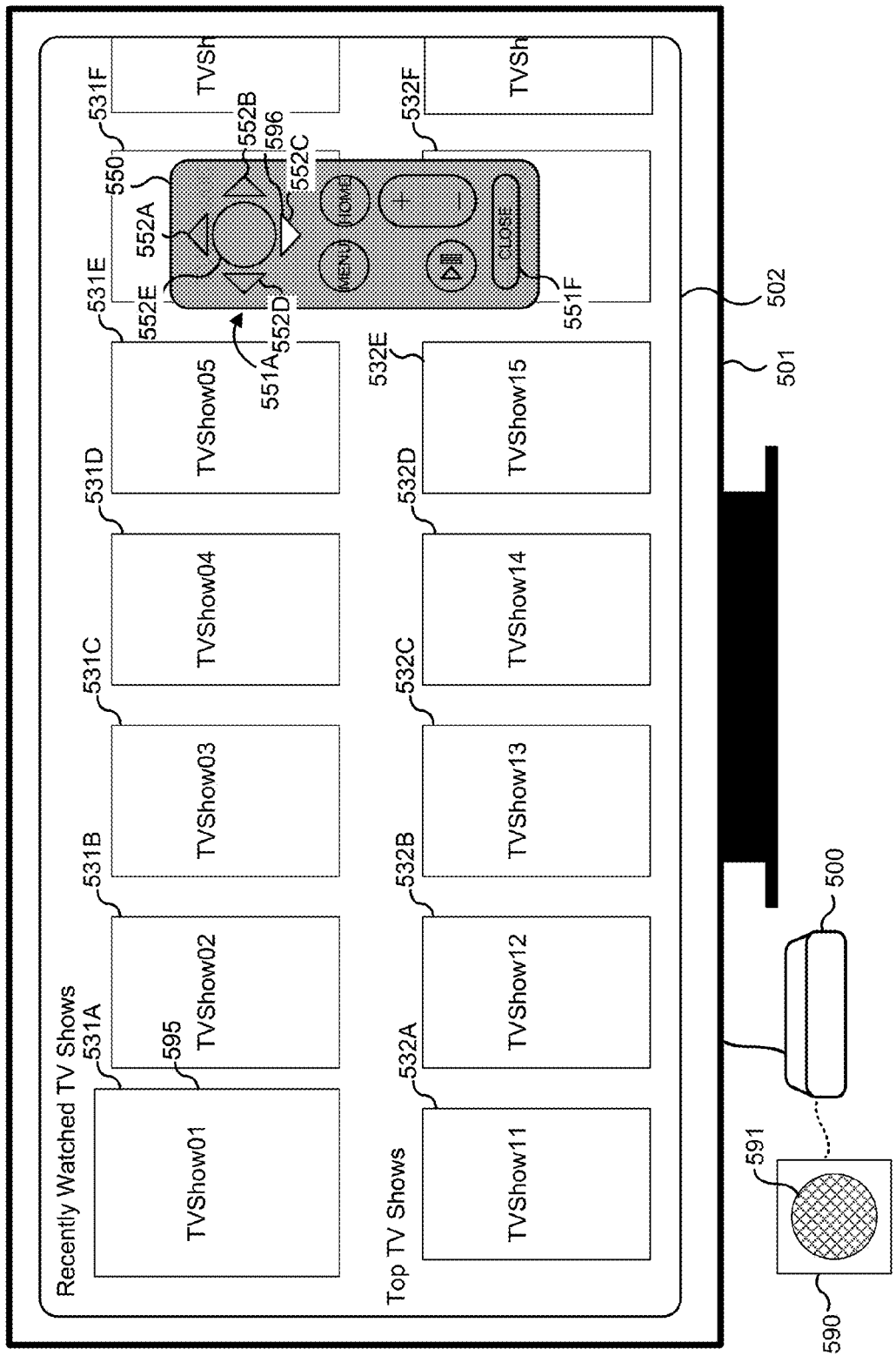
Figure 5A:
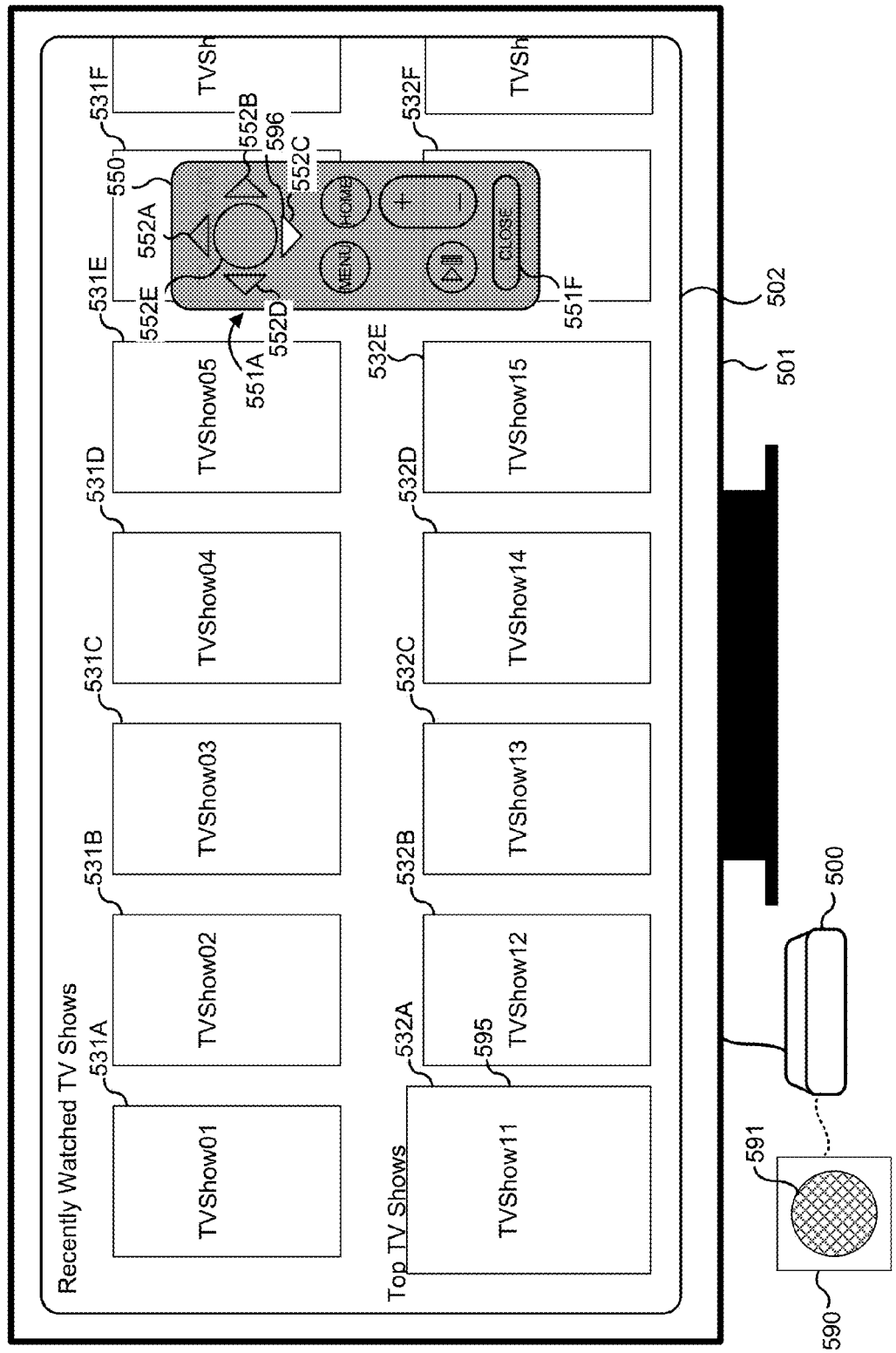
Figure 5A:
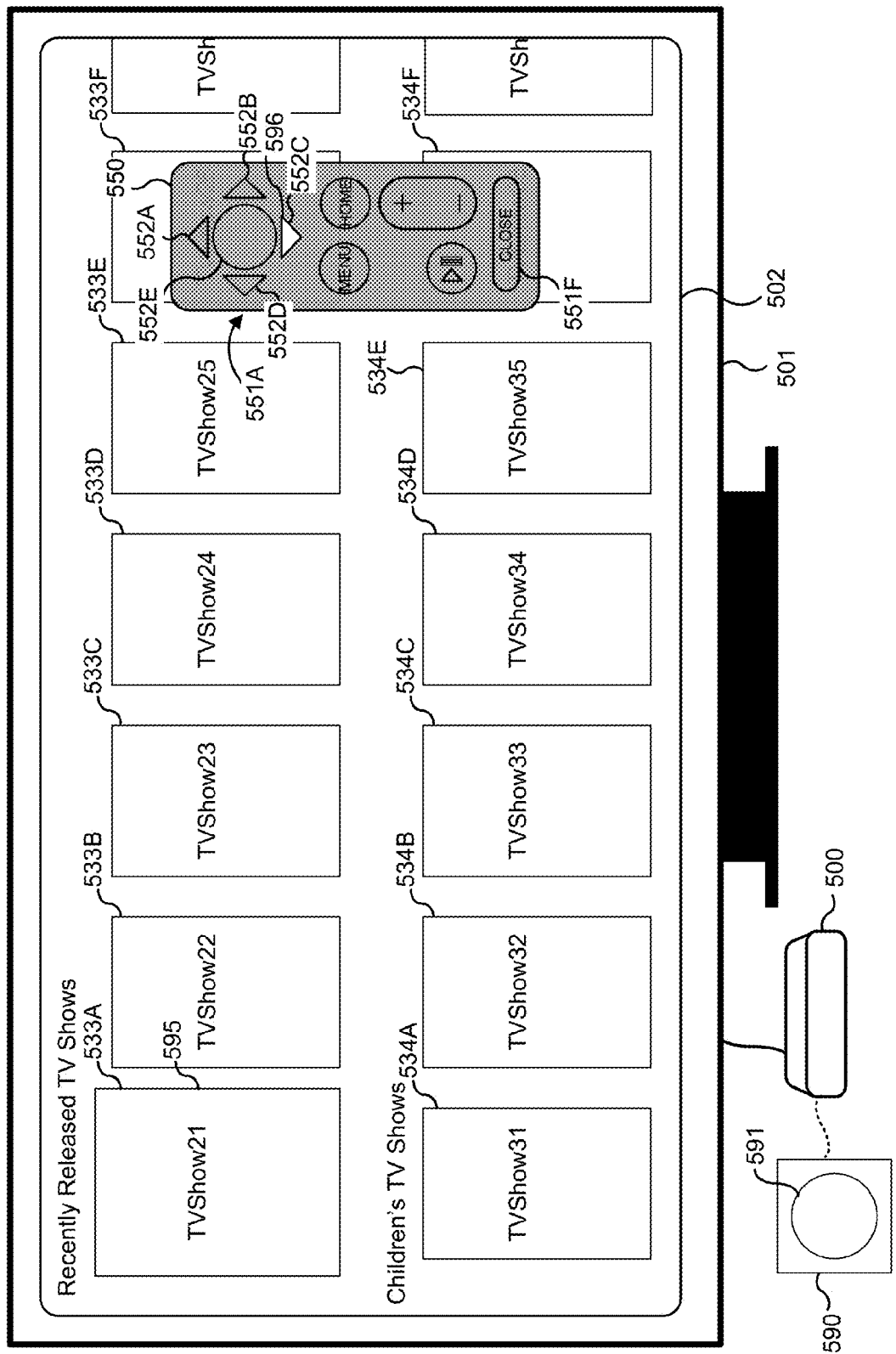
Figure 5A:
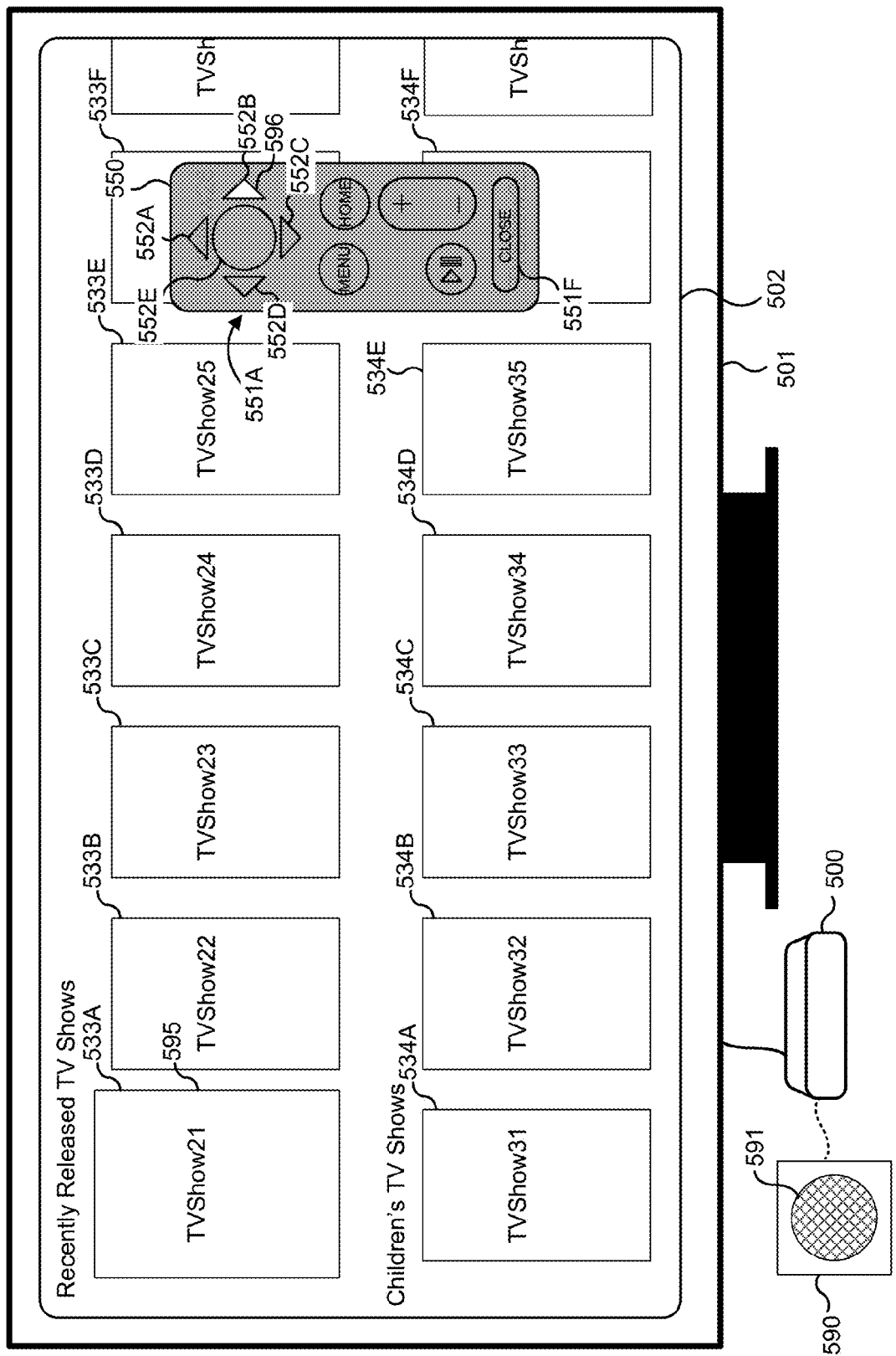
Figure 5A:
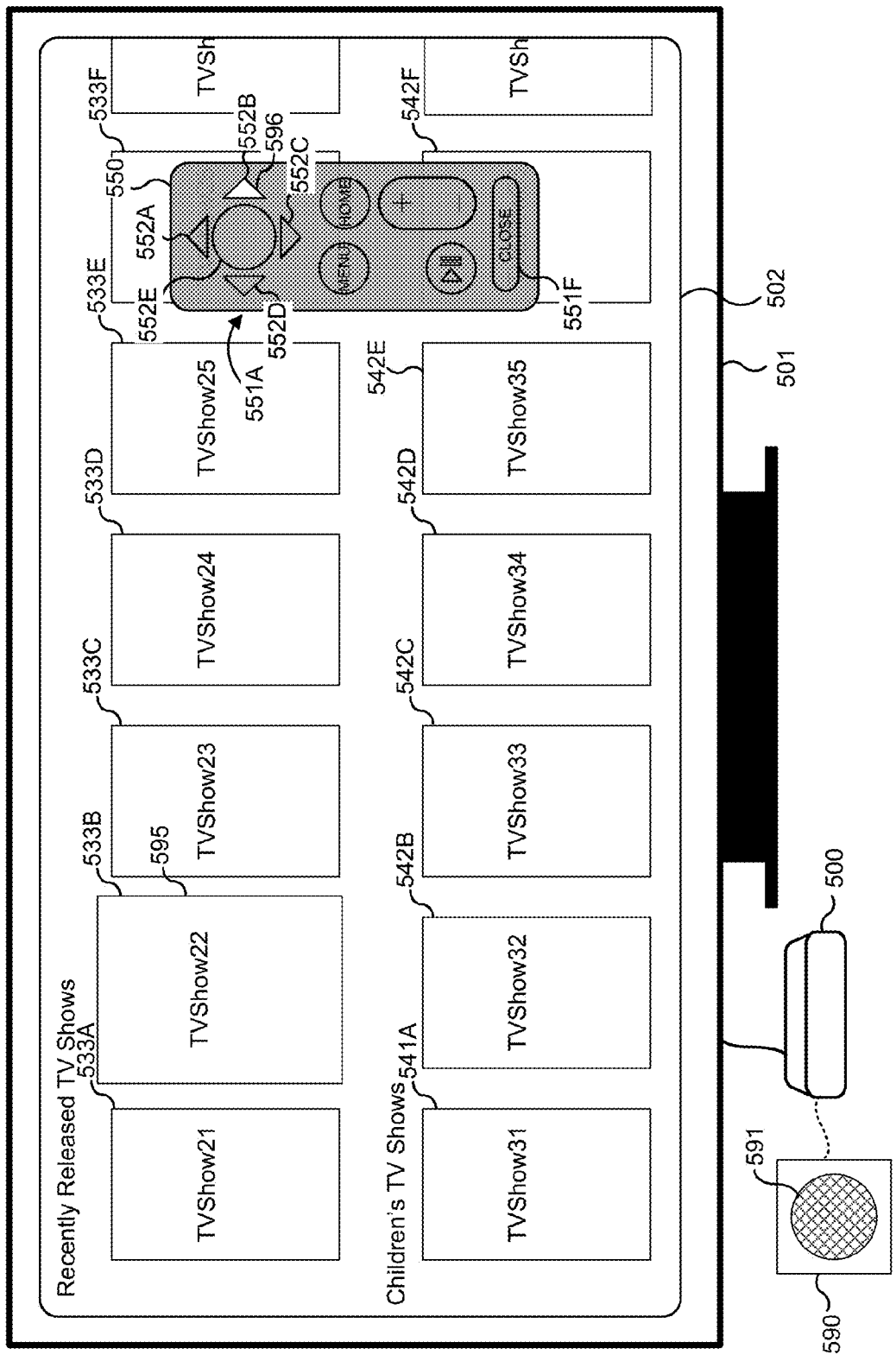
Figure 5A:
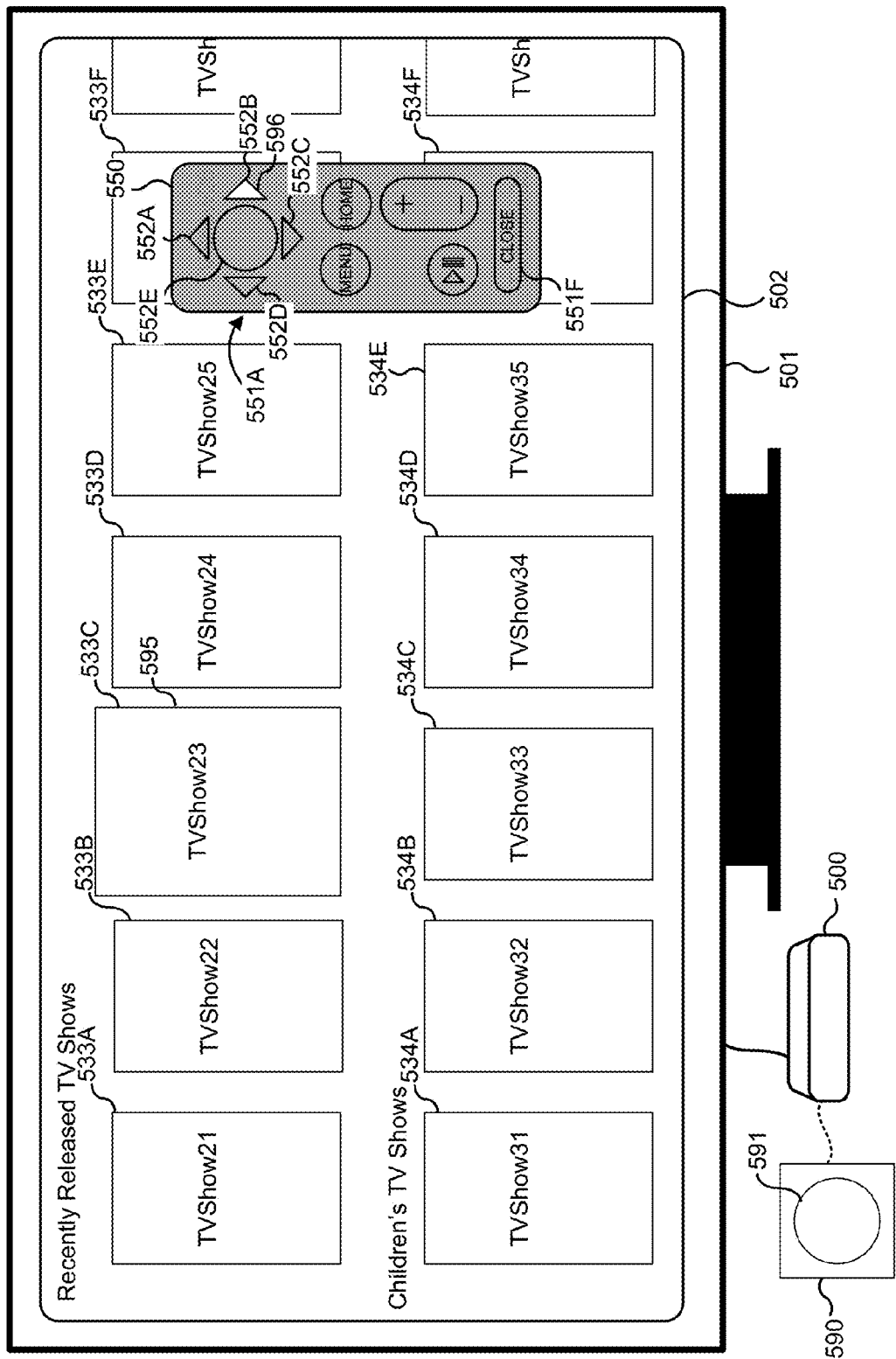
Figure 5A:
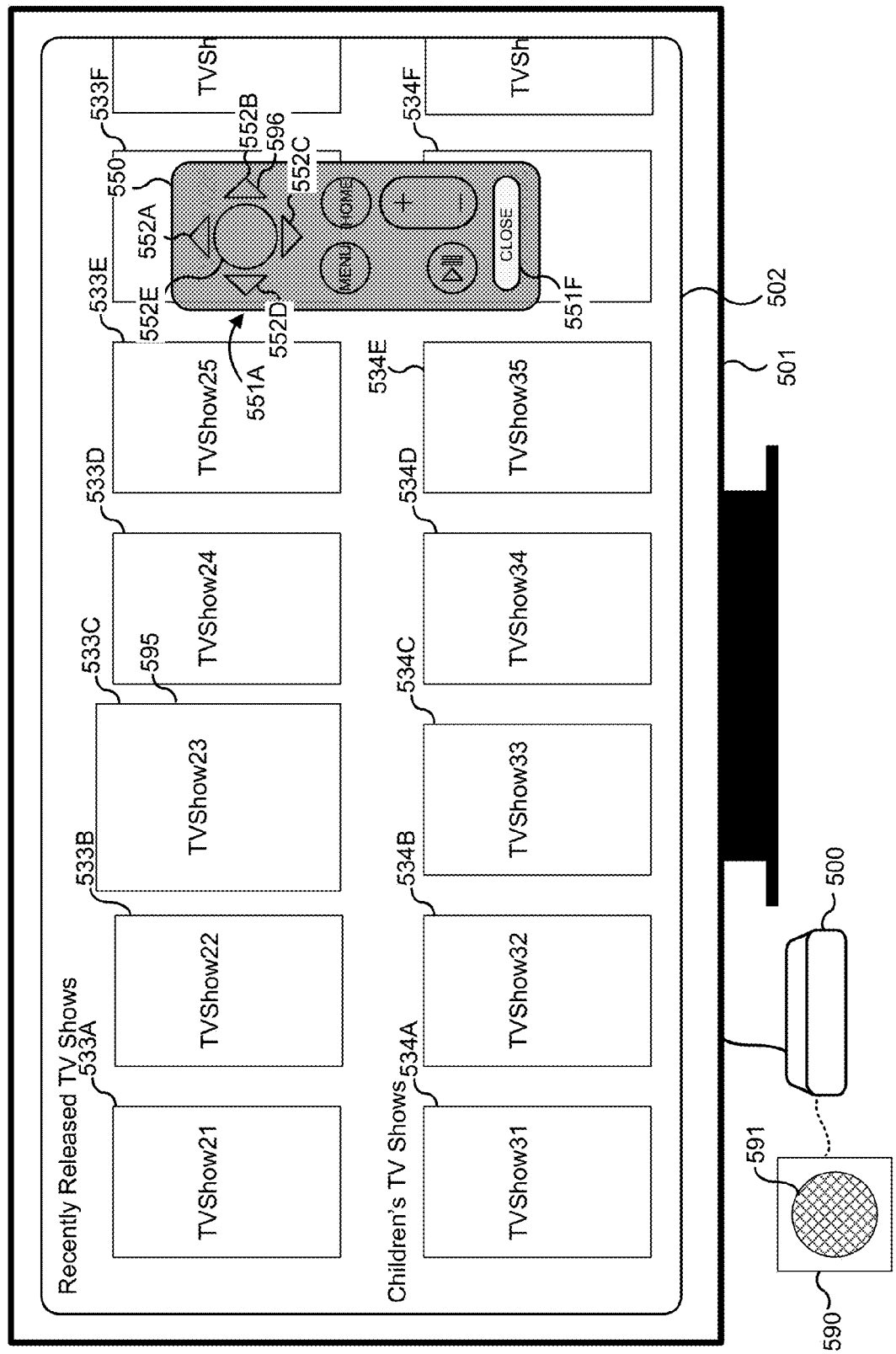
Figure 5A:
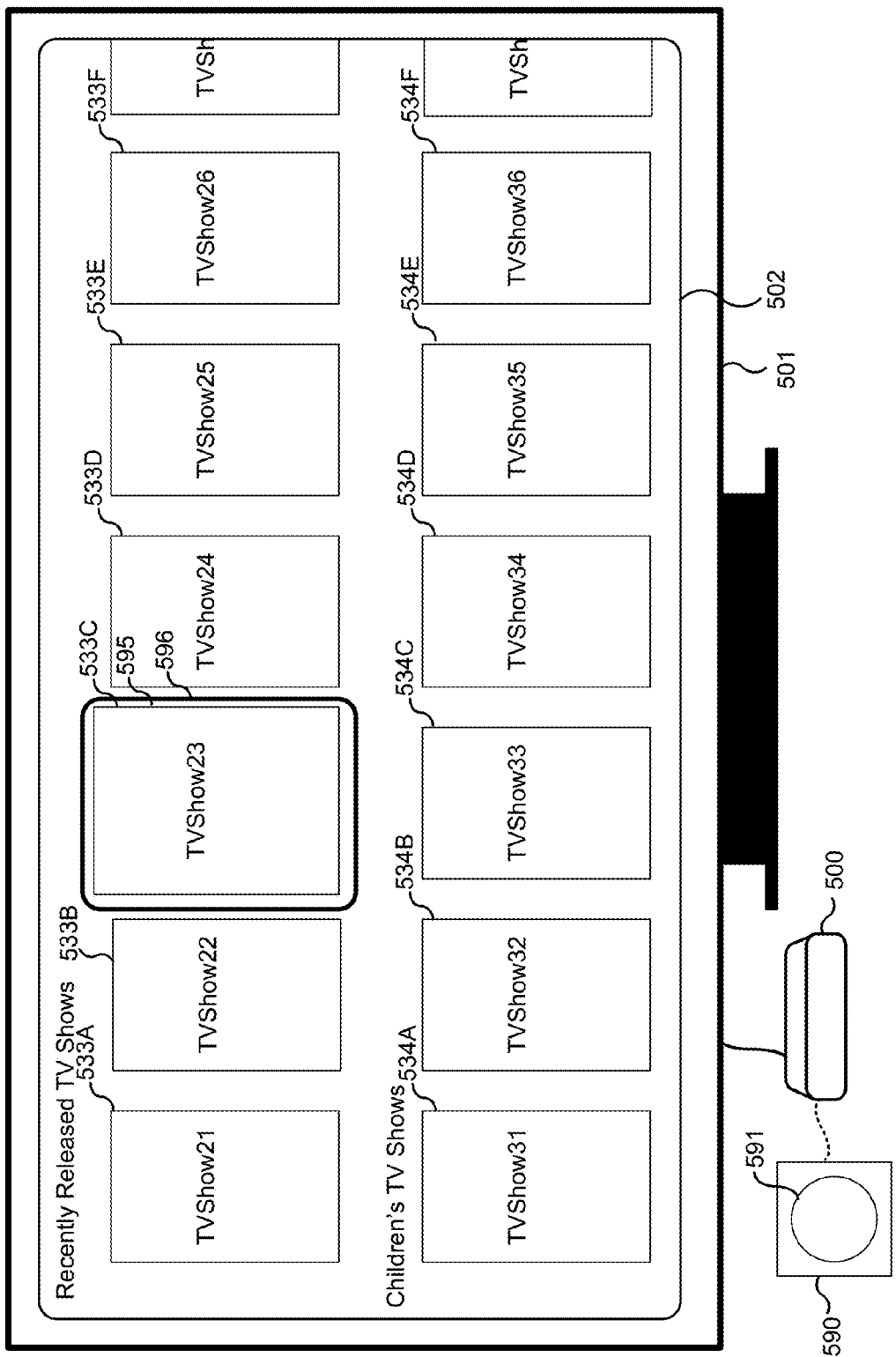
Figure 5A:
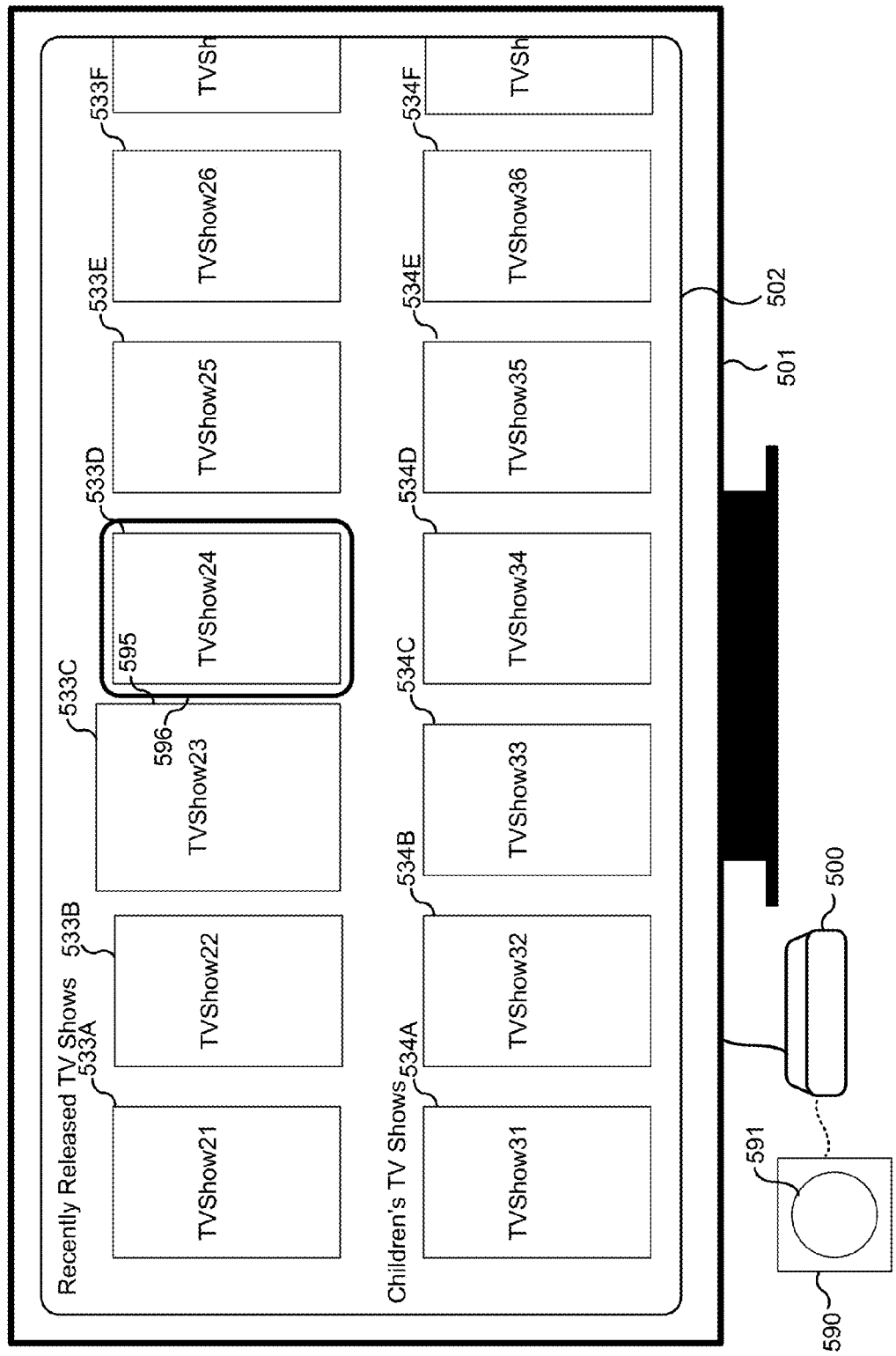
Figure 5A:
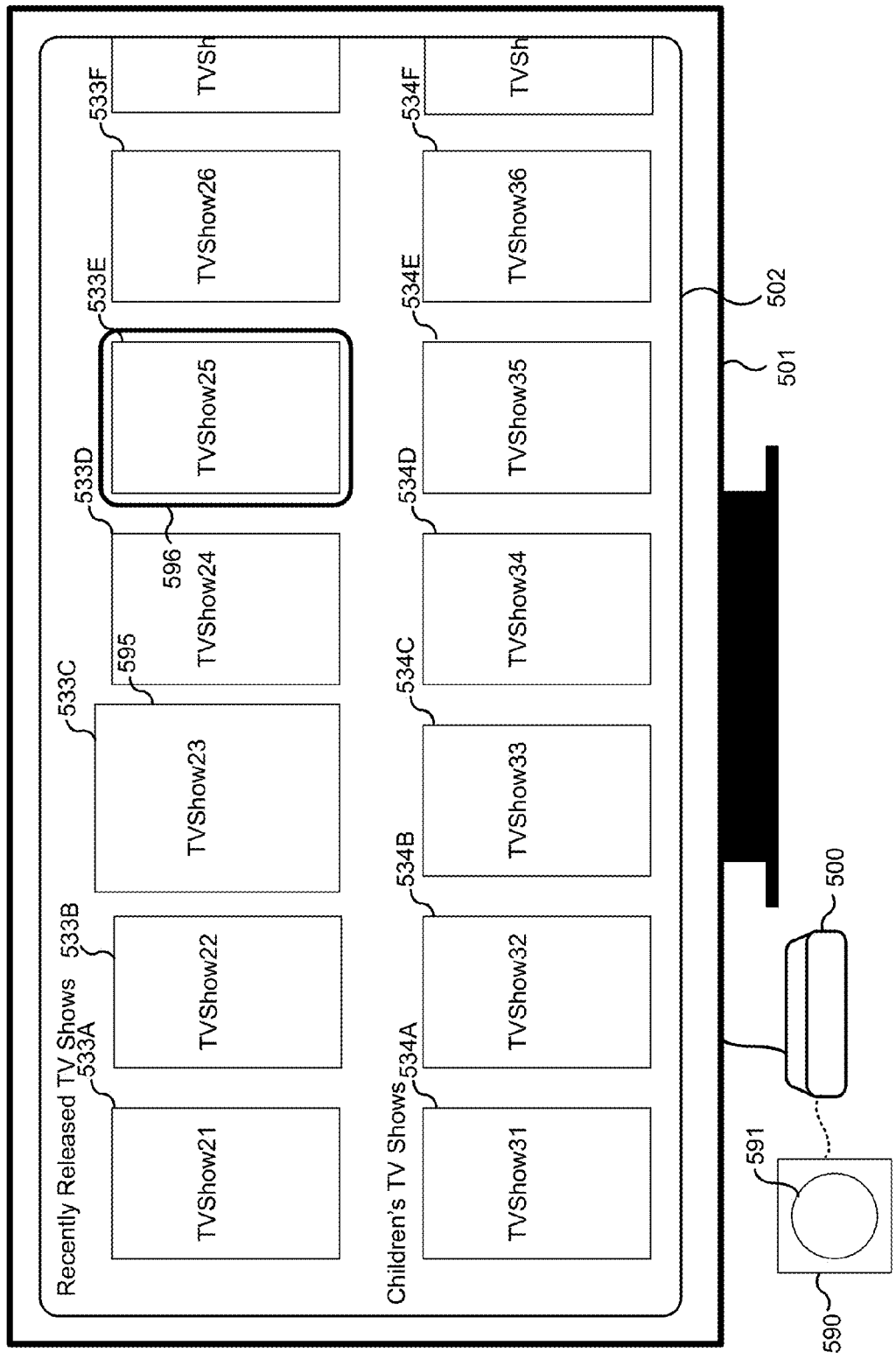
Figure 5A:
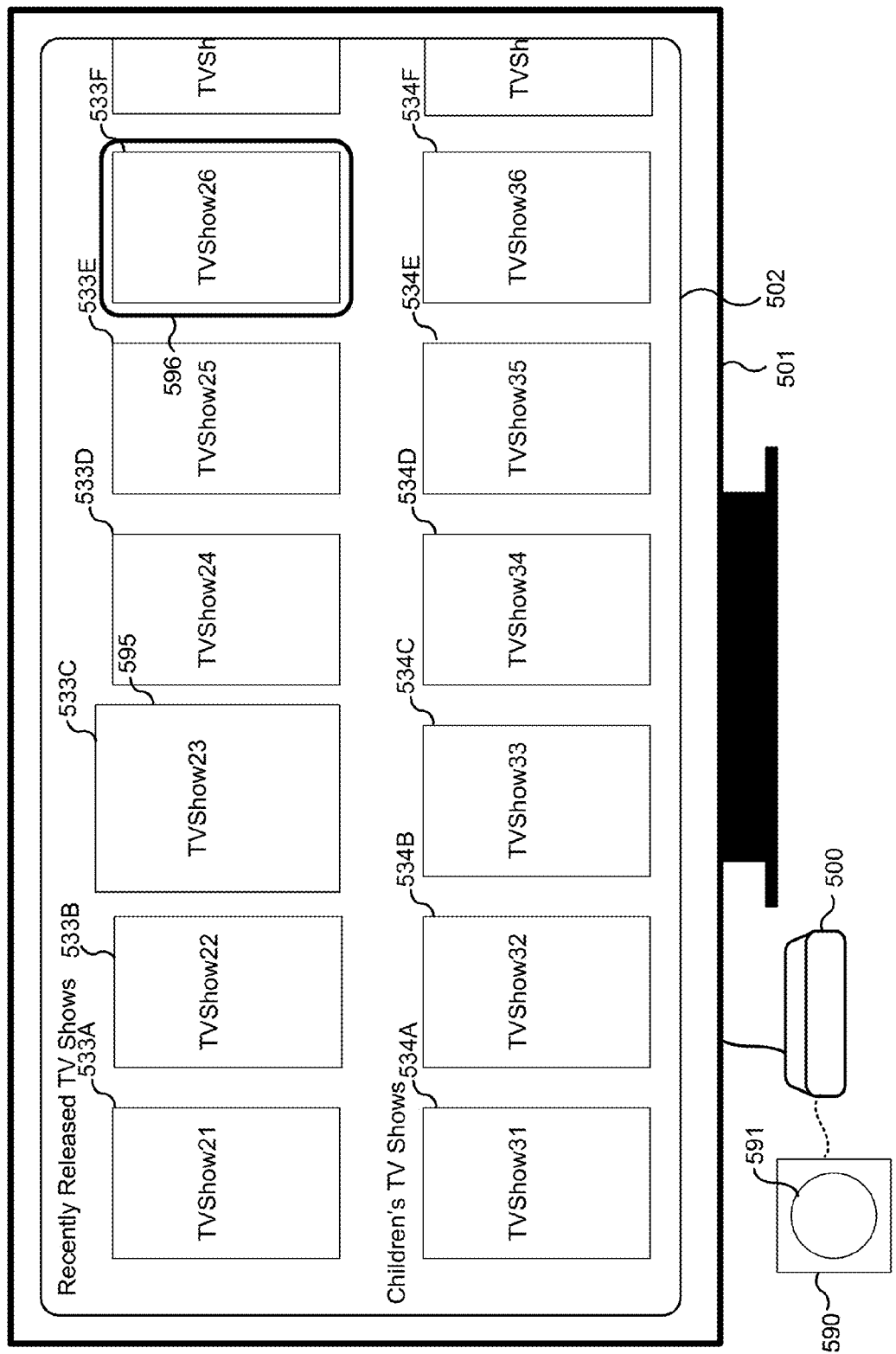
Figure 5A:
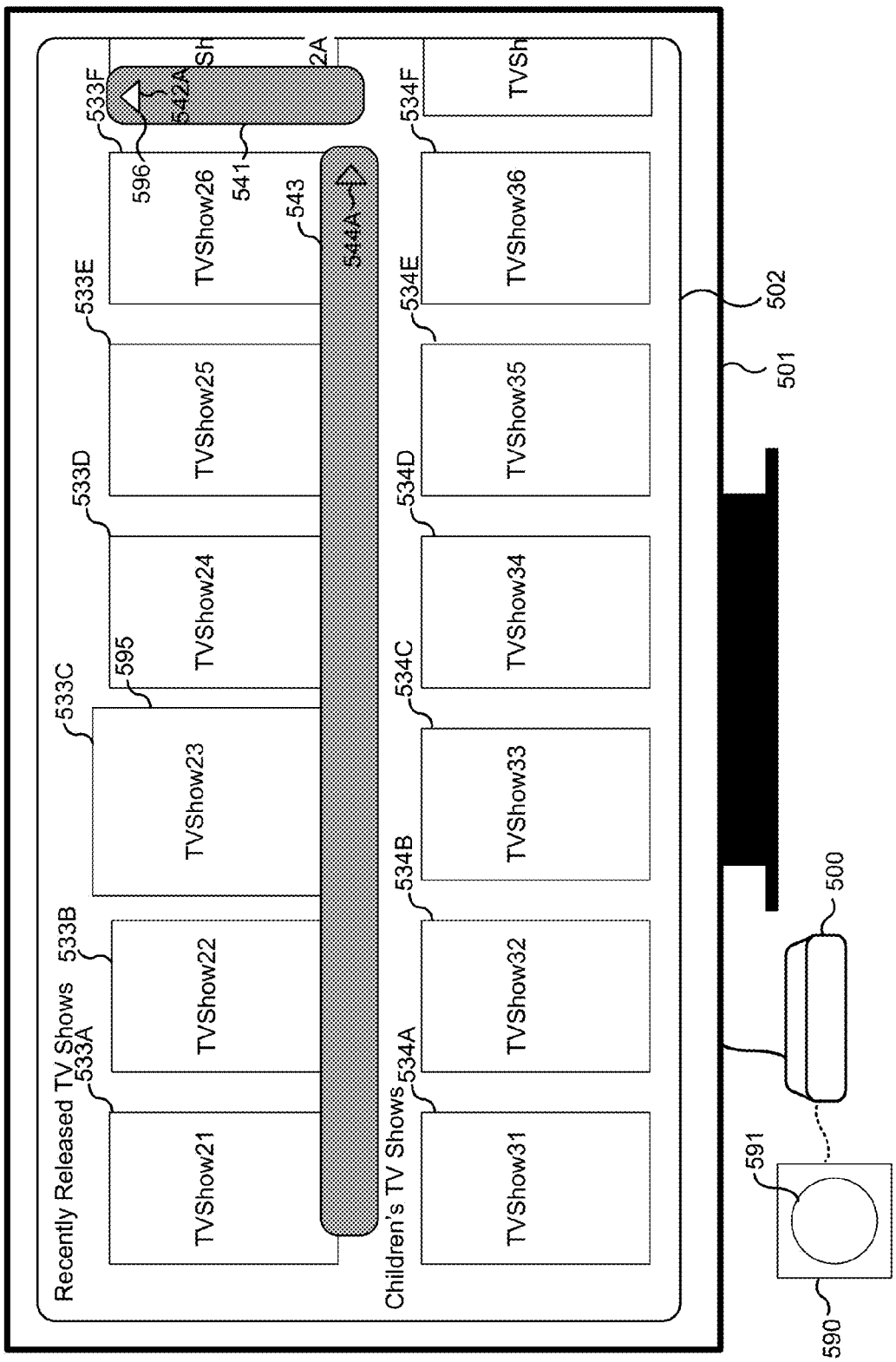
Figure 5A:
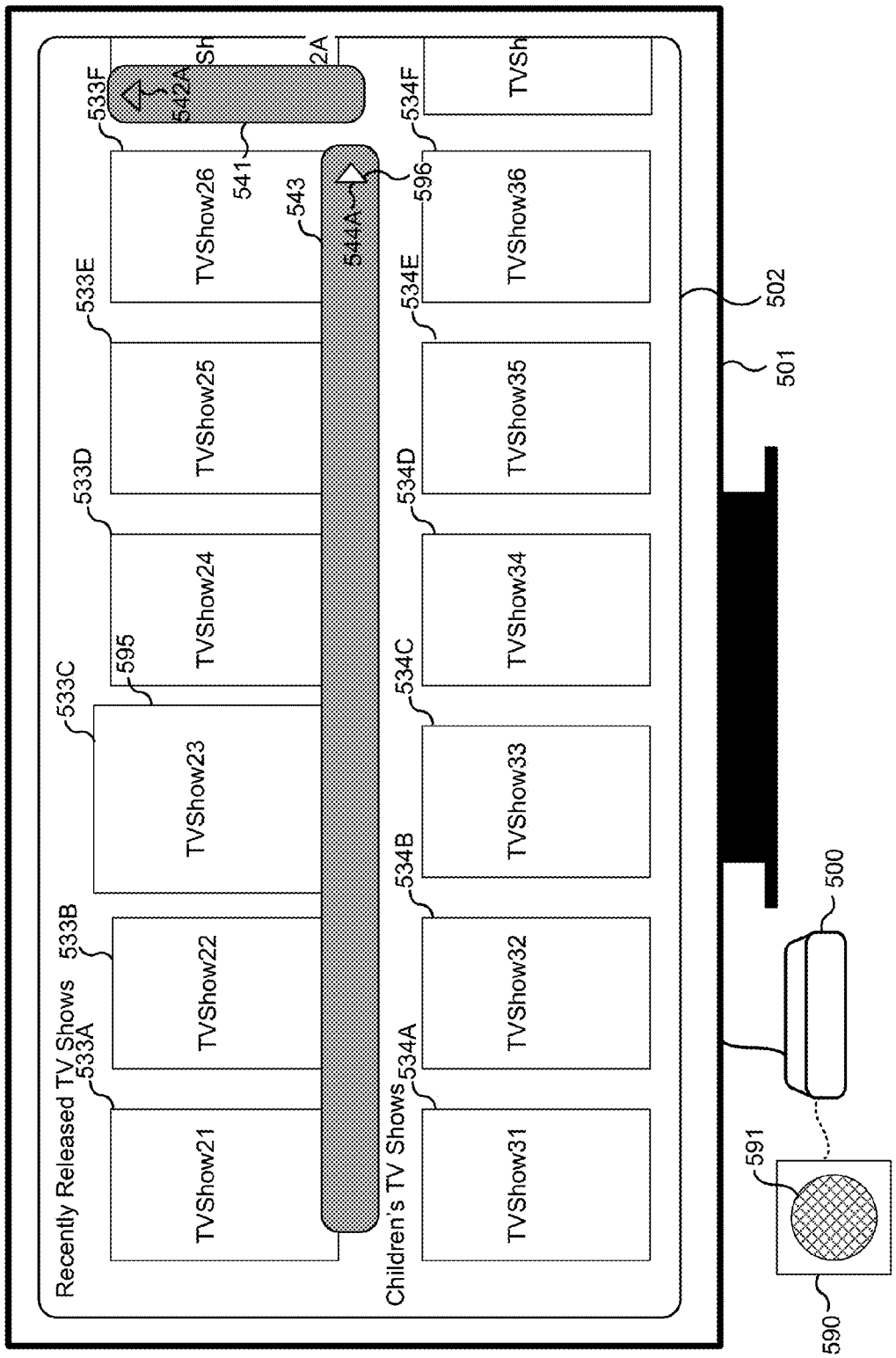
Figure 5A:
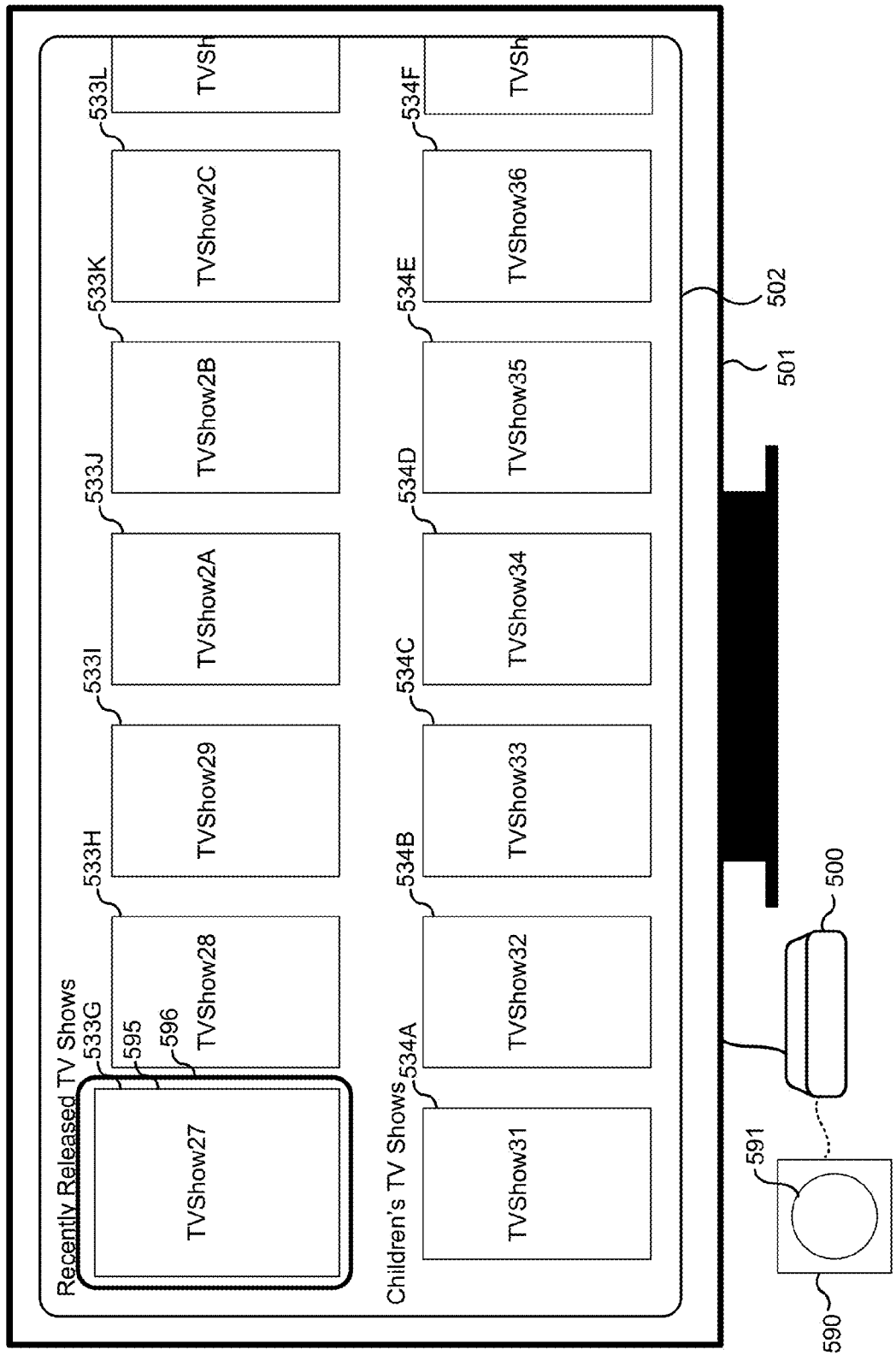
Figure 5A:
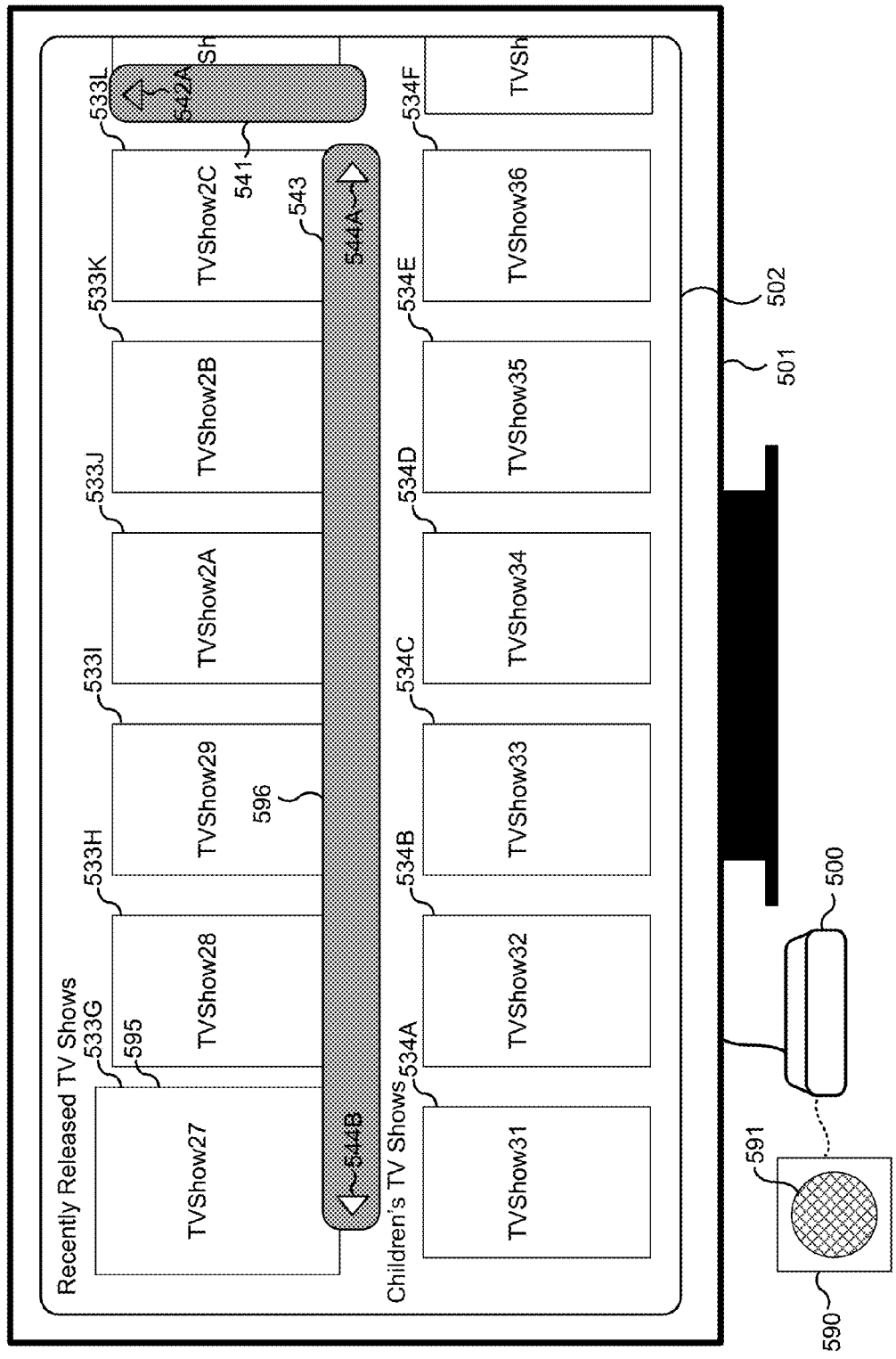
Figure 5A:
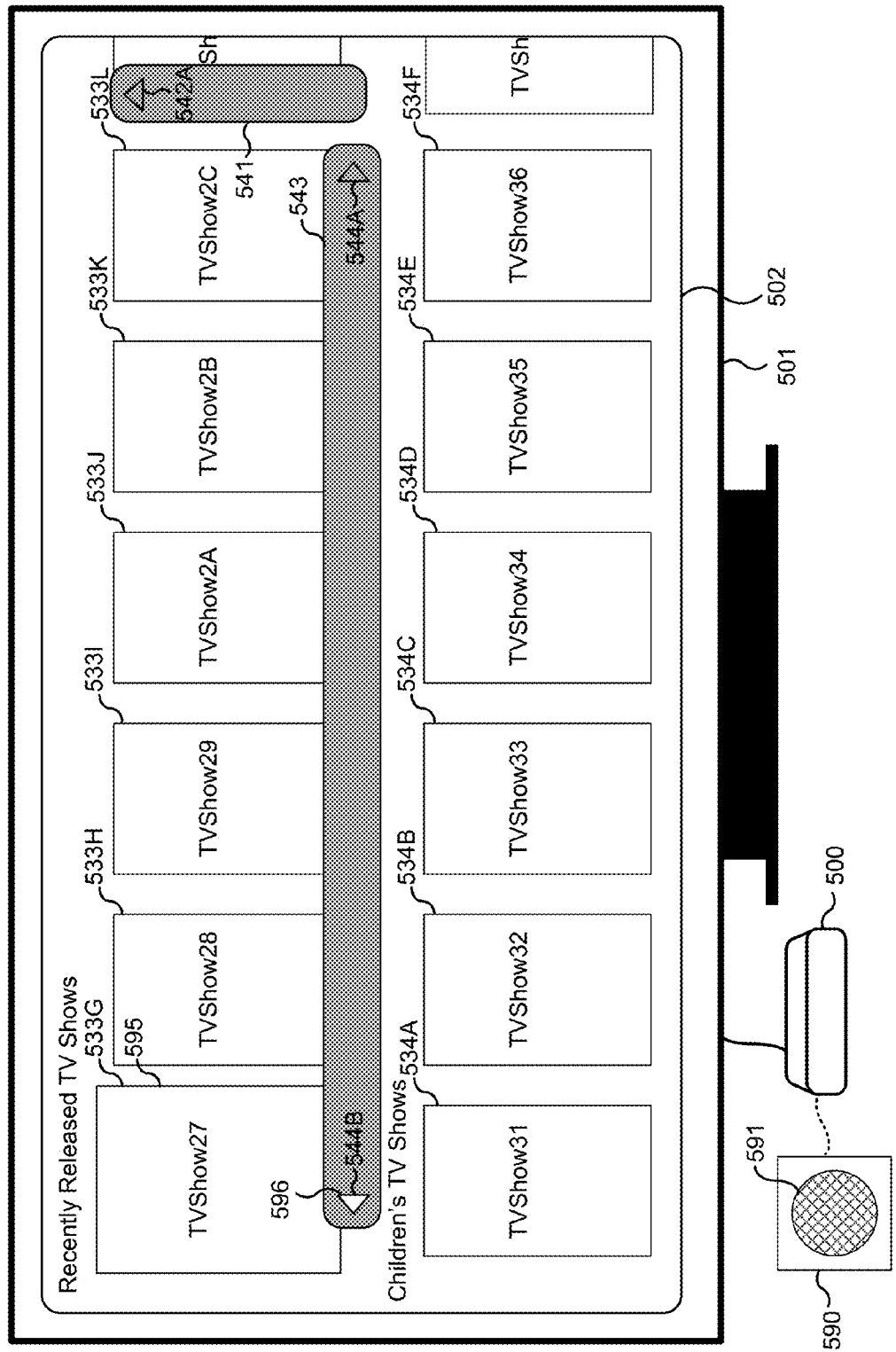
Figure 5A:
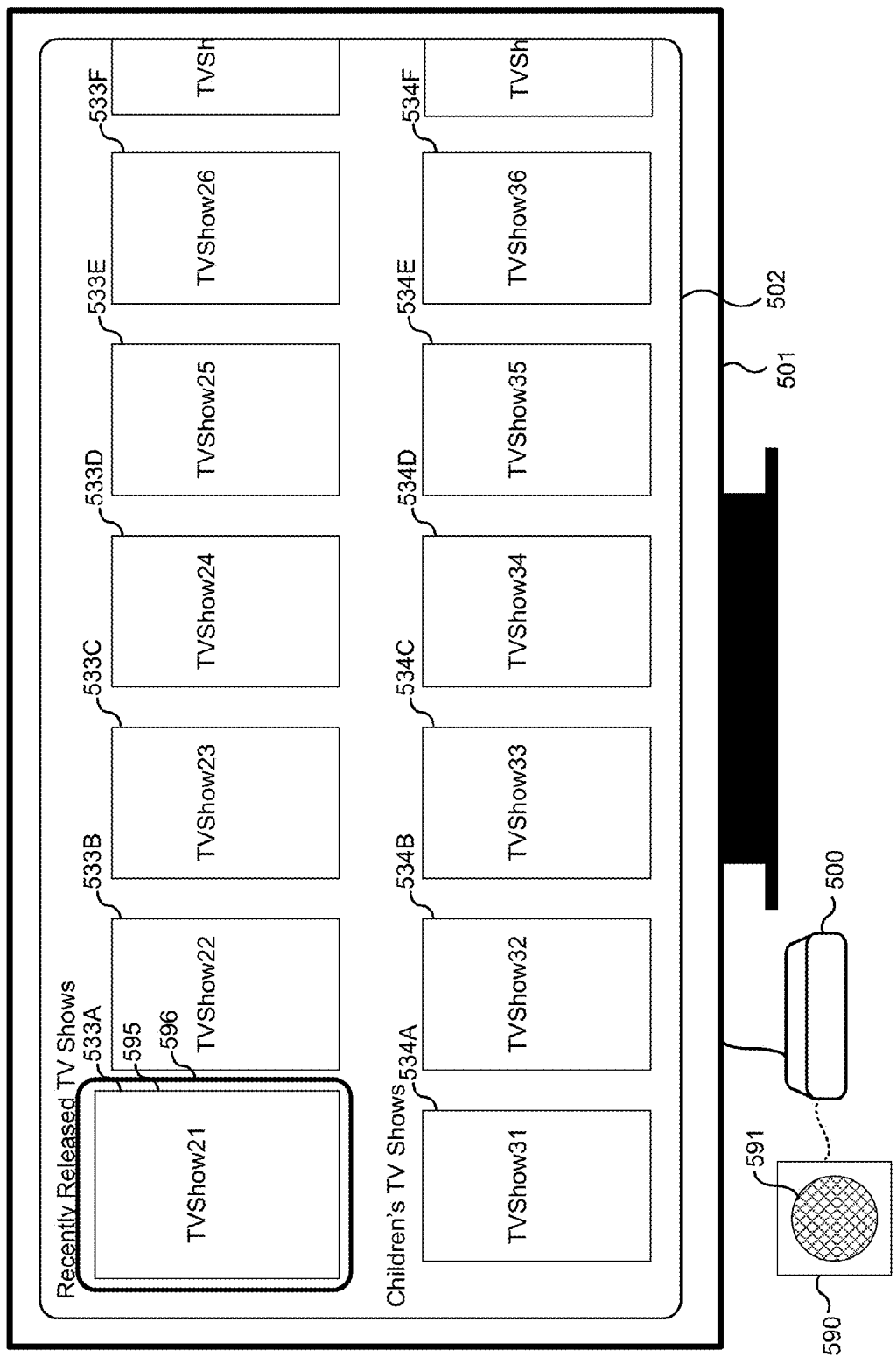
Figure 5A:
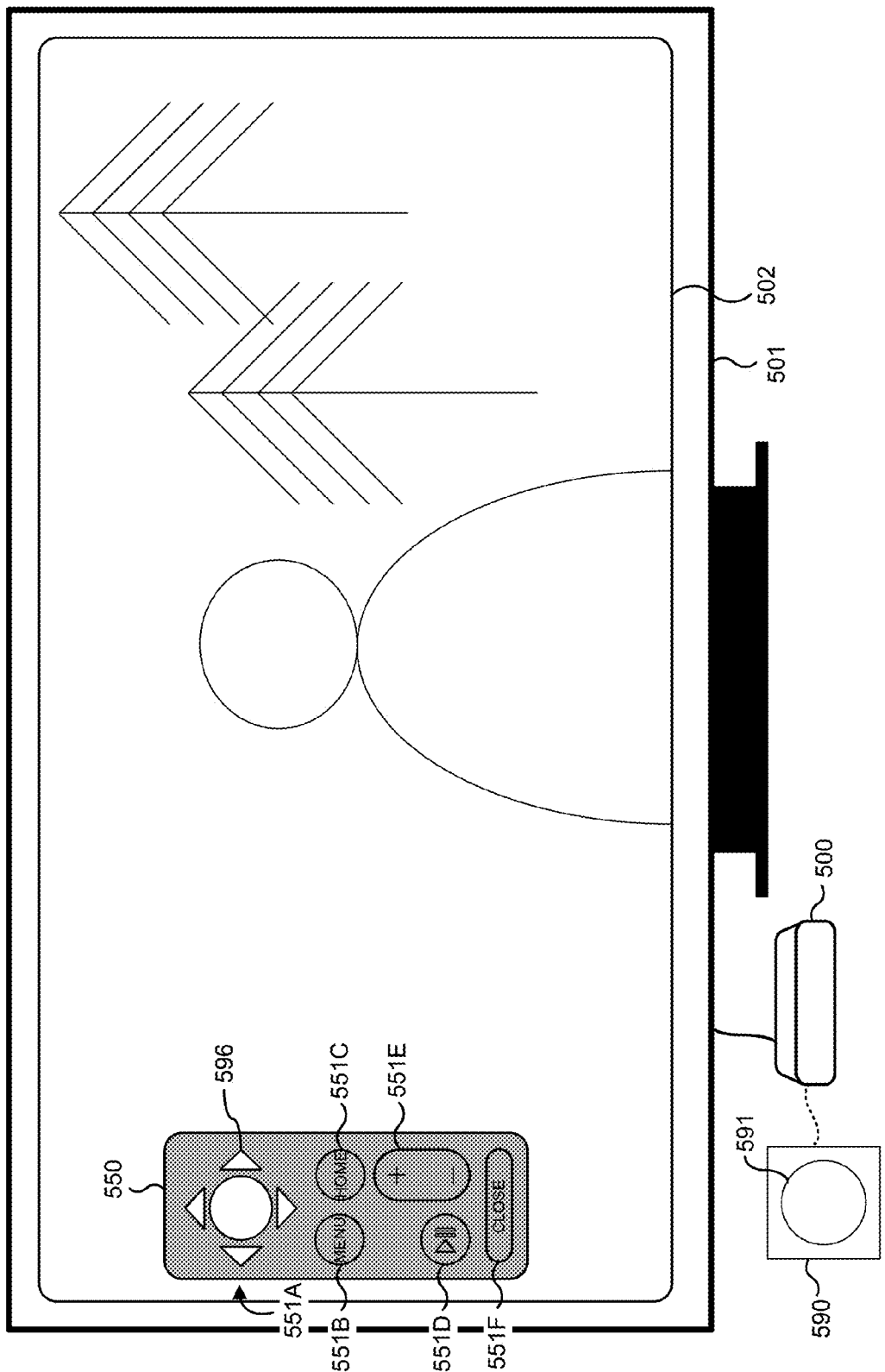
Figure 5A:
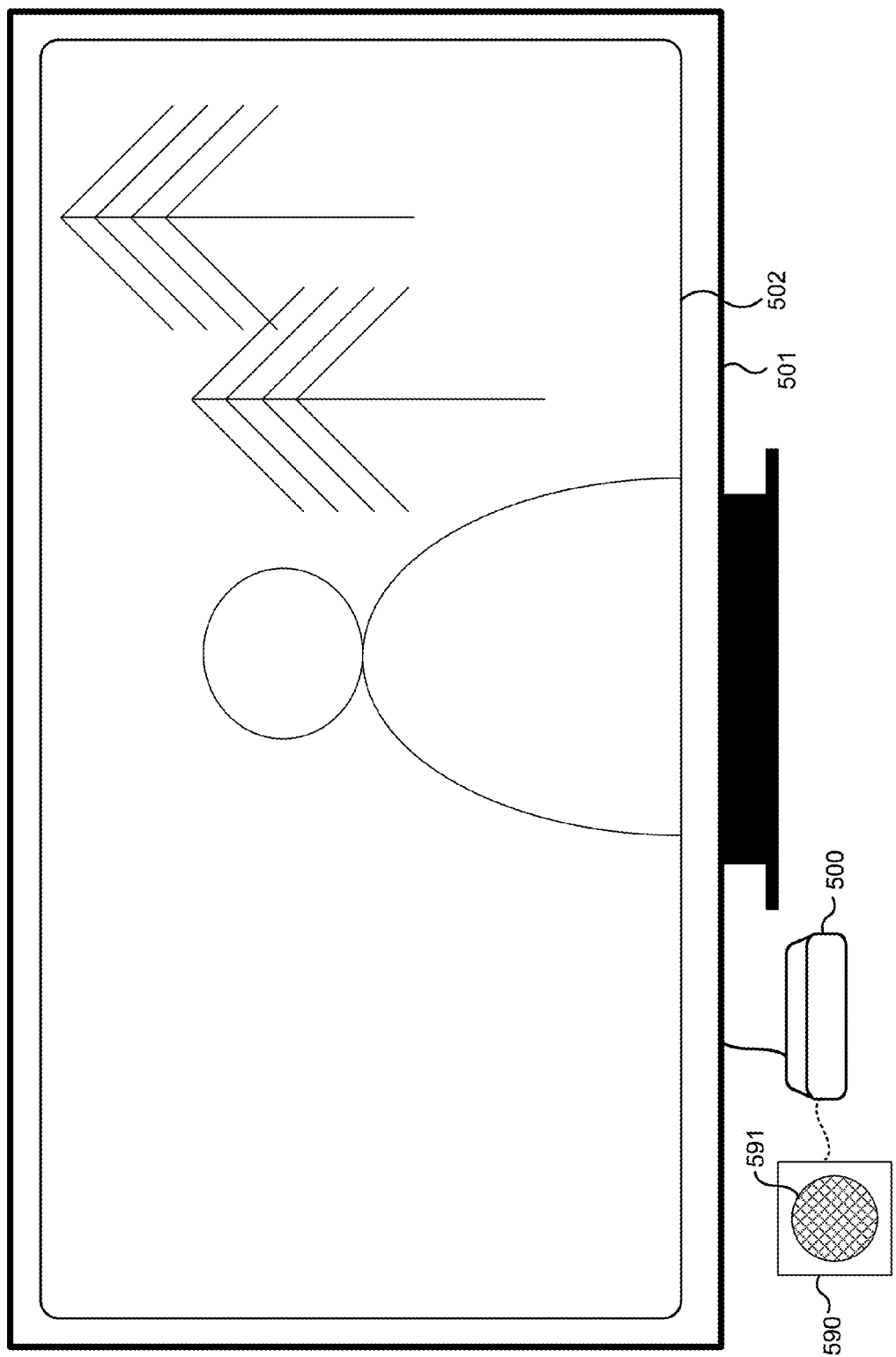
Figure 5A:
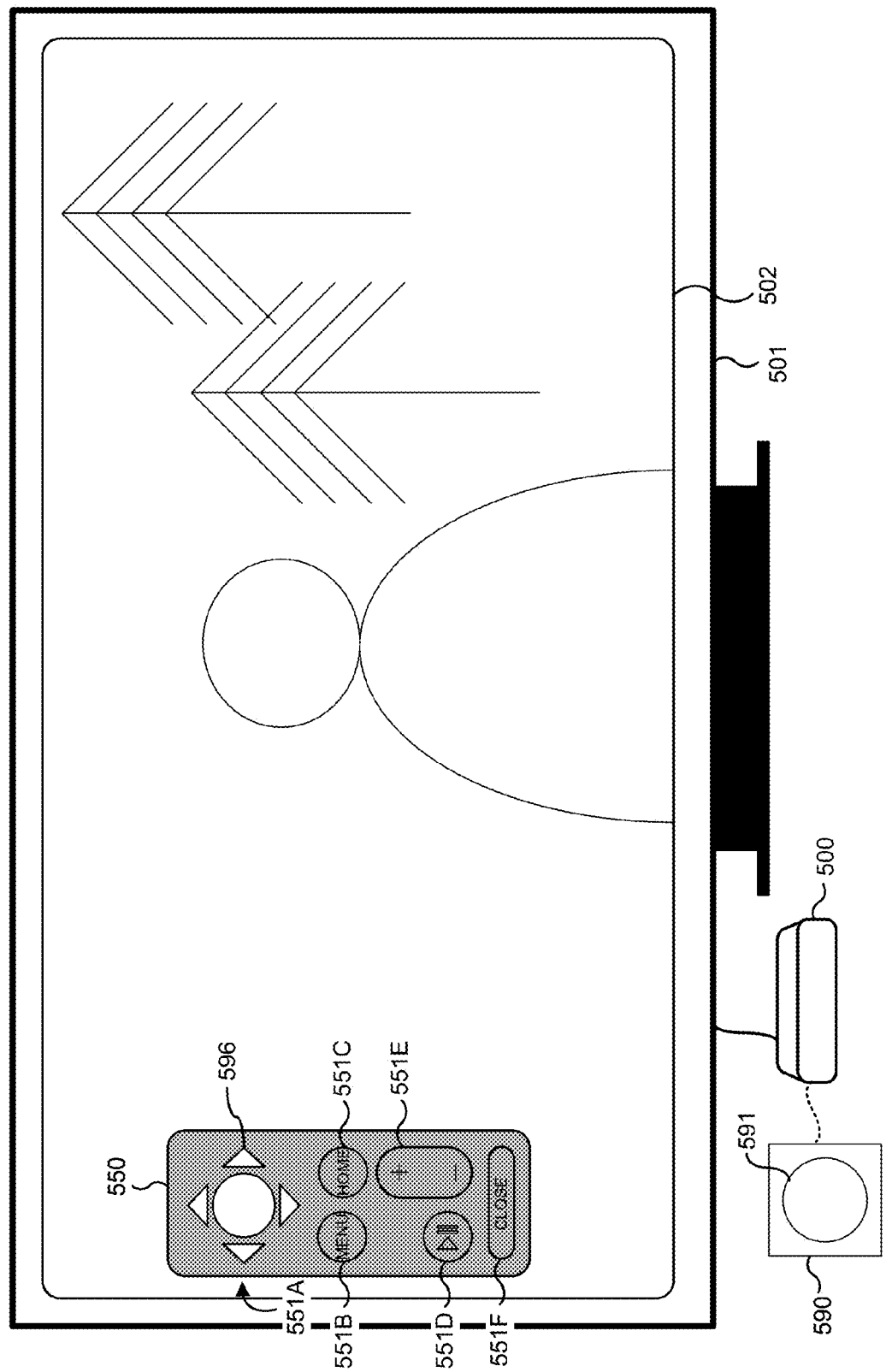
Figure 6A:
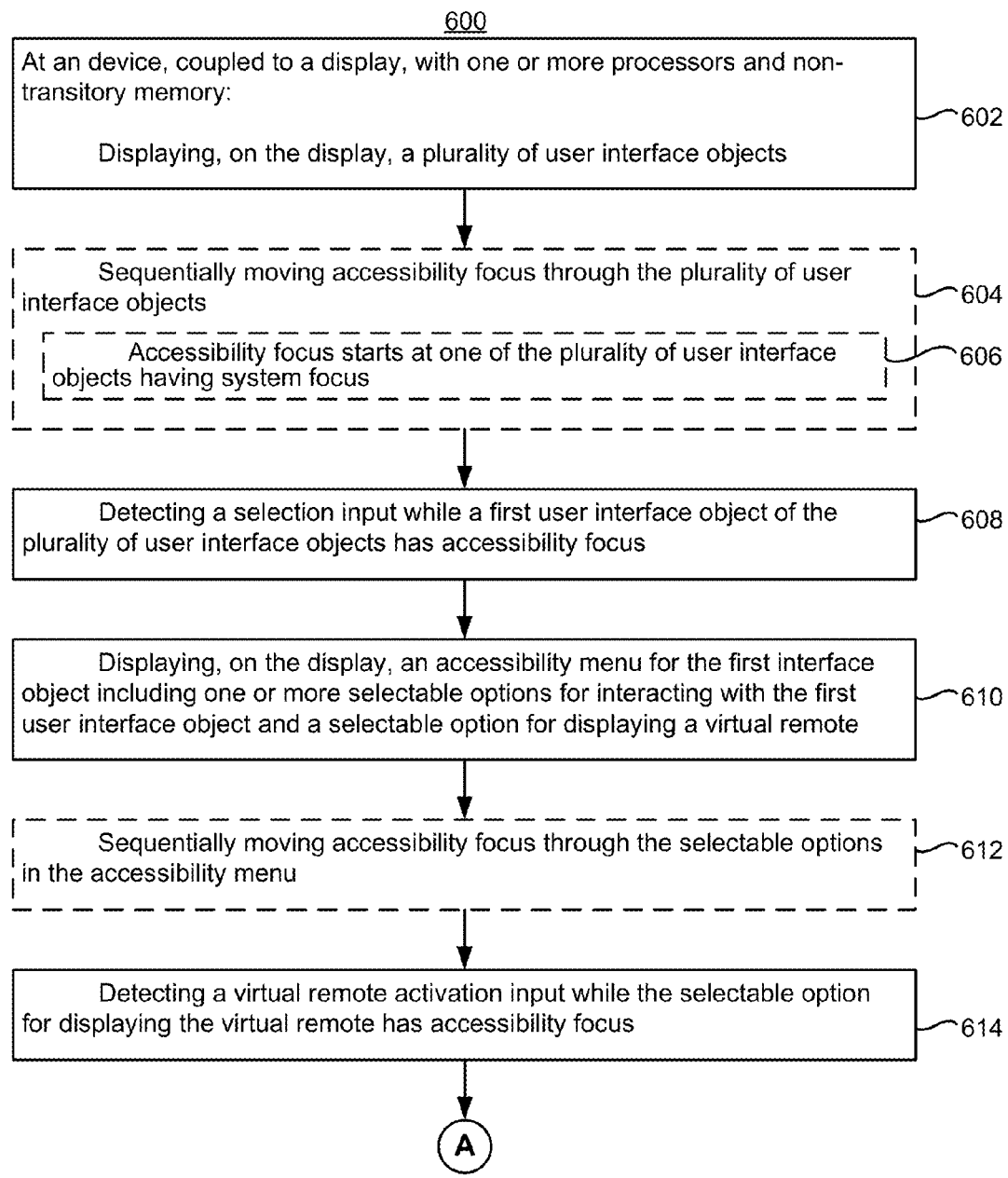
FIGS. 6A-6D are flow diagrams illustrating a method of playing back media items in accordance with some embodiments.
Figure 6B:
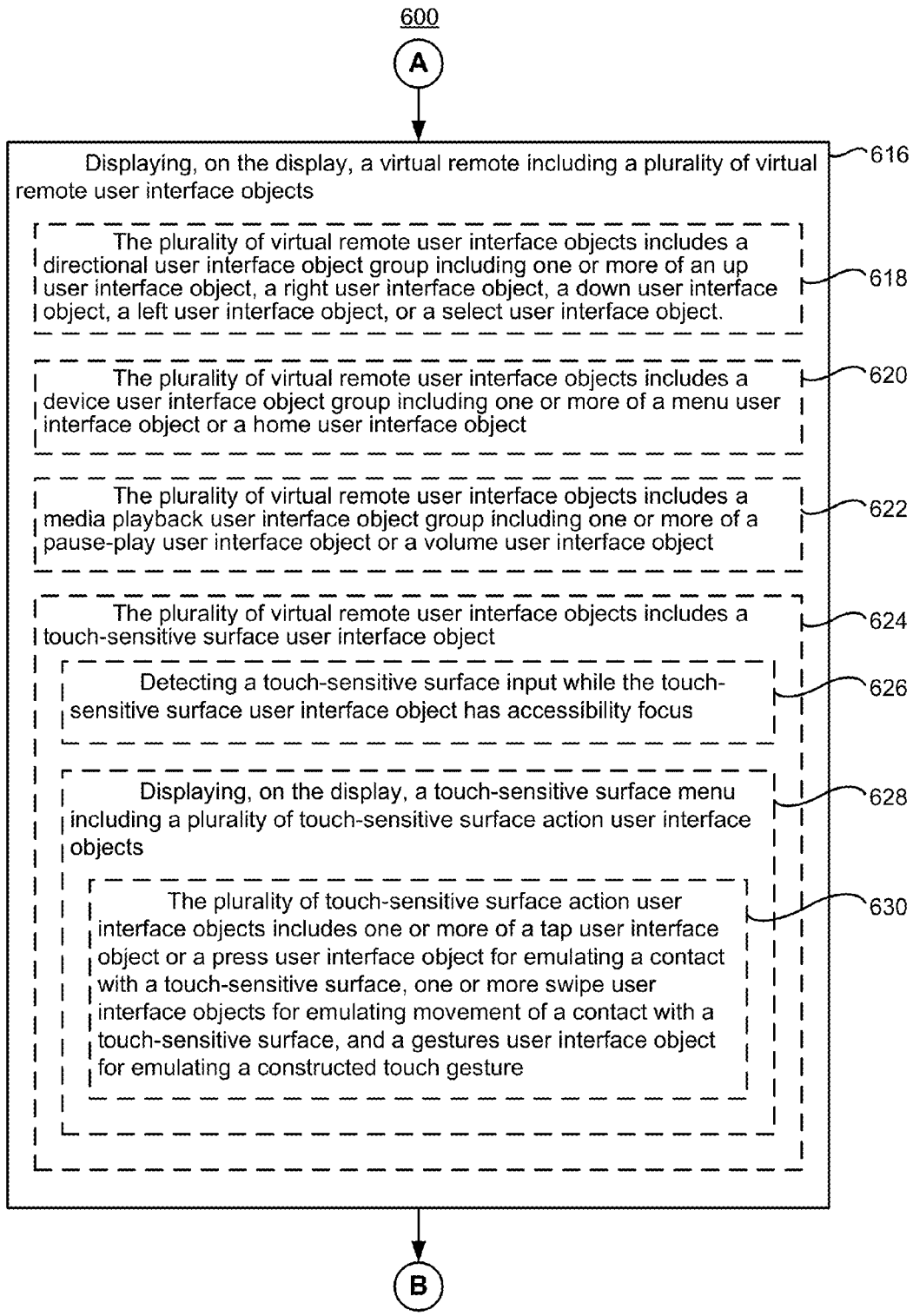
Figure 6C:
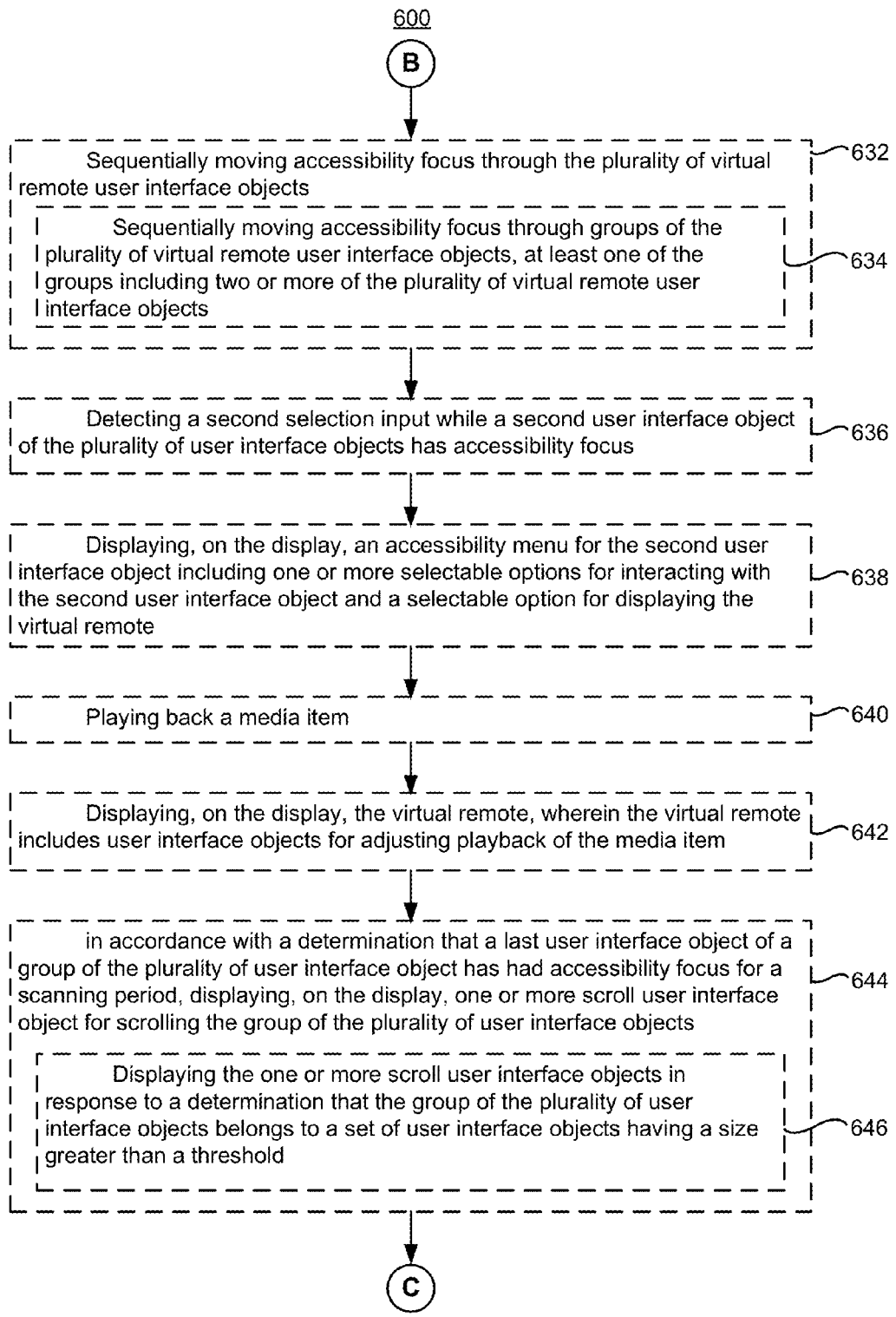
Figure 6D:
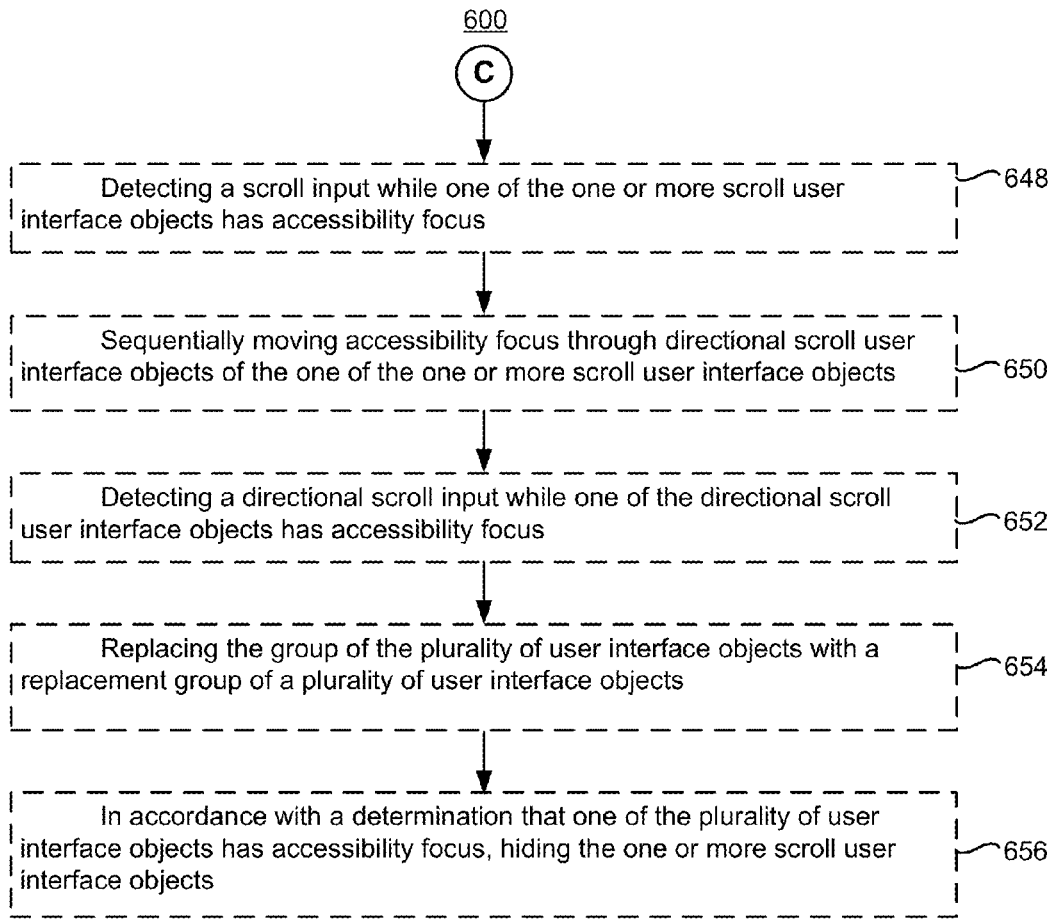

FIG. 5Z illustrates the user interface 502 of FIG. 5Y in response to detecting the select input. In FIG. 5Z, a touch-sensitive surface menu 554 is displayed including a plurality of touch-sensitive surface action user interface objects 555A-555G. The touch-sensitive surface action user interface objects include a tap user interface object 555A for emulating a tap (e.g., a contact) of a touch-sensitive surface of a remote of the media player 500. The touch-sensitive surface action user interface objects include a press user interface object 555A for emulating a press (e.g., a stronger contact) of a touch-sensitive surface of a remote of the media player 500. The touch-sensitive surface action user interface objects include a swipe left user interface object 555C for emulating a leftward swipe on a touch-sensitive surface of a remote of the media player 500. The touch-sensitive surface action user interface objects include a swipe up user interface object 555D for emulating an upward swipe on a touch-sensitive surface of a remote of the media player 500. The touch-sensitive surface action user interface objects include a swipe right user interface object 555E for emulating a rightward swipe on a touch-sensitive surface of a remote of the media player 500. The touch-sensitive surface action user interface objects include a swipe down user interface object 555F for emulating a downward swipe on a touch-sensitive surface of a remote of the media player 500. The touch-sensitive surface action user interface objects include a gestures user interface object 555F for constructing a touch gesture to be emulated as though it were input on a touch-sensitive surface of a remote of the media player 500. In FIG. 5Z, the tap user interface object 555A of the touch-sensitive surface menu 554 has accessibility focus 596.

FIG. 5AA illustrates the user interface 502 of FIG. 5Z after a scanning period. In FIG. 5AA, the press user interface object 555B of the touch-sensitive surface menu 554 has accessibility focus 596. FIG. 5AB illustrates the user interface 502 of FIG. 5AA after a scanning period. In FIG. 5AB, the swipe left user interface object 555C of the touch-sensitive surface menu 554 has accessibility focus 596. FIG. 5AB illustrates that the first switch 591 of the switch device 590 is activated, resulting in a select input detected by the media player 500.

FIG. 5AC illustrates the user interface 502 of FIG. 5AB in response to detecting the select input. In FIG. 5AC, the emulated leftward swipe has moved system focus 595 from the applications user interface object 511D (in FIG. 5AB) to the music user interface object 511C (in FIG. 5AC). As illustrated in FIG. 5AC, in response to the select input, the touch-sensitive surface menu 554 remains displayed. Further, accessibility focus 596 is not moved (e.g., the swipe left user interface object 555C still has accessibility focus 596), allowing a user to quickly move the system focus 595 many times in the same direction.

FIG. 5AC illustrates that the first switch 591 of the switch device 590 is activated, resulting in a select input detected by the media player 500.

FIG. 5AD illustrates the user interface 502 of FIG. 5AC in response to detecting the select input. In FIG. 5AD, the emulated leftward swipe has moved system focus 595 from the music user interface object 511C (in FIG. 5AC) to the television shows user interface object 511B (in FIG. 5AD). As also illustrated in FIG. 5AD, in response to the select input, the touch-sensitive surface menu 554 remains displayed. Further, accessibility focus 596 is not moved (e.g., the swipe left user interface object 555C still has accessibility focus 596), allowing a user to quickly move the system focus 595 many times in the same direction.

FIG. 5AE illustrates the user interface 502 of FIG. 5AD after a number of scanning periods. In FIG. 5AE, the tap user interface object 555A once again has accessibility focus 596. Thus, not shown are the user interface 502 after a first scanning period in which accessibility focus 596 is moved to the swipe up user interface object 555D, after a second scanning period in which accessibility focus 596 is moved to the swipe right user interface object 555E, etc., until accessibility focus 596 is returned to the tap user interface object 555A.

FIG. 5AE illustrates that the first switch 591 of the switch device 590 is activated, resulting in a select input detected by the media player 500.

FIG. 5AF illustrate the user interface 502 of FIG. 5AE in response to detecting the select input and additional inputs and time to replace the touch-sensitive surface user interface object of the virtual remote 550 with the directional interface group 551A, move the virtual remote 550 to a right side of the user interface, and have the accessibility focus 596 move to the down user interface object 552C of the directional user interface object group 551A.

In FIG. 5AF, the user interface 502 displays the virtual remote 550 over a television shows user interface including a plurality of television shows user interface objects 531A-531F, 532A-532F. In FIG. 5AF, the television shows user interface objects include a group of recently watch television shows user interface objects 531A-531F and a group of top television shows user interface objects 532A-532F. FIG. 5AF illustrates that a first one of the recently watched television shows user interface objects 531A has system focus 595 (and that the down user interface object 552C of the directional user interface object group 551A of the virtual remote 550 has accessibility focus 596).

FIG. 5AF illustrates that the first switch 591 of the switch device 590 is activated, resulting in a select input detected by the media player 500.

FIG. 5AG illustrates the user interface 502 of FIG. 5AF in response to detecting the select input. In FIG. 5AG, selection of the down user interface object 511C has moved system focus 595 from the first one of the recently watched television shows user interface objects 531A (in FIG. 5AF) to a first one of the top television shows user interface objects 532A (in FIG. 5AG). As illustrated in FIG. 5AG, in response to the select input, accessibility focus 596 is not moved (e.g., the down user interface object 552C still has accessibility focus 596), allowing a user to quickly move the system focus 595 many times in the same direction.

FIG. 5AG illustrates that the first switch 591 of the switch device 590 is activated, resulting in a select input detected by the media player 500.

FIG. 5AH illustrates the user interface 502 of FIG. 5AG in response to detecting the select input. In FIG. 5AH, the television shows user interface is scrolled down to replace the recently watched television shows user interface objects 531A-531F and top television shows user interface objects 532A-432F with recently released television shows user interface objects 533A-533F and children's television shows user interface objects 534A-534F. Further, the system focus 595 is moved the first one of the top television shows user interface objects 533A to a first one of the recently released television shows user interface objects 533A. As illustrated in FIG. 5AH, in response to the select input, accessibility focus 596 is not moved (e.g., the down user interface object 552C still has accessibility focus 596), allowing a user to quickly move the system focus 595 many times in the same direction.

FIG. 5AI illustrates the user interface 502 of FIG. 5AH after a number of scanning periods. In FIG. 5AI, the right user interface object 552B of the directional user interface object group 551A has accessibility focus 596. Thus, not shown are the user interface 502 after a first scanning period in which accessibility focus 596 is moved to the left user interface object 552D, after a second scanning period in which accessibility focus 596 is moved to the select user interface object 555E, etc., until accessibility focus 596 is returned to the right user interface object 552B.

FIG. 5AI illustrates that the first switch 591 of the switch device 590 is activated, resulting in a select input detected by the media player 500.

FIG. 5AJ illustrates the user interface 502 of FIG. 5AI in response to detecting the select input. In FIG. 5AJ, selection of the right user interface object 552B has moved system focus 595 from the first one of the recently released television shows user interface objects 533A (in FIG. 5AI) to a second one of the recently released television shows user interface objects 533B (in FIG. 5AI). As illustrated in FIG. 5AJ, in response to the select input, accessibility focus 596 is not moved (e.g., the right user interface object 552B still has accessibility focus 596), allowing a user to quickly move the system focus 595 many times in the same direction.

FIG. 5AJ illustrates that the first switch 591 of the switch device 590 is activated, resulting in a select input detected by the media player 500.

FIG. 5AK illustrates the user interface 502 of FIG. 5AJ in response to detecting the select input. In FIG. 5AK, selection of the right user interface object 552B has moved system focus 595 from the second one of the recently released television shows user interface objects 533B (in FIG. 5AJ) to a third one of the recently released television shows user interface objects 533C (in FIG. 5AK). As illustrated in FIG.

5AK, in response to the select input, accessibility focus 596 is not moved (e.g., the right user interface object 552B still has accessibility focus 596), allowing a user to quickly move the system focus 595 many times in the same direction.

FIG. 5AL illustrates the user interface 502 of FIG. 5AK in response to time and/or inputs to move accessibility focus to the close user interface object 551F of the virtual remote 550. FIG. 5AL illustrates that the first switch 591 of the switch device 590 is activated, resulting in a select input detected by the media player 500.

FIG. 5AM illustrates the user interface 502 of FIG. 5AL in response to detecting the selection input. In FIG. 5AM, the virtual remote 550 is no longer displayed and accessibility focus 596 is indicated by a selection indicator surrounding the third one of the recently released television shows user interface objects 533C. Thus, when the virtual remote 550 is closed, accessibility focus 596 is moved to a user interface object with system focus 595, not necessarily to a first user interface object (or first group of user interface objects) of the user interface (or group of user interface objects).

FIG. 5AN illustrates the user interface 502 of FIG. 5AM after a scanning period. In FIG. 5AN, accessibility focus 596 is moved to a next user interface object (e.g., the fourth recently released television shows user interface object 533D) without moving the system focus 595. FIG. 5AO illustrates the user interface 502 of FIG. 5AN after a scanning period. In FIG. 5AO, a fifth recently released television show user interface object 533E has accessibility focus 596. FIG. 5AP illustrates the user interface 502 of FIG. 5AO after a scanning period. In FIG. 5AP, a sixth recently released television show user interface object 533F has accessibility focus 596.

FIG. 5AQ illustrates the user interface 502 of FIG. 5AP after a scanning period. The user interface 502 includes a vertical scroll user interface object 541 for scrolling the television shows user interface vertically and a horizontal scroll user interface object 543 for scrolling the recently released television shows user interface objects 533A-533F horizontally.

In various implementations, after a scanning period with accessibility focus at a last displayed user interface object of a group of user interface objects (e.g., the last displayed recently released television shows user interface object 533F), the user interface 502 includes one or more scroll user interface objects (one of which has accessibility focus 596). Further, when none of the scroll user interface objects has accessibility focus, the scroll user interface objects are hidden (e.g., not displayed).

In FIG. 5AQ, the vertical scroll user interface object 541 includes a scroll up user interface object 542A (which has accessibility focus 596) and does not include scroll down user interface object. The scroll up user interface object 542A, when selected, scrolls up the television shows user interface (to the state of FIG. 5AF). In some embodiments, the vertical scroll user interface object 541 includes a scroll down user interface object for scrolling down the television show user interface. In some embodiments, the vertical scroll user interface object 541 includes the scroll down user interface object when accessibility focus completes a cycle through a user interface object group at the bottom of the user interface 502.

In FIG. 5AQ, the horizontal scroll user interface object 543 includes a scroll right user interface object 544A and does not include a scroll left user interface object. The scroll right user interface object 544A, when selected, scrolls the recently released televisions shows user interface objects 533A-533F to show user interface objects to the right (as illustrated by FIG. 5AS, described below).

FIG. 5AR illustrates the user interface 502 of FIG. 5AQ after a scanning period. In FIG. 5AQ, the scroll right user interface object 544A of the horizontal scroll user interface object 543 has accessibility focus 596. FIG. 5AR illustrates that the first switch 591 of the switch device 590 is activated, resulting in a select input detected by the media player 500.

FIG. 5AS illustrates the user interface 502 of FIG. 5AR in response to detecting the select input. In FIG. 5AS, in response to detecting selection of the scroll right user interface object 544A in FIG. 5AR, the first group of recently released television shows user interface objects 533A-533F are replaced (e.g., scrolled to the left and replaced) with a second group of recently released television show user interface objects 533G-533L. Further, the first one of the second group has system focus 595 and accessibility focus 596.

FIG. 5AT illustrates the user interface 502 of FIG. 5AS after a number of scanning periods. In FIG. 5AT, the horizontal scroll user interface object has accessibility focus 596. Thus, not shown are the user interface 502 after a first scanning period in which accessibility focus 596 is moved to a second one of the second group of recently released television show user interface objects 533H, after a second scanning period in which accessibility focus 596 is moved to a third one of the second group of recently released television show user interface objects 533I, etc., until accessibility focus is moved to the horizontal scroll user interface object 543.

In FIG. 5AT, the horizontal scroll user interface object 543 includes the scroll right user interface object 544A (for replacing the second group with a third group) and also includes a scroll left user interface object 544B for scrolling the recently released television show user interface objects 533G-533L to show user interface object to the left (and replacing the second group with the first group of recently released television shows user interface objects 533A-533F).

FIG. 5AT illustrates that the first switch 591 of the switch device 590 is activated, resulting in a select input detecting by the media player 500.

FIG. 5AU illustrates the user interface 502 of FIG. 5AT in response to detecting the select input. In FIG. 5AU, the scroll left user interface object 544B has accessibility focus 596. After a scanning period, the scroll right user interface object 544A would have accessibility focus. Thus, in some implementations, selecting a scroll user interface object is a two-step process in which a user selects one of the horizontal scroll user interface object or vertical scroll user interface object and then selects one of the scroll up user interface object or scroll down user interface object or then selects one of the scroll left user interface object or scroll right user interface object.

FIG. 5AU illustrates that the first switch 591 of the switch device 590 is activated, resulting in a select input detected by the media player 500.

FIG. 5AV illustrates the user interface 502 of FIG. 5AU in response to detecting the select input. In FIG. 5AV, in response to detecting selection of the scroll left user interface object 544B in FIG. 5AU, the second group of recently released television shows user interface objects 533G-533L are replaced (e.g., scrolled to the right and replaced) with the first group of recently released television show user interface objects 533A-533F. Further, the first one of the first group has system focus 595 and accessibility focus 596.

FIG. 5AV illustrates that the first switch 591 of the switch device 590 is activated, resulting in a select input detected by the media player 500.

FIG. 5AW illustrates the user interface 502 of FIG. 5AV in response to detecting the select input (and possibly other inputs and/or time to result in a media item corresponding to the first one of the recently released television show user interface objects 533A being played back). In FIG. 5AW, in response to playing back the media item, the user interface 502 includes the virtual remote 550.

FIG. 5AX illustrates the user interface 502 of FIG. 5AW after a remote time period. After no user interaction is detected while playing back a media item, the virtual remote 550 is hidden, allowing a user to better consume the media item. The remote time period can be, in some embodiments, a set time period. The remote time period can be, in some embodiments, a number of cycles through the virtual remote user interface object groups and, thus, a number of scanning periods.

FIG. 5AX illustrates that the first switch 591 of the switch device 590 is activated, resulting in a select input detected by the media player 500.

FIG. 5AY illustrates the user interface 502 of FIG. 5AX in response to detecting the select input. In response to the select input (or any other input) while media playback is occurring and the virtual remote 550 is hidden, the virtual remote 550 is displayed for at least the remote time period.

FIGS. 6A-6D illustrate a flow diagram of a method 600 of playing back media items in an accessibility mode in accordance with some embodiments. The method 600 is performed at an electronic device (e.g., the portable multifunction device 100 in FIG. 1A, or the device 300 in FIG. 3), coupled to a display, with one or more processors and non-transitory memory. Some operations in method 600 are, optionally, combined and/or the order of some operations is, optionally, changed.

As described below, the method 600 provides an intuitive way to playback media items in an accessibility mode. The method reduces the cognitive burden on a user when playing back media items in an accessibility mode, thereby creating a more efficient human-machine interface. For battery-operated electronic devices, enabling a user to playback media items in an accessibility mode faster and more efficiently conserves power and increases the time between battery charges.

The device displays (602), on the display, a plurality of user interface objects. For example, in FIG. 5A, the device display, on the display 501, a user interface 502 including a set of top movies user interface objects 510 and a plurality of media user interface objects 511A-511D.

In some embodiments, the device sequentially moves (604) accessibility focus through the plurality of user interface objects. For example, in FIGS. 5A-5C, accessibility focus 596 moves from the movies user interface object 511A, to the television shows user interface object 511B, to the music user interface object 511C.

In some embodiments, the accessibility focus starts (606) at one of the plurality of user interface objects having system focus. For example, in FIG. 5A, the movies user interface object 511A has system focus 595 and accessibility focus 596. As another example, in FIGS. 5AM-5AP, the device moves accessibility focus 596 through the recently released television shows user interface objects 533A-533F, starting (in FIG. 5AM) with the third recently released television shows user interface object 533A which has system focus 595.

The device detects (608) a selection input while a first user interface object of the plurality of user interface objects has accessibility focus. For example, in FIG. 5C, the device detects an input from the switch device 590 while the music user interface object 511C has accessibility focus 596.

In response to detecting the selection input, the device displays (610), on the display, an accessibility menu for the first interface object including one or more selectable options for interacting with the first user interface object and a selection option for displaying a virtual remote. The virtual remote provides an efficient mechanism for the user to navigate the user interface. Such efficiency conserves power and increases the time between battery charges for battery-operated devices. Further, an efficient user interface reduces wear-and-tear of the input device. For example, in FIG. 5D, in response to detecting the input from the switch device 590 while the music user interface object 511C had accessibility focus 596 in FIG. 5C, the device display the accessibility menu 520. The accessibility menu 520 includes a select user interface object 521A for selecting the music user interface object 511C and includes the virtual remote activation user interface object 521B for displaying the virtual remote 550.

In some embodiments, the device sequentially moves (612) accessibility focus through the selectable options in the accessibility menu. For example, in FIGS. 5D-5I, the device moves accessibility focus 596 through the accessibility menu user interface objects 521A-521F.

The device detects (614) a virtual remote activation input while the selectable option for displaying the virtual remote has accessibility focus. For example, in FIG. 5M, the device detects an input from the switch device 590 while the virtual remote activation user interface object 521B has accessibility focus 596.

In response to detecting the virtual remote activation input, the device displays (616), on the display, a virtual remote including a plurality of virtual remote user interface objects. For example, in FIG. 5N, in response to detecting the input from the switch device 590 while the virtual remote activation user interface object 511C had accessibility focus 596 in FIG. 5M, the device display the virtual remote 550 including a plurality of virtual remote user interface objects 551A-551F.

In some embodiments, the plurality of virtual remote user interface objects includes (618) a directional user interface object group including one or more of an up user interface object, a right user interface object, a down user interface object, a left user interface object, or a select user interface object. The directional user interface object group provides an option to user to quickly and efficiently highlight user interface objects for selection. Such efficiency conserves power and increases the time between battery charges for battery-operated devices. Further, an efficient user interface reduces wear-and-tear of the input device. For example, in FIG. 5S, the virtual remote 550 includes a directional user interface object group 551A including an up user interface object 552A, a right user interface object 552B, a down user interface object 552C, a left user interface object 552D, and a select user interface object 552E.

In some embodiments, the plurality of virtual remote user interface objects includes (620) a device user interface object group including one or more of a menu user interface object or a home user interface object. For example, in FIG. 5S, the virtual remote 550 includes a device user interface object group including a menu user interface object 551B and a home user interface object 551C.

In some embodiments, the plurality of virtual remote user interface objects includes (622) a media playback user interface object group including one or more of a pause-play user interface object or a volume user interface object. For example, in FIG. 5S, the virtual remote 550 includes a media playback user interface object group including a pause-play user interface object 551D and a volume user interface object 551E.

In some embodiments, the plurality of virtual remote user interface objects includes (624) a touch-sensitive surface user interface object. For example, in FIG. 5Y, the virtual remote 550 includes a touch-sensitive surface user interface object 553.

In some embodiments, the device detects (626) a touch-sensitive surface input while the touch-sensitive surface user interface object has accessibility focus. For example, in FIG. 5Y, the device detects an input from the switch device 590 while the touch-sensitive surface user interface object 553 has accessibility focus 596.

In some embodiments, in response to detecting the touch-sensitive surface input, the device displays (628), on the display, a touch-sensitive surface menu including a plurality of touch-sensitive surface action user interface objects. For example, in FIG. 5Z, in response to detecting the detecting the input from the switch device 590 while the touch-sensitive surface user interface object 553 had accessibility focus 596 in FIG. 5Y, the device display the touch-sensitive surface menu 554 including a plurality of touch-sensitive surface action user interface objects 555A-555G.

In some embodiments, the plurality of touch-sensitive surface action user interface objects includes (630) one or more of a tap user interface object or a press user interface object for emulating a contact with a touch-sensitive surface, one or more swipe user interface objects for emulating movement of a contact with a touch-sensitive surface, and a gestures user interface object for emulating a constructed touch gesture. The touch-sensitive surface action interface object group provides an option to user to quickly and efficiently emulate a variety of touch gestures to perform a variety of functions. Such efficiency conserves power and increases the time between battery charges for battery-operated devices. Further, an efficient user interface reduces wear-and-tear of the input device. For example, in FIG. 5Y, the touch-sensitive surface menu 554 includes a tap user interface object 555A for emulating a tap (e.g., a contact) of a touch-sensitive surface of a remote of the media player 500, a press user interface object 555A for emulating a press (e.g., a stronger contact) of a touch-sensitive surface of a remote of the media player 500, a swipe left user interface object 555C for emulating a leftward swipe on a touch-sensitive surface of a remote of the media player 500, a swipe up user interface object 555D for emulating an upward swipe on a touch-sensitive surface of a remote of the media player 500, a swipe right user interface object 555E for emulating a rightward swipe on a touch-sensitive surface of a remote of the media player 500, a swipe down user interface object 555F for emulating a downward swipe on a touch-sensitive surface of a remote of the media player 500, and a gestures user interface object 555F for constructing a touch gesture to be emulated as though it were input on a touch-sensitive surface of a remote of the media player 500.

In some embodiments, while displaying the virtual remote, the device sequentially moves (632) accessibility focus through the plurality of virtual remote user interface objects. For example, in FIGS. 5N-5Q, the device sequentially moves accessibility focus 596 through the virtual remote user interface objects 551A-551F.

In some embodiments, the device sequentially moves (634) accessibility focus through groups of the plurality of virtual remote user interface objects, at least one of the groups including two or more of the plurality of virtual remote user interface objects. For example, in FIGS. 5N-5Q, the device sequentially moves accessibility focus 596 from the directional user interface objects group 551A (including a plurality of directional user interface objects 552A-552E), to the device user interface object group (including the menu user interface object 551B and the home user interface object 551C), to the media playback user interface object group (including the pause-play user interface object 551D and the volume user interface object 551E), to the close user interface object 551F.

In some embodiments, the device detects (636) a second selection input while a second user interface object of the plurality of user interface objects has accessibility focus. In some embodiments, in response to detecting the second selection input, the device displays (638) an accessibility menu for the second user interface object including one or more selectable options for interacting with the second user interface object and a selectable option for displaying the virtual remote. Thus, selection of any of multiple user interface objects displays the selectable option for displaying the virtual remote, making it quick and easy for a user to select the option for displaying the virtual remote (and increasing the likelihood that the user will select the option and employ the efficient mechanism of the virtual remote). Such efficiency conserves power and increases the time between battery charges for battery-operated devices. Further, an efficient user interface reduces wear-and-tear of the input device. For example, in FIG. 5C, the device detects an input from the switch device 590 while the music user interface object 511C has accessibility focus 596 and, in response, in FIG. 5D, displays the accessibility menu 520 (including the virtual remote activation user interface object 521B). Further, in FIG. 5K, the device detects an input from the switch device 590 while the applications user interface object 511D has accessibility focus 596 and, in response, in FIG. 5L, displays the accessibility menu 520 (including the virtual remote activation user interface object 521B).

In some embodiments, the device plays back (640) a media item. For example, in FIG. 5AW, the device plays back a media item corresponding to the first one of the recently released television show user interface objects 533A.

In some embodiments, in response to playing back a media item, the device displays (642), on the display, the virtual remote, wherein the virtual remote includes user interface objects for adjusting playback of the media item. For example, in FIG. 5AW, the device displays the virtual remote 550. The virtual remote 550 includes, for example, the pause-play user interface object 551D for toggling pausing or playback of the media item, the right user interface object 552B for fast forwarding, the left user interface object 552D, and the volume user interface object 551E for adjusting the volume of audio of the media item.

In some embodiments, in accordance with a determination that a last user interface object of a group of the plurality of user interface object has had accessibility focus for a scanning period, the device displays (644), on the display, one or more scroll user interface object for scrolling the group of the plurality of user interface objects. For example, in FIG. 5AQ, in accordance with a determination that the last recently released television shows user interface objects 533F has had accessibility focus 596 for a scanning period (e.g., in FIG. 5AP), the device displays the horizontal scroll user interface object 543 for scrolling through recently released television shows user interface objects.

In some embodiments, the device displays (646) the one or more scroll user interface objects in response to a determination that the group of the plurality of user interface objects belongs to a set of user interface objects having a size greater than a threshold. Thus, users are provided with an efficient mechanism for scrolling through large sets of user interface objects. Such efficiency conserves power and increases the time between battery charges for battery-operated devices. Further, an efficient user interface reduces wear-and-tear of the input device. For example, in FIG. 5AQ, the device can display the horizontal scroll user interface object 543 in response to determining that the displayed group of recently released television shows user interface objects 533A-533F belong to a set of recently released television show user interface objects (which can also include, for example, a second group of recently released television shows user interface objects 533G-533L) having a size greater than a threshold.

In some embodiments, the device detects (646) a scroll input while one of the one or more scroll user interface objects has accessibility focus. For example, in FIG. 5AT, the device detects an input from the switch device 590 while the horizontal scroll user interface 543 object has accessibility focus 596. As another example, in FIG. 5AR, the device detect an input from the switch device 590 while the right scroll user interface object 544A has accessibility focus 596.

In some embodiments, in response to detecting the scroll input, the device sequentially moves (650) accessibility focus through directional scroll user interface objects of the one of the one or more scroll user interface objects. For example, in FIG. 5AU, the device moves accessibility focus 596 to the left scroll user interface object 544B and, after a scanning period were the input from the switch device 590 not detected, moves accessibility focus 596 to the right scroll user interface object 544A.

In some embodiments, the device detects (652) a directional scroll input while one of the directional scroll user interface objects has accessibility focus. For example, in FIG. 5AU, the device detects an input from the switch device 590 while the left scroll user interface object 544B has accessibility focus 596.

In some embodiments, in response to detecting the directional scroll input, the device replaces (654) the group of the plurality of user interface objects with a replacement group of a plurality of user interface objects. For example, in FIG. 5AV, in response to detecting the input from the switch device 590 while the left scroll user interface object 544B had accessibility focus 596 in FIG. 5AU, the device replaces a first group of the recently released television shows user interface objects 533G-533L (in FIG. 5AV) with a second group of the recently released television shows user interface objects 533A-533F (in FIG. 5AU).

In some embodiments, in accordance with a determination that one of the plurality of user interface objects has accessibility focus, the device hides (656) the one or more scroll user interface objects. For example, in FIG. 5AV, while a first one of the recently released television show user interface objects 533A has accessibility focus 596, the device does not display the vertical scroll user interface object 541 or the horizontal scroll user interface object 543.

It should be understood that the particular order in which the operations in FIGS. 6A-6D have been described is merely example and is not intended to indicate that the described order is the only order in which the operations could be performed. One of ordinary skill in the art would recognize various ways to reorder the operations described herein.

Figure 7:
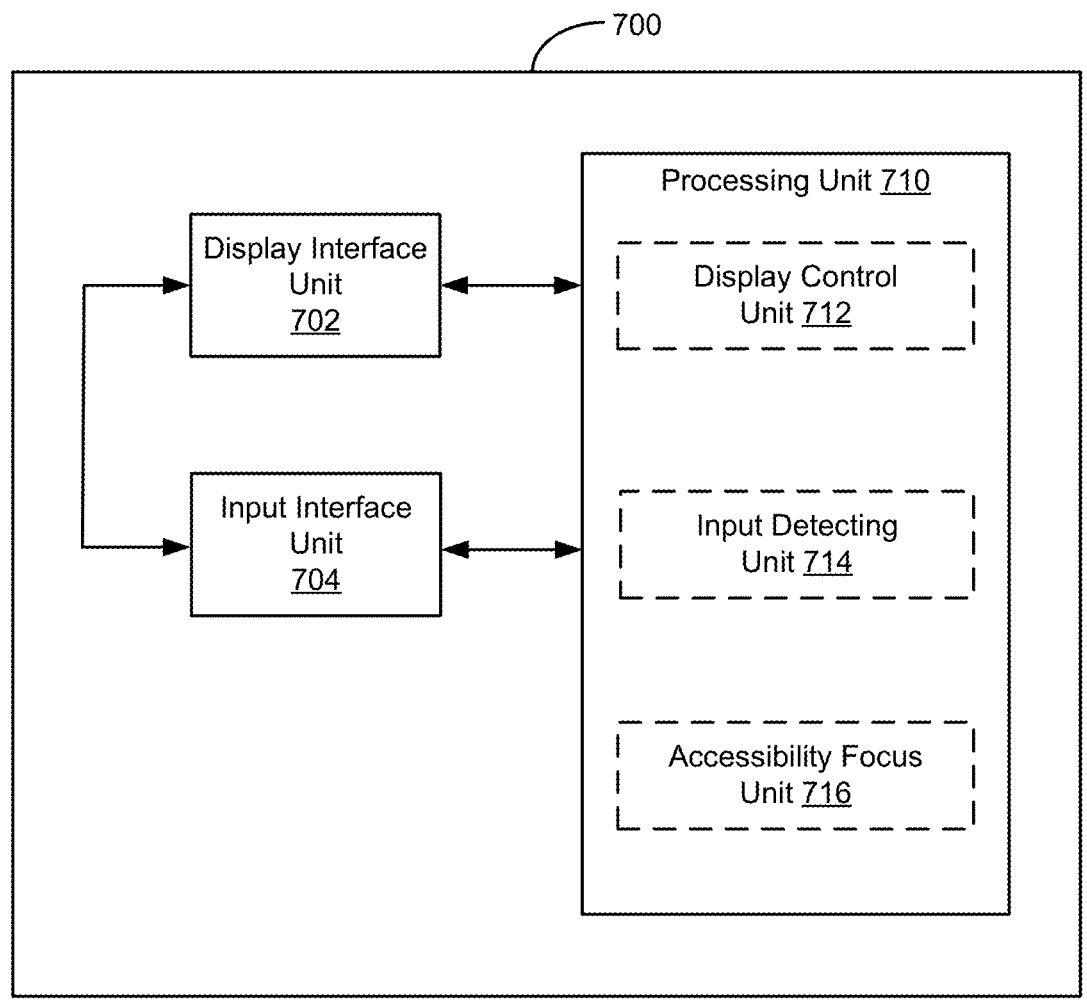
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display interface unit 702 configured to provide display information to a display unit and an input interface unit 704 configured to receive input information from an input unit, and a processing unit 710 coupled with the display interface unit 702 and the input interface unit 704. In some embodiments, the processing unit 710 includes a display control unit 712, an input detecting unit 714, and an accessibility focus unit 716.

The processing unit 710 is configured to display (e.g., with the display control unit 712), on the display unit, a plurality of user interface objects. In some embodiments, the processing unit 710 is configured to sequentially move (e.g., with the accessibility focus unit 716) accessibility focus through the plurality of user interface objects. In some embodiments, accessibility focus starts at one of the plurality of user interface objects having system focus.

The processing unit 710 is configured to detect (e.g., with the input detecting unit 712) a selection input while a first user interface object of the plurality of user interface objects has accessibility focus. In response to detecting the selection input, the processing unit 710 is configured to display (e.g., with the display control unit 712), on the display unit, an accessibility menu for the first interface object including one or more selectable options for interacting with the first user interface object and a selectable option for displaying a virtual remote.

In some embodiments, the processing unit 710 is configured to sequentially move (e.g., with the accessibility focus unit 716) accessibility focus through the selection options in the accessibility menu.

The processing unit 710 is configured to detect (e.g., with the input detecting unit 714) a virtual remote activation input while the selectable option for displaying the virtual remote has accessibility focus. In response to detecting the virtual remote activation input, the processing unit 710 is configured to display (e.g., with the display control unit 712), on the display unit, a virtual remote including a plurality of virtual remote user interface objects. In some embodiments, the plurality of virtual remote user interface objects includes a directional user interface object group including one or more of an up user interface object, a right user interface object, a down user interface object, a left user interface object, or a select user interface object. In some embodiments, the plurality of virtual remote user interface objects includes a device user interface object group including one or more of a menu user interface object or a home user interface object. In some embodiments, the plurality of virtual remote user interface objects includes a media playback user interface object group including one or more of a pause-play user interface object or a volume user interface object.

In some embodiments, the plurality of virtual remote user interface objects includes a touch-sensitive surface user interface object. In some embodiments, the processing unit 710 is configured to detect (e.g., with the input detecting unit 714) a touch-sensitive surface input while the touch-sensitive surface user interface object has accessibility focus. In some embodiments, in response to detecting the touch-sensitive surface input, the processing unit 710 is configured to display (e.g., with the display control unit 712), on the display unit, a touch-sensitive surface menu including a plurality of touch-sensitive surface action user interface objects. In some embodiments, the plurality of touch-sensitive surface action user interface objects includes one or more of a tap user interface object or a press user interface object for emulating a contact with a touch-sensitive surface, one or more swipe user interface objects for emulating movement of a contact with a touch-sensitive surface, and a gestures user interface object for emulating a constructed touch gesture In some embodiments, the processing unit 710 is configured to sequentially move (e.g., with the accessibility focus unit 716) accessibility focus through the plurality of virtual remote user interface objects. In some embodiments, the processing unit 710 is configured to sequentially move (e.g., with the accessibility focus unit 716) accessibility focus through groups of the plurality of virtual remote user interface objects, at least one of the groups including two or more of the plurality of virtual remote user interface objects.

In some embodiments, the processing unit 710 is configured to detect (e.g., with the input detecting unit 714) a second selection input while a second user interface object of the plurality of user interface objects has accessibility focus. In some embodiments, in response to detecting the second selection input, the processing unit 710 is configured to display (e.g., with the display control unit 712), on the display unit, an accessibility menu for the second user interface object including one or more selectable options for interacting with the second user interface object and a selectable option for displaying the virtual remote.

In some embodiments, the processing unit 710 is configured to play back (e.g., with the display control unit 712 and/or other media playback units) a media item. In some embodiments, the processing unit 710 is configured to, in response to playing back a media item, display (e.g., with the display control unit 712), on the display unit, the virtual remote, wherein the virtual remote includes user interface objects for adjusting playback of the media item.

In some embodiments, the processing unit 710 is configured to, in accordance with a determination that a last user interface object of a group of the plurality of user interface object has had accessibility focus for a scanning period, display (e.g., with the display control unit 712), on the display unit, one or more scroll user interface object for scrolling the group of the plurality of user interface objects. In some embodiments, the processing unit 710 is configured to display the one or more scroll user interface objects in response to a determination that the group of the plurality of user interface objects belongs to a set of user interface objects having a size greater than a threshold.

In some embodiments, the processing unit 710 is configured to detect (e.g., with the input detecting unit 714), a scroll input while one of the one or more scroll user interface objects has accessibility focus. In some embodiments, in response to detecting the scroll input, the processing unit 710 is configured to sequentially move (e.g., with the accessibility focus unit 716) accessibility focus through directional scroll user interface objects of the one of the one or more scroll user interface objects. In some embodiments, the processing unit 710 is configured to detect (e.g., with the input detecting unit 714) a directional scroll input while one of the directional scroll user interface objects has accessibility focus. In some embodiments, in response to detecting the directional scroll input, the processing unit 710 is configured to replace (e.g., with the display control unit 712) the group of the plurality of user interface objects with a replacement group of a plurality of user interface objects. In some embodiments, the processing unit 710 is configured to, in accordance with a determination that one of the plurality of user interface objects has accessibility focus, hide (e.g., with the display control unit 712) the one or more scroll user interface objects.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, displaying operation 602, detecting operation 608, displaying operation 610, detecting operation 614, and displaying operation 616 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device, coupled to a display, with one or more processors and non-transitory memory:
      displaying, on the display, a plurality of user interface objects;

detecting a selection input while a first user interface object of the plurality of user interface objects has accessibility focus;

in response to detecting the selection input, displaying, on the display, an accessibility menu for the first user interface object including one or more selectable options for interacting with the first user interface object and a selectable option for displaying a virtual remote;

detecting a virtual remote activation input while the selectable option for displaying the virtual remote has accessibility focus; and in response to detecting the virtual remote activation input, displaying, on the display, a virtual remote including a plurality of virtual remote user interface objects.

2. The method of claim 1, including, prior to detecting the selection input, sequentially moving accessibility focus through the plurality of user interface objects.

3. The method of claim 2, wherein sequentially moving accessibility focus starts at one of the plurality of user interface objects having system focus.

4. The method of claim 1, further comprising, in accordance with a determination that a last user interface object of a group of the plurality of user interface object has had accessibility focus for a scanning period, displaying, on the display, one or more scroll interface objects for scrolling the group of the plurality of user interface objects.

5. The method of claim 4, further comprising:
detecting a scroll input while one of the one or more scroll user interface objects has accessibility focus; and
in response to detecting the scroll input, sequentially moving accessibility focus through directional scroll user interface objects of the one of the one or more scroll user interface objects.

6. The method of claim 4, further comprising:
detecting a directional scroll input while a directional scroll user interface object has accessibility focus; and
in response to detecting the directional scroll input, replacing the group of the plurality of user interface objects with a replacement group of a plurality of user interface objects.

7. The method of claim 4, further comprising, in accordance with determination that one of the plurality of user interface objects has accessibility focus, hiding the one or more scroll user interface objects.

8. The method of claim 4, wherein displaying the one or more scroll user interface objects is performed in response to a determination that the group of the plurality of user interface objects belongs to a set of user interface objects having a size greater than a threshold.

9. The method of claim 1, further comprising, in response to detecting the selection input, moving system focus to the first user interface object.

10. The method of claim 1, further comprising, while displaying the accessibility menu for the first user interface object, sequentially moving accessibility focus through the selectable options in the accessibility menu for the first user interface object.

11. The method of claim 1, further comprising, while displaying the virtual remote, sequentially moving accessibility focus through the plurality of virtual remote user interface objects.

12. The method of claim 11, wherein sequentially moving accessibility focus through the plurality of virtual remote user interface objects includes sequentially moving accessibility focus through groups of the plurality of virtual remote user interface objects, at least one of the groups including a two or more of the plurality of virtual remote user interface objects.

13. The method of claim 1, wherein the plurality of virtual remote user interface objects include a directional user interface object group including one or more of an up user interface object, a right user interface object, a down user interface object, a left user interface object, or a select user interface object.

14. The method of claim 1, wherein the virtual remote user interface objects include a device user interface object group including one or more of a menu user interface object and a home user interface object.

15. The method of claim 1, wherein the virtual remote user interface objects include a media playback user interface object group including one or more of a pause-play user interface object or a volume user interface object.

16. The method of claim 1, wherein the virtual remote user interface objects include a touch-sensitive surface user interface object.

17. The method of claim 16, further comprising:
detecting a touch-sensitive surface input while the touch-sensitive surface user interface object has accessibility focus; and
in response to detecting the touch-sensitive surface input, displaying, on the display, a touch-sensitive surface menu including a plurality of touch-sensitive surface action user interface objects.

18. The method of claim 17, wherein the plurality of touch-sensitive surface action user interface objects include one or more of a tap user interface object or a press user interface object for emulating a contact with a touch-sensitive surface, one or more swipe user interface objects for emulating movement of a contact with a touch-sensitive surface, and a gestures user interface object for emulating a constructed touch gesture.

19. The method of claim 1, further comprising, in response to playing back a media item, displaying, on the display, the virtual remote, wherein the virtual remote includes user interface objects for adjusting playback of the media item.

20. The method of claim 1, further comprising:
detecting a second selection input while a second user interface object of the plurality of user interface objects has accessibility focus; and
in response to detecting the second selection input, displaying, on the display, an accessibility menu for the second user interface object including one or more selectable options for interacting with the second user interface object and a selectable option for displaying the virtual remote.

21. A non-transitory computer readable storage medium storing one or more programs, the one or more programs comprising instructions, which, when executed by an electronic device coupled to a display, cause the electronic device to:
display, on the display, a plurality of user interface objects;
detect a selection input while a first user interface object of the plurality of user interface objects has accessibility focus;
in response to detecting the selection input, display, on the display, an accessibility menu for the first user interface object including one or more selectable options for interacting with the first user interface object and a selectable option for displaying a virtual remote;

detect a virtual remote activation input while the selectable option for displaying the virtual remote has accessibility focus; and in response to detecting the virtual remote activation input, display, on the display, a virtual remote including a plurality of virtual remote user interface objects.

22. An electronic device comprising:
a display interface unit configured to display a user interface on a display unit; and
a processing unit coupled with the display interface unit, the processing unit configured to:
  display, on the display unit, a plurality of user interface objects;
  detect a selection input while a first user interface object of the plurality of user interface objects has accessibility focus;
  in response to detecting the selection input, display, on the display unit, an accessibility menu for the first user interface object including one or more selectable options for interacting with the first user interface object and a selectable option for displaying a virtual remote;
  detect a virtual remote activation input while the selectable option for displaying the virtual remote has accessibility focus; and
  in response to detecting the virtual remote activation input, display, on the display unit, a virtual remote including a plurality of virtual remote user interface objects.

23. The electronic device of claim 22, wherein the processing unit is further configured to, prior to detecting the selection input, sequentially move accessibility focus through the plurality of user interface objects.

24. The electronic device of claim 23, wherein the processing unit is configured to sequentially move accessibility focus through the plurality of user interface objects starting at one of the plurality of user interface objects having system focus.

25. The electronic device of claim 22, wherein the processing unit is further configure to, in accordance with a determination that a last user interface object of a group of the plurality of user interface object has had accessibility focus for a scanning period, display, on the display unit, one or more scroll interface objects for scrolling the group of the plurality of user interface objects.

26. The electronic device of claim 25, wherein the processing unit is further configured to:
  detect a scroll input while one of the one or more scroll user interface objects has accessibility focus; and
  in response to detecting the scroll input, sequentially move accessibility focus through directional scroll user interface objects of the one of the one or more scroll user interface objects.

27. The electronic device of claim 25, wherein the processing unit is further configured to:
  detect a directional scroll input while a directional scroll user interface object has accessibility focus; and
  in response to detecting the directional scroll input, replace the group of the plurality of user interface objects with a replacement group of a plurality of user interface objects.

28. The electronic device of claim 25, wherein the processing unit is further configured to, in accordance with determination that one of the plurality of user interface objects has accessibility focus, hide the one or more scroll user interface objects.

29. The electronic device of claim 25, wherein the processing unit displays the one or more scroll user interface objects in response to a determination that the group of the plurality of user interface objects belongs to a set of user interface objects having a size greater than a threshold.

30. The electronic device of claim 22, wherein the processing unit is further configured to, in response to detecting the selection input, move system focus to the first user interface object.

* * * * *